(12) United States Patent
Diver et al.

(10) Patent No.: US 11,517,832 B2
(45) Date of Patent: Dec. 6, 2022

(54) SYSTEM AND METHOD FOR REMOVING TRANSITION METALS FROM SOLUTION

(71) Applicant: The Research Foundation for The State University of New York, Amherst, NY (US)

(72) Inventors: Steven Diver, Clarence Center, NY (US); Jonathan French, Newark, DE (US)

(73) Assignee: The Research Foundation for The State University of New York, Amherst, NY (US)

( * ) Notice: Subject to any disclaimer, the term of this patent is extended or adjusted under 35 U.S.C. 154(b) by 466 days.

(21) Appl. No.: 15/025,751

(22) PCT Filed: Sep. 30, 2014

(86) PCT No.: PCT/US2014/058284
§ 371 (c)(1),
(2) Date: Mar. 29, 2016

(87) PCT Pub. No.: WO2015/048731
PCT Pub. Date: Apr. 2, 2015

(65) Prior Publication Data
US 2016/0243463 A1 Aug. 25, 2016

Related U.S. Application Data

(60) Provisional application No. 62/022,550, filed on Jul. 9, 2014, provisional application No. 61/889,432, filed
(Continued)

(51) Int. Cl.
*B01D 15/38* (2006.01)
*C22B 7/00* (2006.01)
(Continued)

(52) U.S. Cl.
CPC ......... *B01D 15/3857* (2013.01); *B01D 15/00* (2013.01); *B01J 20/286* (2013.01);
(Continued)

(58) Field of Classification Search
CPC .... B01D 15/3857; B01D 15/00; B01J 20/286; B01J 20/3257; C22B 7/009; C22B 11/048
See application file for complete search history.

(56) References Cited

U.S. PATENT DOCUMENTS 5,286,464 A * 2/1994 Dragisich ............... C22B 3/42
423/89
6,326,326 B1 12/2001 Feng et al.
(Continued)

FOREIGN PATENT DOCUMENTS

EP  0355837 A2  2/1990
WO  WO-0123067 A1 * 4/2001 ............. B01J 45/00

OTHER PUBLICATIONS

Izatt et al ("Removal and Separation of Metal Ions from Aqueous Solutions Using a Silica-Gel-Bonded Macrocycle System." Anal. Chem. 1988, 60, 1825-1826). (Year: 1988).*
(Continued)

*Primary Examiner* — Colin W. Slifka
*Assistant Examiner* — Michael Forrest
(74) *Attorney, Agent, or Firm* — Hodgson Russ LLP

(57) ABSTRACT

A metal sequestering material can be contacted with a reaction mixture of a metal-catalyzed reaction to remove transition metals or transition metal complexes. The reaction mixture contains transition metals and a reaction product in solution. These transition metals may be, for example, Pd, Ir, Ru, Rh, Pt, Au, or Hg. The concentration of transition metals in the reaction mixture is reduced to less than 100 ppm or even less than 10 ppm.

16 Claims, 30 Drawing Sheets

Scheme 3

Related U.S. Application Data on Oct. 10, 2013, provisional application No. 61/884,652, filed on Sep. 30, 2013.

(51) Int. Cl.
  *B01J 20/32* (2006.01)
  *B01D 15/00* (2006.01)
  *B01J 20/286* (2006.01)
  *C22B 11/00* (2006.01)

(52) U.S. Cl.
  CPC ........... *B01J 20/3257* (2013.01); *C22B 7/009* (2013.01); *C22B 11/048* (2013.01); *B01J 2220/54* (2013.01); *Y02P 10/20* (2015.11)

(56) References Cited

U.S. PATENT DOCUMENTS

| | | | | |
|---|---|---|---|---|
| 2006/0252938 | A1* | 11/2006 | Sava | C07C 51/47 548/217 |
| 2009/0023604 | A1* | 1/2009 | Pears | B01J 20/267 506/27 |
| 2010/0290962 | A1* | 11/2010 | Wilson | A61P 31/04 423/22 |
| 2012/0272791 | A1* | 11/2012 | Bai | B01D 15/00 75/710 |
| 2013/0146542 | A1* | 6/2013 | Huang | B01J 20/3204 210/656 |

OTHER PUBLICATIONS

Berry et al (The Preparation and Metal Complexing properties of Isonitrile-Functionalized Polystyrene Resins, Zeitschrift fur Naturforshung B., vol. 43, 7, (1988) pp. 862-872). (Year: 1988).*
Howell et al (Preparation of Polymer-supported Isonitrile Complexes, J.C.S. Chem. Comm. (1980), 1039-1040). (Year: 1980).*
Galan et al., A Rapid and Simple Cleanup Procedure for Metathesis Reactions, Organic Letters, 2007, 9(7), 1203-1206.
French et al., Removal of Ruthenium Using a Silica Gel Supported Reagent, Organic Letters, Oct. 2013, 15(21), abstract.
Berry et al., The Preparation and Catalytic Activity of Rhodium(I) Complexes of Isonitrile-Functionalized Silica, J. of Molecular Catalysis, 1986, 37, 243-252.
Vougioukalakis, Removing Ruthenium from Olefin metathesis Reaction Products, Chemistry A European Journal, vol. 18, No. 29, Jul. 16, 2012, pp. 8860-8880. Jul. 16, 2012.

* cited by examiner

Bright Yellow | Faint yellow | Very Faint yellow | Colorless

JF-3-189-RuII

Scheme 1 a)

b)

Scheme 2

Scheme 3

(a)

(b)

(c)

A.

B.

SYSTEM AND METHOD FOR REMOVING TRANSITION METALS FROM SOLUTION

CROSS-REFERENCE TO RELATED APPLICATIONS

This application claims priority to the following U.S. provisional patent applications: Application No. 61/884,652 filed Sep. 30, 2013, Application No. 61/889,432 filed Oct. 10, 2013, and Application No. 62/022,550 filed Jul. 9, 2014, the disclosures of which are hereby incorporated by reference.

STATEMENT REGARDING FEDERALLY SPONSORED RESEARCH

This invention was made with government support under contract CHE1012839 awarded by the National Science Foundation. The government has certain rights in this invention.

FIELD OF THE INVENTION

This disclosure relates generally to the field of sequestering and removing transition metals and transition metal complexes from metal catalyzed reactions.

BACKGROUND OF THE INVENTION

A significant percentage of commercially produced chemical products involve catalysts at some stage in their manufacturing process. Due to their efficiency, many transition metals and transition metal complexes are used as catalysts in such processes. Despite their ubiquitous use, their removal and recovery from post reaction mixtures remains a major concern. This is especially evident in the pharmaceutical industry where very strict limits have been set by regulatory agencies. As a result of their toxicities, only very small quantities of such catalysts are permitted to be present in the final pharmaceutical product. Another motivation for the removal and recovery of such metals and metal complexes is that they are relatively rare and expensive. Traditional removal methods such as chromatography, activated carbon, extraction, distillation and recrystallization are less than ideal, either because they do not effectively remove metal impurities or require significant time and effort, which is particularly costly during large scale synthetic procedures. There is a clear and present need for effective methods for the removal and recovery of transition metals and transition metal complexes from solution.

Metathesis promoted by ruthenium carbenes is a robust method for creating carbon-carbon double bonds in molecules with high densities of organic functionality. As a result, these catalysts have found application in a broad range of chemistry from total synthesis to the synthesis of pharmaceutically relevant compounds on the industrial scale. Though metatheses are fast and efficient, the removal of ruthenium during purification is a difficult problem. The removal of residual ruthenium is necessary as it can potentially lead to decomposition or isomerization of the desired product.

Many of the existing quenching methods require long treatment periods, toxic metals, or require expensive reagents. Examples of these include tris(hydroxymethyl) phosphine, addition of $Pb(OAc)_4$, excess DMSO or triphenylphosphine oxide, or hydrogen peroxide, as well as the addition of activated carbon followed by column chromatography. Several of these methods require long treatment times (12 to 24 h), and operate by an undefined oxidative mechanism. A mesoporous silicate system was developed which was also found to aid in the removal of the ruthenium. The advantage of this system is that it works relatively quickly but it is expensive and tedious to prepare. Finally, a method developed earlier in our group relies on the addition of $KO_2CCH_2NC$ to the reaction mixture (Org. Lett., 2007, 9, 12031206).

Currently there are several different methods used for the removal of ruthenium after the reaction is complete. These methods are often based on two different approaches: (1) treating the catalyst with an additive once the reaction is complete, (2) the use of a tailored catalyst with a specially designed chemical handle to aid in removal. Tailored catalysts are not commercially-available and require lengthy syntheses, which often limits their use.

BRIEF SUMMARY OF THE INVENTION

Compositions and methods are provided for removing transition metals or transition metal complexes from metal catalyzed reaction mixtures. The compositions comprise metal sequestering materials. In one embodiment, the metal sequestering material has a support, a linker bound to the support, and at least one isocyanide bound to the linker.

For removing transition metals from a reaction mixture, a metal sequestering material is contacted with the reaction mixture of a metal-catalyzed reaction under conditions allowing the attachment of the metal or metal complexes to the metal sequestering material. The metal sequestering material is then separated from the reaction mixture and the concentration of the transition metals in the reaction mixture is reduced after the separation of the metal sequestering material. In one embodiment, the transition metals can be removed from the metal sequestering material after separation and the material can be recycled for additional metal sequestering operations.

The reaction mixture from which metals can be removed by the present method include those that are catalyzed by one or more of transition metals of Group 8 elements, Group 9 elements, Group 10 elements, Group 11 elements, or Group 12 elements. For example, the transition metals may be Pd, Ir, Ru, Rh, Pt, Au, or Hg. In some instances, the transition metal may have a coordinated ligand in the reaction mixture prior to the contacting with the metal sequestering material.

DETAILED DESCRIPTION OF THE INVENTION

Figure 1:
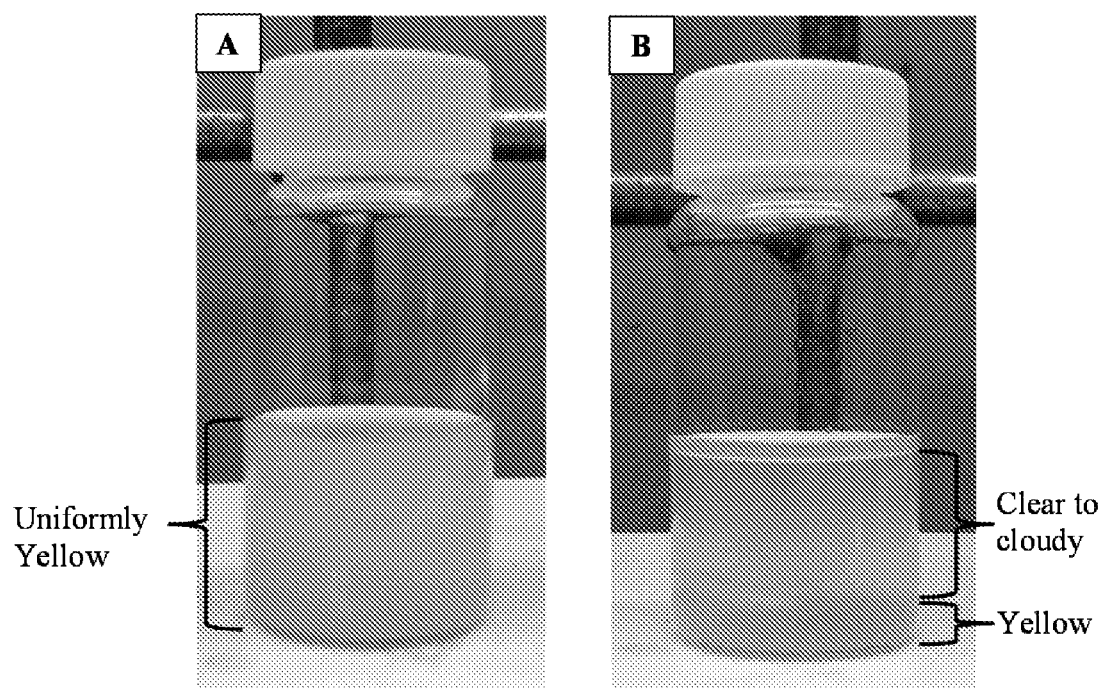
FIG. 1. Solution of $PdCl_2(PPh_3)_2$ before (A) and after (B) stirring with isocyanide-grafted silica gel for 30 minutes.
Figure 2:
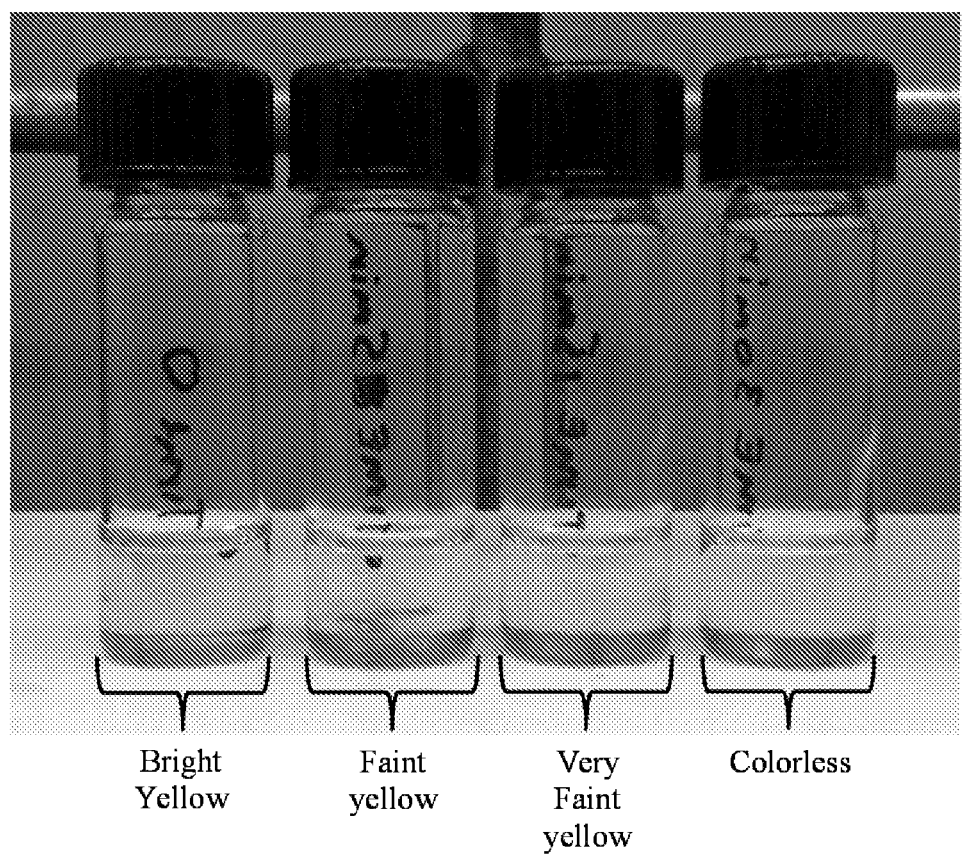
FIG. 2. Aliquots of Vaska's complex removed from the reaction mixture, from left to right at time 0, 5, 15, and 30 minutes.

The present disclosure provides compositions and methods for removal of transition metals and transition metal complexes from solutions. This transition metal complex may be used as, for example, a catalyst and can include one or more transition metals bonded to a ligand. In one embodiment, compositions and methods are provided for removal of transition metals and transition metal complexes from reaction mixtures of metal-catalyzed reactions. The transition metal, part of the transition metal complex, or an entire transition metal complex can be removed from the reaction mixture using embodiments disclosed herein.

In one aspect, the disclosure provides a solid supported system, and method for sequestering and removing transition metals and transition metal complexes from solution using the solid support system. The solid support system may comprise a solid supported, isocyanide-based heterogeneous system. For example, in one embodiment, the system comprises a metal sequestering material with one or more isocyanide(s) bound to a linker, which is bound to a solid support.

In one aspect, the disclosure provides a method for removing transition metals or transition metal catalysts from solutions including from metal catalyzed reaction mixtures. The method comprises providing a metal catalyzed reaction, wherein the metal is a transition metal, contacting the reaction mixture with a solid support system described herein such that at least some of the transition metal or metal complexes attach to the solid support system. Separating the solid support system from the reaction mixture results in removal of the transition metals or transition metal complexes from the reaction mixture thereby providing a reaction mixture comprising a product of the reaction mixture that is depleted of the transition metal or its complexes. In various embodiments, the mixture comprising the reaction product of the metal catalyzed reaction can be depleted up to 50-85%, 85-99%, or 100% of the transition metal or its complexes.

In one aspect, the present disclosure provides a product of a transition metal catalyzed reaction which is free or substantially free of transition metal or transition metal complexes. In one embodiment, a composition comprising the reaction product contains less than 1000 ppm, 100 ppm or 10 ppm of the transition metal or transition metal complexes. In one embodiment, greater than 97%, 98%, or 99% of the transition metals are removed from the reaction mixture which has been catalyzed by a transition metal catalyst.

In one embodiment, the metal sequestering solid support system has a support material, a linker bound to the support, and at least one isocyanide bound to the linker. The metal sequestering material may be contacted with a reaction mixture of a metal-catalyzed reaction. The reaction mixture has transition metals and a reaction product in solution. The transition metals can be, for example, a Group 8 element, a Group 9 element, a Group 10 element, a Group 11 element, a Group 12 element, or mixtures thereof. Examples of metals that can be removed from reactions mixtures include Pd, Ir, Ru, Rh, Pt, Au, or Hg. Some of the transition metals may have at least one coordinated ligand in the reaction mixture.

Suitable solid supports may include synthetic, semi-synthetic, or naturally occurring materials, which may be organic or inorganic, e.g., polymeric, ceramic, or metallic. Attachment between the linker and the support will generally, although not necessarily, be covalent, and the covalent linkage may be direct or indirect. Indirect covalent linkages are typically, though not necessarily, through a functional group on a support surface. Ionic attachments are also suitable, including combinations of one or more anionic groups on the metal complexes coupled with supports containing cationic groups, or combinations of one or more cationic groups on the metal complexes coupled with supports containing anionic groups. In an example, the isocyanide may be linked to an anionic group, which would ion pair with a cationic support.

Examples of suitable support material includes silicas, silicates, aluminas, aluminum oxides, silica-aluminas, aluminosilicates, zeolites, titanias, titanium dioxide, magnetite, magnesium oxides, boron oxides, clays, zirconias, zirconium dioxide, carbon, polymers, cellulose, cellulosic polymers amylose, amylosic polymers, or a combination thereof. In one embodiment, the support comprises silica, a silicate, or a combination thereof.

In one embodiment, organic solid supports include those having a functional group (e.g. one that can be derivatized) attached to some polymerizable group. This includes polyolefins (usually prepared through ring-opening metathesis polymerization), functionalized polystyrenes, functionalized acrylamides, functionalized polyethylenes, poly(vinyl)alcohol, poly(ethylene glycol)-linked polystyrenes and their co-polymers.

The initially sought solid supports bearing isocyanide ligands were less effective at removing Ru from alkene metathesis reactions in certain cases. Specifically, Wang resin and poly(ethylene glycol)grafted polystyrene were ineffective for the removal of ruthenium carbene complexes. The most commonly used resins for solid-phase organic synthesis are polystyrenes or polystyrenes grafted with a linker designed to aid solubility in a particular solvent. These are attractive because they can be obtained in a range of different loadings which allow for high isocyanide loading through chemical transformation need to prepare the supported isocyanide reagents. We turned to these first. In an initial screening assay, isocyanide bound Wang resin was prepared in 1.6 mmole/g loading isocyanide. Use of 20 equivalents of modified polystyrene resin failed to abolish metathesis activity of a standard ruthenium carbene at temperatures between 25-60° C. for treatment times ranging from 0.5 to 4 h in dichloroethane solvent. Reasoning that this was due to poor swelling properties of this rigid polystyrene, a poly(ethylene glycol)grafted polystyrene known to have superior swelling properties in organic solvents was used.

The poly(ethylene glycol)grafted polystyrene was loaded with isocyanide to a loading level of 0.44 mmol/g and used in 20 fold excess of the ruthenium carbene. However, using similar conditions as that used for the isocyanide modified Wang resin, metathesis activity in a qualitative ring-closing metathesis (RCM) test reaction could not be completely quenched, suggesting significant quantities of residual Ru remained, in its active carbene form. This resin was not effective in capturing all the solution phase ruthenium. The unanticipated shortcomings of these solid supports may be overcome by some combination of higher equivalents used (>20 equivalents), higher loading in more soluble grafted polystyrenes, longer contact times, use of alternative solvents and/or use of different number of carbon linkers separating the isocyanide from the rigid solid support. While less effective at removing Ru, these supports may be more effective for other transition metals.

The support may also comprise a functional group selected from hydroxyl, siloxy, siloxane, amide, urea, ether, ester, anhydride, carbamate, or a combination thereof. Suitable combinations of functional groups for the support and the linkers may be selected to provide points of attachments. Suitable combinations include siloxy and amide, siloxy and urea, siloxy and ether, siloxy and ester, siloxy and anhydride, siloxy and carbamate, siloxane and amide, siloxane and urea, siloxane and ether, siloxane and ester, siloxane and anhydride, siloxane and carbamate attachments. Other combinations will be apparent to the skilled artisan.

In certain embodiments, a support material may be used that has been treated to include functional groups, inert moieties, and/or excess ligands. Any of the functional groups described herein are suitable for incorporation on the support, and may be generally accomplished through techniques known in the art. Inert moieties may also be incorporated on the support to generally reduce the available attachment sites on the support, e.g., in order to control the placement, or amount, of complex linked to the support. Still further, the addition of excess ligand(s) on the support, particularly excess labile ligand(s), is possible, and may help to improve sequestering of catalysts in some cases.

In an embodiment, the functional group (e.g. HO-) of these support materials can be directly functionalized with an isocyanide, or isocyanide containing monomeric silanes can be used in sol gel process or Stober processing to make functionalized silica gels, of uniform size or of varying size. The silica gels may be irregularly shaped or uniformly shaped. The silica gel may be formed with higher surface areas or pores such as xerogels and aerogels. The HO-groups on the surface of glass may be modified. The solid support may optionally be substituted with groups designed to enhance permeability and/or swelling properties in organic solvents. The choice of solid support is based on the following: 1) its ability to chemically interact with a solution phase; 2) its ability to be separated from the solution phase; 3) the degree of isocyanide coverage (surface loading capacity). Surface accessibility or accessibility to functionalized interiors of solid supports such as silica or alumina is important for an effective capture agent, but even particles with interior isocyanide groups may be effective for metal removal, just not with optimal use of the isocyanide groups. For example, when used in chemical reactions, the choice of support is based, in part, on its ability to interact with a solution phase where the homogeneous catalyst and derived products are dissolved, its ability to be separated from solution (e.g. by filtration) and the degree of coverage, which ideally exceeds 1 mmole/g. In another example, when used for sequestration of metals or metal complexes, a high degree of coverage of isocyanides is important for efficient metal capture from the solution or effluent. Lower coverage (less than 1 mmol/g solid supported reagent) results in kinetically-slower capture and incomplete capture, which limits the practicality of the method. It may be possible to use lower surface loadings or supports with pores, but this may reduce the efficiency of the process, requiring some combination of longer contact time, heating, sonication or larger excesses of the solid supported isocyanide reagent. In the case of multivalent metals or metal complexes with multiple exchangeable ligands, high surface accessibility is also important because more than one isocyanide ligand may bind to the metal or metal complex. In these cases, the metal is more firmly held to the solid support, which reduces the likelihood of leaching. In one embodiment, the solid support has the right combination of high surface coverage, high mobility of the linked isocyanides and high surface accessibility in a wide range of organic solvents.

Figure 6:
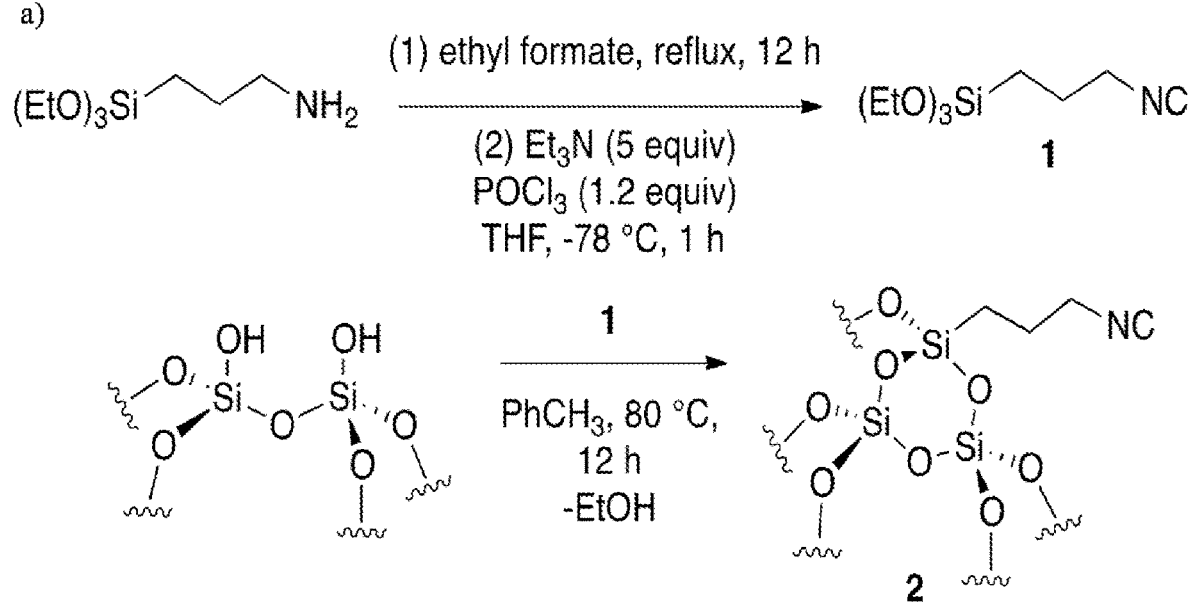
FIG. 6. Scheme 1: a) Production of isocyanide tethered to silica gel Supported Reagent 2 and b) Examples of some commonly used Grubbs Catalysts.
Figure 6:
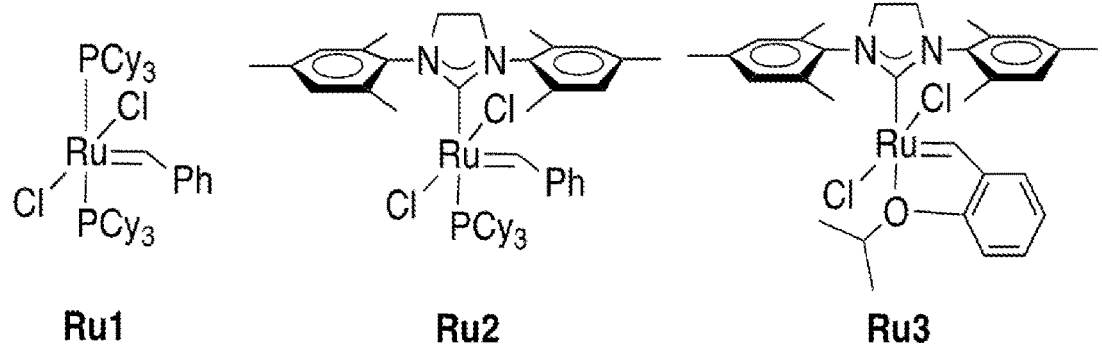
Figure 7:
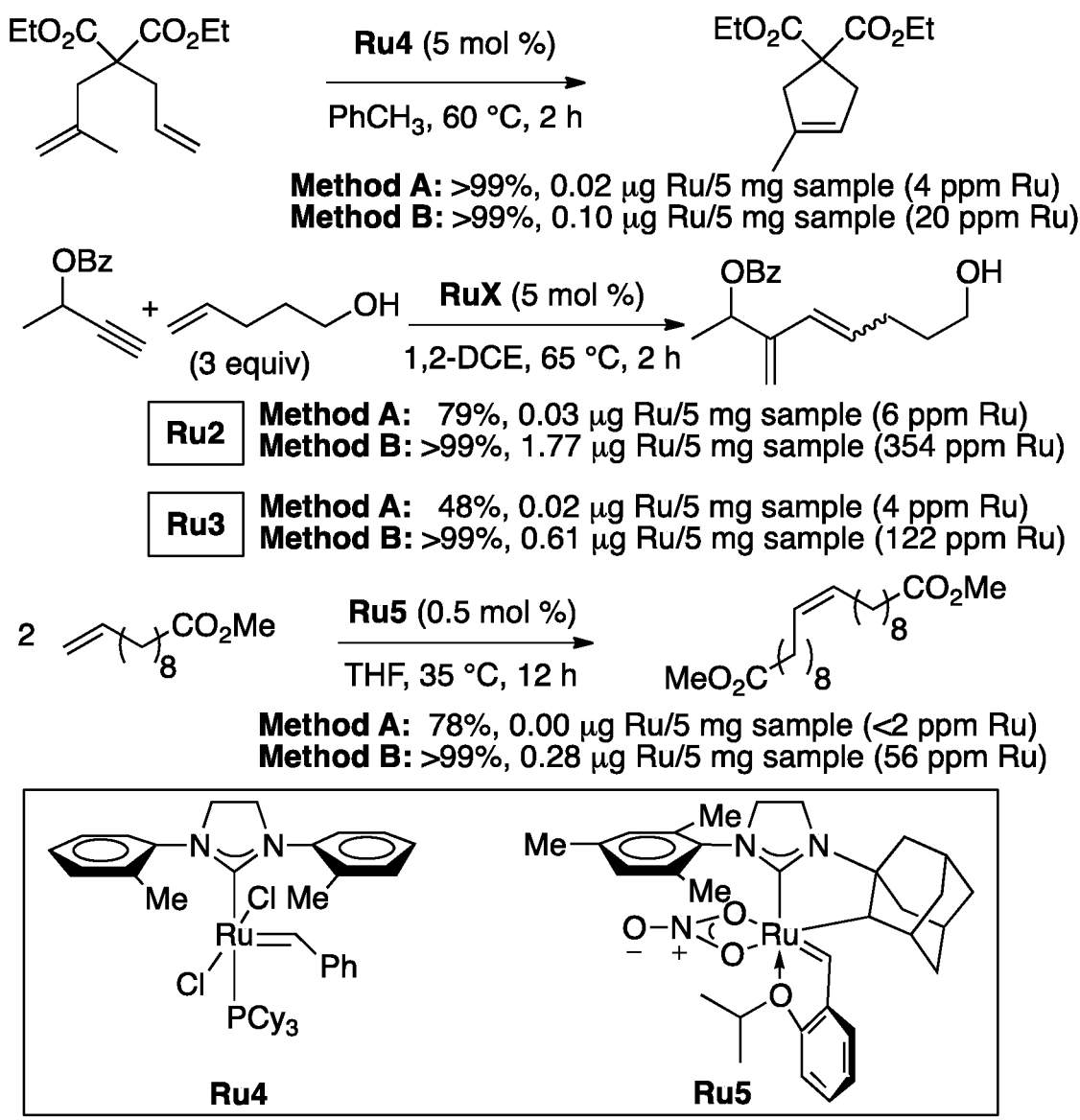
FIG. 7. Scheme 2: Evaluation of the Procedure in Demanding Reactions. (a) Percent yield, and concentration of ruthenium in μg/5 mg of sample. Method A: Filtration to remove the silica gel, concentration of the reaction and column purification (2.0 g of silica gel for every 0.01 mmol of catalyst) prior to ICP-MS analysis. Method B: Removal of the silica gel by filtration through a medium porosity filter frit, direct concentration of the reaction mixture, and ICP-MS analysis.
Figure 8:
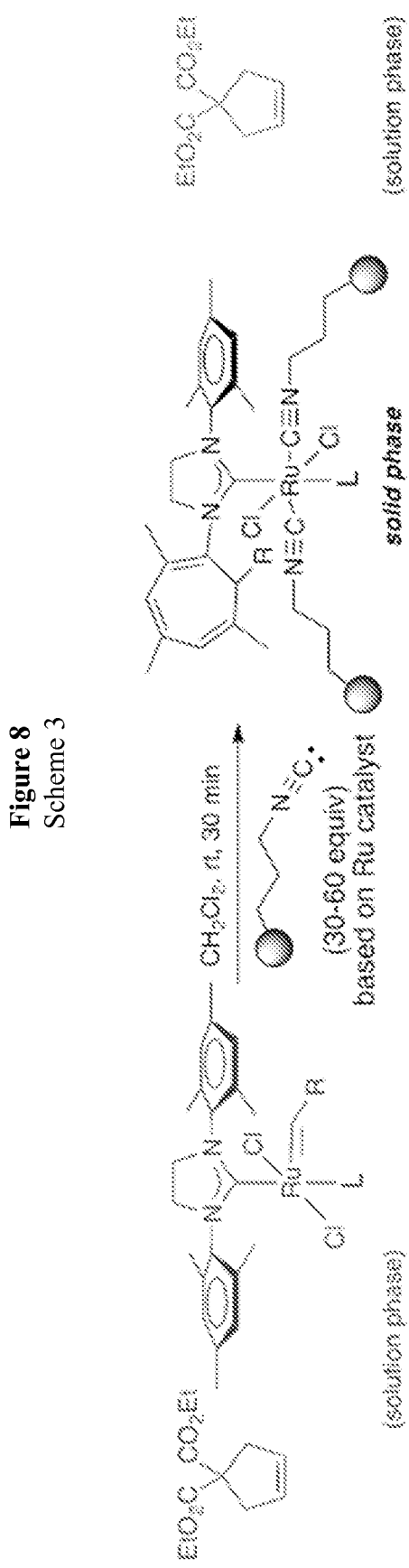
FIG. 8. Scheme 3: Representative example of the use of a solid supported isocyanide ligand to quench active catalysts and sequester Ru from solution phase.

In one embodiment, the isocyanide is grafted onto silica gel particles. In a specific example, the isocyanide is represented by 1 as shown in Scheme 1 of FIG. 6 and the solid support reagents are silica gel particles bearing a carbon linker with three methylene groups (as represented by 2 in Scheme 1). In examples where silica gels are used as the solid support, the silica gel can be of a relatively uniform particle size (60 Å, 40-63 μm) or may be composed of more irregularly shaped particles such as those produced by sol gel processes involving a siloxane containing the isocyanide and another siloxane such as $Si(OEt)_4$. Ideally, the surface density of hydroxyl groups on the silica gel is sufficiently high to allow at least 0.5 mmole of isocyanide loading per gram of silica gel. Once the silica gel is functionalized, it can be titrated to determine loading level.

In some embodiments, for example, where the solid support comprises functionalized polyolefins (e.g. ROMP gels), polystyrenes, and/or poly(vinyl) alcohols, high surface coverage of isocyanides, high mobility of the linked isocyanides, high surface accessibility in a wide range of organic solvents, and robust linker(s) attaching the isocyanide group to the solid support are preferred for the efficacy of the system. Suitable solid supports may also be chosen for applications where a metal is sequestered from aqueous solution, where the linker and support are tailored to maximize interaction with the solvent system for effective capture of the metal or metal complex.

In one embodiment, the isocyanide(s) can be aryl- or alkyl isocyanide(s). In another embodiment, the isocyanide(s) can be alicyclic comprising alkyl and aromatic groups.

In certain embodiments, it is desired to have more than one isocyanide tethered to the solid support. An objective of having multiple isocyanides tethered to the solid support is to increase the rate and efficiency of capturing metals from solution. For example, especially in cases where one desires maximum efficiency and effective capture of Ru metal and metal complexes, the preferred density of monomeric isocyanides tethered to the solid support is between 0.5-4 mmole/g. Higher loadings may be achieved through branching where a diisocyanide is linked to a common attachment point on the solid support. Solid supports with lower loadings of isocyanide may be desirable in certain applications where long contact times (>12 h) are possible, for example. Another possible application might employ larger amounts of the solid support, for instance if it can be recycled. In most cases, solid supports are expensive and use of less solid supported reagent is attractive and more practical. For example, when sequestering ruthenium- (Ru-) based catalysts and byproducts from chemical reactions, it is desirable to quench the catalyst's active Ru=C bond as well as to separate the used catalysts from solution. During routine alkene metathesis, some portion of the catalyst does not become activated and a significant portion of catalyst that was active becomes decomposed to ill-defined ruthenium-containing species. An effective clean up procedure must remove ruthenium in all of these states. To accomplish the quenching activity, a high density of surface accessible isocyanides is preferred. For silica gel used as the solid support, the surface loading is generally in the range of 0.5-4 mmole/g resin. To form a stable coordination complex on the surface of the silica gel, at least 2 isocyanides are preferred.

In some examples, the isocyanide grafted onto the solid support (e.g. silica gel) can be co-grafted with other functional groups (e.g. thiols, phosphines, amines), a process that is well established in the chemical literature. In certain examples where silica gel is selected as the solid support, the monomeric isocyanide which is linked by a carbon chain or aromatic spacer to the siloxane could be used to form silica gels by the sol-gel process, resulting in silica gel particles of different sizes.

Appropriate chemistries for tethering one or more isocyanide(s) to the solid support include attachment of the isocyanide(s) through a carbon-based linker, or a linker with a set number of atoms allowing functionalization of a preexisting functional group such as an alcohol or an amine With solid supports bearing electrophilic functional groups such as benzyl halides, reaction with a nucleophile (O, C, S, P) attached to an isocyanide would deliver the functionalized solid support. It is also possible to perform a number of chemical reactions to preexisting functional groups attached to the solid support in order to increase the surface coverage of the isocyanide groups, or a combination of isocyanide groups and other coordinating ligands such as ethers, hydroxyl groups, thiol groups, trivalent amines and phosphines. Chain extension from suitable functionality such as amine or hydroxyl groups, attached by a number of atoms to the solid support. For instance, an amine may be dialkylated with formamides and subsequently dehydrated to double the isocyanide loading on the solid support. The amine on the solid support can be benzylated with an aryl halide bearing two or more functional group equivalents present that can be converted to isocyanides. This process may also be iterated upon to further increase the surface loading. Alternatively, a hydroxyl group attached to a solid support may be functionalized with an alkyl or benzyl halide bearing two or more arms with functional group equivalents present that can be converted to isocyanides. Linkers of this type feature additional functionality in the linker which may increase the effectiveness of the metal sequestration.

In one embodiment, the isocyanide functional groups may be attached to a solid support through robust linkers, which serve to separate the isocyanides from the solid support (e.g. the silica gel matrix). The linkers serve to project the isocyanide away from the surface of the solid support (e.g. silica gel), with a required density and mobility needed to trap, quench or complex passing transition metals and/or transition metal complexes. The linkers are important to place the isocyanides further beyond the solid-solution interface, into solution, where binding to the metal can take place. The linkers are also somewhat flexible allowing the isocyanides to adopt multiple conformations and geometries helping to speed up the collisions with metals, thereby increasing the rate of the chemical reaction involved in sequestration.

In one embodiment, the linkers are independently selected from hydrocarbylene, substituted hydrocarbylene, heteroatom-containing hydrocarbylene, and substituted heteroatom-containing hydrocarbylene, each of which may optionally comprise one or more functional groups. Preferably, the linkers comprise an isocyanide and a functional group selected from siloxy, siloxane, silanol, amine, amide, imine, alcohol, alkoxide, phenoxide, acetal, aldehyde, carboxylic acid, urea, ether, ester, anhydride, carbamate, carbonates, thiols, sulfonyl, amino sulfonyl, hydrazine, phosphate, phosphite, phosphonate, phosphonite, phosphinate, phosphinite, phosphine, phosphine oxide, or a combination thereof. In particular embodiments, the linkers comprise an isocyanide and advantageously comprise of a siloxy and/or siloxane group and, optionally, one or more amide, urea, ether, ester, anhydride, or carbamate groups. The linkers may also simply be one or more such functional groups that provide direct attachment of the isocyanide to the support.

Figure 17:
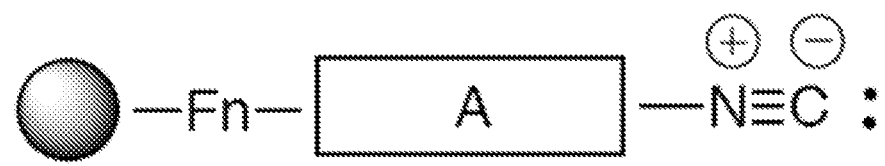
FIG. 17. Diagram describes a linker.

The linker being described is represented in FIG. 17. In certain aspects of the disclosure, the linkers have the structure -A Fn, wherein A is a divalent hydrocarbon moiety (i.e., methylenes (—CH2-)n, wherein n is an integer ranging from 0-24) selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the of arylalkylene can be substituted or unsubstituted, and wherein heteroatoms and/or functional groups may be present in either the aryl or the alkyl portions of the alkylene groups, arylalkylene groups, and Fn is a functional group. While the functional groups are not necessarily limited, suitable functional groups include siloxy, siloxane, silanol, amine, amide, imine, alcohol, alkoxide, phenoxide, acetal, aldehyde, carboxylic acid, urea, ether, ester, anhydride, carbamate, carbonates, thiols, sulfonyl, amino sulfonyl, hydrazine, phosphate, phosphite, phosphonate, phosphonite, phosphinate, phosphinite, phosphine, phosphine oxidephosphate, phosphite, phosphonate, phosphine, phosphine oxide, or a combination thereof.

Suitable linkers include those having the structure CN-A-Si(O(CH2)nCH3)3-x(O)x-, wherein n is an integer ranging from 0-3 and x is an integer ranging from 1-3, and A is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the of arylalkylene can be substituted or unsubstituted, and wherein heteroatoms and/or functional groups may be present in either the aryl or the alkyl portions of the alkylene and arylalkylene groups.

In some embodiments, the linkers may comprise heteroatoms and/or functional groups in either the aryl or alkyl portions of the alkylene or arylalkylene groups A, in addition to the functional groups Fn. Such heteroatoms and/or functional groups may be located at any position in the alkylene or arylalkylene groups. In a preferred embodiment, such heteroatoms and/or functional groups are located at the attachment point of the linker to the ligand. While not limited thereto, the introduction of such heteroatoms and/or functional groups may be accomplished through a reaction between a ligand precursor and a linker having the structure -A-Fn, where A and Fn are as described above. Suitable heteroatoms introduced through such reactions include, O, N, and S, while representative functional groups formed by the reaction between a ligand precursor and a linker include amide, urea, and carbamate groups. Other combinations based on the selection of suitable functional groups present on a ligand precursor and the linker will be apparent to the skilled artisan, including, but not limited to, siloxy and amide, siloxy and urea, siloxy and ether, siloxy and ester, siloxy and anhydride, siloxy and carbamate, siloxane and amide, siloxane and urea, siloxane and ether, siloxane and ester, siloxane and anhydride, and siloxane and carbamate attachments.

In various embodiments, the linkers are organic groups, or organic groups interspersed with a heteroatom (N, O, P, S), or linked through silicon atoms. For example, the linker may be comprised of aromatic rings or aliphatic carbon chains (including heteroatoms), or a combination of the two. The isocyanide group can be attached to the anchoring solid support through any of these organic groups, in distances ranging between 1 carbon atom to 50 carbon atoms, preferably between 2 and 10 carbons. The linker between the isocyanide and the solid support (e.g. silica gel) can be bifurcated or trifurcated at one or more junctures which increases the number of isocyanides on the surface of the solid support (e.g. silica gel). The bifurcated or trifurcated linkers can be symmetrically arranged or can be unsymmetrical with unequal number of carbon members in each arm, or different carbon linkers in each arm (e.g. one with an aromatic isocyanide and one with an aliphatic isocyanide). Increased density allows for a greater number of isocyanide ligands to bind to transition metal agents resulting in multiple bonds to the metal, thereby reducing the likelihood of dissociation or leaching of the transition metal from the solid support.

In some applications with solid supported isocyanide, it may be desirable to have a cleavable linker. The linkers may be severable by the action of light or by the addition of a chemical reagent. Cleavable linkers include, but are not limited to acid labile and oxidatively-cleavable linkers. These cleavable linkers have applications where the metal may be recovered from the resin for re-use or recycling, or for quantitation purposes.

In an embodiment, the composition of the present disclosure is a metal sequestering material having a support, a linker bound to the support, and at least one isocyanide bound to the linker. The isocyanide can is present from 1.1 and 1.6 mmol/g of the support. The support can have a density from 500 $m^2$/g to 600 $m^2$/g. The support may be, for example, silica, a silicate, or a combination thereof.

The solid supported, isocyanide-based system may be used to sequester and remove any transition metal or transition metal complex from solution. In some examples, the transition metal or transition metal complex involves a Group 8 transition metal. In other examples, the transition metal or transition metal complex involves a Group 9 transition metal. In still other examples, the transition metal or transition metal complex involves a Group 10 transition metal, Group 11 transition metal, and/or Group 12 transition metal.

The sequestration of the metal from solution may occur via a passive mechanism (e.g. ligand exchange). For example, such passive mechanism occurs when the system is used to sequester palladium and/or iridium from solution. In other instances, the sequestration of the metal from solution occurs via an active mechanism. The active mechanism causes a chemical reaction in the ruthenium catalyst which quenches its chemical reactivity with alkenes and alkynes. As a result, the quenched catalyst is no longer capable of catalyzing alkene metathesis, alkene-alkyne metathesis or related tandem or consecutive processes based on a metathesis-related catalytic reaction. For example, such active mechanism is used to sequester ruthenium from solution. This active process helps prevent run-on chemical reactions occurring from the desired organic products of the reaction. These products usually contain and alkene or a conjugated diene moiety.

In one embodiment, the method for removing transition metals and/or transition metal complexes from a solution comprises: (a) contacting a solid supported, isocyanide-based system of the present disclosure with a solution containing or suspected to be containing a transition metal or transition metal complex under conditions that allows attachment of the metals to the solid supported system, and (b) removal of the system and therefore, sequestered transition metal and/or transition metal complex from solution (e.g. by filtration, etc.). In various embodiments, the source of said solution is from waste streams, pharmaceutical reactions, and/or industrial processes. In one embodiment, the solution is comprised of transition metals. In another embodiment, the solution is comprised of transition metal complexes. In some examples, contacting the solid supported, isocyanide-based system of the present disclosure occurs during the chemical reaction process. In other examples, the solid supported, isocyanide-based system of the present disclosure is contacted with the solution after the chemical reaction process has taken place. The method may be further comprised of one or more additional purification steps (e.g. column chromatography, filtration, etc.).

It was a surprising finding that isocyanides tethered to a solid support were able to sequester metals as effectively as they did. In general, solid-supported reagents do not work as well as homogeneous reagents because chemical reactions occur on a surface at the solution phase/solid phase interface which has less frequent successful collisions, leading to slower reactions.

In one aspect, the number of equivalents of solid supported, isocyanide-based system of the present disclosure used to remove transition metal (complex) from solution ranges from 1 to 500, including all values therebetween. In some embodiments, the use of isocyanide supports comprising bifurcated or trifurcated linkers and/or linkers of longer lengths, either/both of which have the ability to more efficiently capture metal, may enable the use of less (fewer equivalents) solid-supported isocyanide. For example, because of higher surface density, fewer equivalents of the reagent would be needed.

In one embodiment, the isocyanide-based system of the present disclosure is in contact with the solution containing transition metals or transition metal complexes for between 0.0167 (1 second) and 600 minutes, including all values therebetween. In another embodiment, the isocyanide-based system is in contact with the solution containing transition metals or transition metal complexes for less than 24 hours. The contact time may vary based on the transition metal or transition metal complex.

The isocyanide-based system of the present disclosure can sequester transition metal (complex) from solution at a wide range of temperatures. Although metal catalyzed and asymmetric metal catalyzed reactions are not commonly carried out at temperatures below room temperature, the isocyanide-based system of the present disclosure can remove transition metal (complex) at very low temperatures. In one embodiment the temperature at which the system and method are used is at least 0, 5, 10, 15, 20, 25, 30, 35, 40, 45, 50, 55, 60, 65, 70, 75, 80, 85, 90, 90, or 100 degrees Celsius. In one example, the system is used at room temperature. In another example, the system is used at reaction temperature. In yet another example, the system is used at approximately 50° C. or less. Lower temperatures (below 25 degrees Celsius) may require longer contact time. Some transition metals or transition metal complexes may require heating to force a ligand exchange reaction.

Chemical exchange and chemical reactions occurring between the solution phase and the surface of the support are slower than a chemical reaction occurring in solution. For example, the isocyanide quench of ruthenium carbenes using a homogeneous system, with KO2CCH2NC is instantaneous. As a result, longer periods of time are required for solution phase-solid phase reactions, typically between 30-45 min for optimal results; periods longer than that do not provide further benefits. The quantity of the supported reagent (30-60 equivalents) is used in about ten-fold excess compared to the quantity (4.4-8.8 equivalents) needed of the homogeneous isocyanide. The number of mole-equivalents is based on the catalyst used and based on the loading level of the silica gel. For Ru, the number is typically between 1.1 and 1.6 mmole/g. Quenching using the silica gel supported isocyanide can be conducted at the same temperature at which the metathesis reaction is conducted, for synthetic convenience. Temperatures of either room temperature (25° C.) or 80° C. were used with equal effectiveness.

The degree of removal of transition metal (complex) from solution using the system and method disclosed herein ranges from 85% to 100% including all percentages therebetween. In one embodiment, the degree of transition metal (complex) removal from solution is at least 88%, 89%, 90%, 91%, 92%, 93%, 94%, 95%, 96%, 97%, 98% or 99%. In a preferred embodiment, the degree of transition metal (complex) removal is at least 95%. In some embodiments, the degree of transition metal (complex) removal can be improved by contact (i.e. reaction) time or additional purification steps such as treatment with silica gel. In one example, after 30 min treatment, 94-99% Ru was removed by the isocyanide-based system of the present disclosure without any additional purification. Organic products are commonly purified further by techniques such as chromatography through silica gel. In another example, additional purification through silica gel removed 98% to complete removal of Ru residue from the sample.

In one embodiment, the degree of removal of transition metal (complex) from solution using the system and method disclosed herein can be measured in ppm of the transition metal (complex), wherein the ppm of the final solution (after contact with the system ranges from less than 1 ppm to 2000 ppm, including all values therebetween. In one embodiment, the ppm of the transition metal (complex) in solution following the application of the method disclosed herein is less 0.5, 1, 2, 4, 6, 8, 10, 20, 30, 40, 50, 75, 100, 200, 300, 400, 500, 750, 1000, 1500 or 2000.

After the metal sequestering material is contacted with the reaction mixture, and the metal sequestering material has been separated from the reaction mixture, the transition metals may then be removed from the metal sequestering material for re-use or recycling. In one embodiment, the transition metal and/or transition metal complex is recovered from the functionalized solid support following sequestration. Such recovery methods are well known in the art and include but are not limited to pyrometallurgical (e.g. smelting) processes.

In one aspect, the system and method can be used to remove transition metals and/or transition metal complexes from chemical reactions. This is a challenge because the binding ligand on the solid support must be accessible, have a high binding affinity for the metal and have high kinetic activity at the solid phase-solution interface. The system described here is able to effectively pull the metal complex out of solution and firmly anchor it to the support. Therefore, the system and method could be used to remove transition metal catalysts from reactions used in the chemical and pharmaceutical industries, where transition metal impurities in Active Pharmaceutical Ingredients are highly regulated due to risks to human health. One of the most highly used reactions for the preparation of pharmaceuticals are Pd-based cross couplings, such as the Suzuki reaction (Magano, 2011).

In one embodiment, the present method and system can be used to remove various transition metals. For example, removal of ruthenium using silica gel supported isocyanide is effective for the quench and removal of Ru from metathesis reactions. We observed that with 30 min treatment times, between 94.14-99.99% Ru was removed. In the best cases, this left 2-5 ppm Ru in the purified sample. Initial screening using the RCM stringency test found that the silica gel performed surprisingly well compared to the polystyrene based isocyanide reagents: no residual metathesis activity was found indicating a complete quench. In the same assay used to evaluate the prior homogeneous method, the reagent 2 performed comparably to the previous method, giving 0.66 ug/5 mg sample of residual Ru (132 ppm Ru). When combining a typical silica gel purification with the modified isocyanide silica gel quench, 0.01 ug Ru/5 mg organic sample was determined (<2 ppm residual Ru).

The addition of quenching agents that facilitate the removal of ruthenium catalysts and ruthenium by-products as in the present disclosure are attractive because they can be used with any of the commercially-available catalysts, thereby offering a general solution to a clean-up protocol. Although this system and method are useful for the removal of any Ru-based catalyst, such as those listed below, examples of available ruthenium carbene catalysts, known as the Grubbs catalysts, for which this system and method can remove are listed below. Thus, for example, the system and method are used to remove ruthenium (Ru) from a chemical reaction. Illustrative examples of Ru catalysts and their removal from solution are provided in Example 4. The whole catalyst can be removed in Ru applications. The removed isocyanide complex is a ruthenium complex which still has other ligands around it, with either two or three of them being isocyanides.

Some exemplary Ru complexes that can be removed include Ru in the 0, +2 and +4 formal oxidation state, neutral and cationic complexes: of the general formula Ia where L1 and L2 are any combination of ligand groups connected to the Ru atom through any combination of C, N, O, P, S atoms, whose ligand groups can be independent (general structure Ia) or interconnected by covalent bonds comprised of up to 5 atoms composed primarily of carbon atoms in alkyl chains or as part of arylene rings, possibly including N, O, P, S atoms, and chiral combinations thereof (general structure Ib) and where the X1 and X2 groups may be anionic ligands such as hydrides, halides, oxyalkyl or oxyaryl, carboxylates, phenolates and acrylates, SC(O)R, SC(S)R, or may be composed of a counteranion if the Ru-containing complex has a net positive charge, or X1, X2 may be 1 or 2 solvent molecule(s) such as CH2Cl2; or of the general formula II, of any possible stereochemistry, where L1, L2, L3, L4 are any combination of ligand groups connected to the Ru atom through any combination of C, N, O, P, S atoms, whose ligand groups can be independent (general formula IIa) or interconnected by covalent bonds (general formula IIb) comprised of up to 5 atoms composed primarily of carbon atoms in alkyl chains or as part of arylene rings, possibly including N, O, P, S atoms, and chiral combinations thereof, where L1 and L2 are defined as previously, but L3 and L4 are replaced by an arene group (such as seen in formula IIIa and IIIb), possibly lacking the L1 group or possibly lacking the L1 and L2 groups and where the X1 and X2 groups may be some combination of anionic ligands such as hydrides, halides, oxyalkyl or oxyaryl, carboxylates, phenolates and acrylates, SC(O)R, SC(S)R, any of which may be linked together in covalent bonding or lacking X2, or may be composed of a counteranion replacing one of the X groups; or of the general structure IV, bearing ligands L1 and L2 as defined above as independent groups (general structure IVa) or interconnected as defined above (general structure IVb) where X1-X4 groups may be hydrides, halides, oxyalkyl or oxyaryl, carboxylates, phenolates and acrylates, SC(O)R, SC(S)R, any of which may be bridging to bond to another ruthenium atom or another metal in a bimetallic complex, or may be lacking X4.

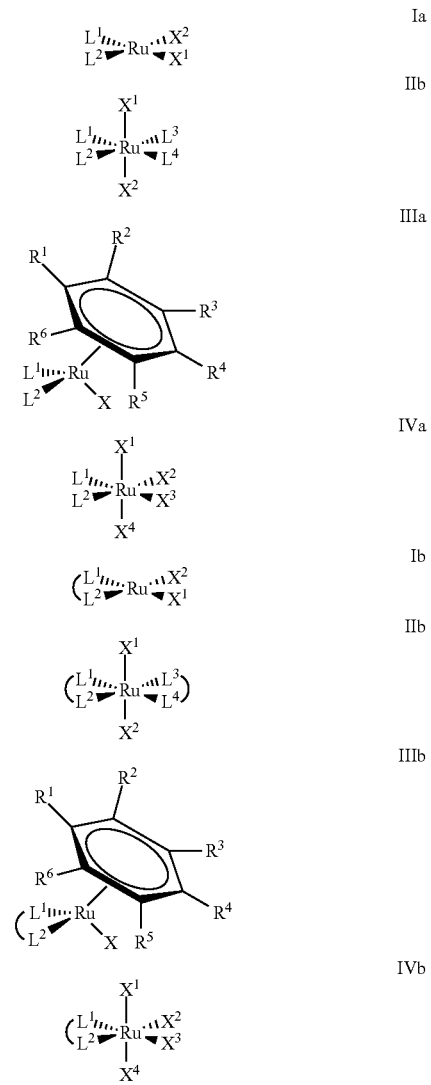

Example Ru catalysts include: RuOAc2(R-BINAP) or RuOAc2(S-BINAP), RuX2 with a chiral diphosphine ligand, CAS [192139-92-7] and derivatives, [RuCl2(p-cymene)]2(phosphine or diphosphine)RuCl(p-cymene), DIOP, SEGPHOS, PHANEPHOS, DuPHOS coordinated Ru(II)

species and Metal Carbene Olefin Metathesis Catalysts including ruthenium (II) dichloro (3-methyl-2-butenylidene) bis(tricyclopentylphosphine) (C716); ruthenium (II) dichloro (3-methyl-2-butenylidene) bis(tricyclohexylphosphine) (C801); ruthenium (II) dichloro(phenylmethylene) bis(tricyclohexylphosphine) (C823); ruthenium (II) (1,3-bis-(2,4,6-trimethylphenyl)-2-imidazolidinylidene) dichloro (phenylmethylene) (triphenylphosphine) (C830); ruthenium (II) dichloro phenylvinylidene) bis(tricyclohexylphosphine) (C835); ruthenium (II) dichloro (tricyclohexylphosphine) (o-isopropoxyphenylmethylene) (C601); ruthenium (II) (1,3-bis-(2, 4,6-trimethylphenyl)-2-imidazolidinylidene) dichloro (phenylmethylene) bis(3-bromopyridine) (C884); [1,3-bis-(2,4,6-trimethylphenyl)-2-imidazolidinylidene]dichloro(o-isopropoxyphenylmethylene)ruthenium(II) (C 627); [1,3-bis-(2,4,6-trimethylphenyl)-2-imidazolidinylidene] dichloro (benzylidene) (triphenylphosphine) ruthenium(II) (C831); [1,3-bis-(2,4,6-trimethylphenyl)-2-imidazolidinylidene] dichloro (benzylidene)(methyldiphenylphosphine)ruthenium(II) (C 769); [1,3-bis-(2,4,6-trimethylphenyl)-2-imidazolidinylidene]dichloro(benzylidene) (tricyclohexylphosphine)ruthenium(II) (C 848); [1,3-bis-(2, 4,6-trimethylphenyl)-2-imidazolidinylidene] dichloro(benzylidene) (diethylphenylphosphine) ruthenium(II) (C735); [1,3-bis-(2,4,6-trimethylphenyl)-2-imidazolidinylidene]dichloro(benzylidene)(tri-n-butylphosphine)ruthenium(II) (C 771); [1,3-bis-(2,4,6-trimethylphenyl)-2-imidazolidinylidene]dichloro(3-methyl-2-butenylidene)(triphenylphosphine) ruthenium(II) (C809); [1,3-bis-(2,4,6-trimethylphenyl)-2-imidazolidinylidene]dichloro(3-methyl-2-butenylidene)(methyldiphenylphosphine)ruthenium(II) (C747); [1,3-bis-(2,4,6-trimethylphenyl)-2-imidazolidinylidene]dichloro(3-methyl-2-butenylidene) (tricyclohexylphosphine) ruthenium(II) (C827); [1,3-bis-(2,4,6-trimethylphenyl)-2-imidazolidinylidene] dichloro(3-methyl-2-butenylidene)(diethylphenylphosphine) ruthenium(II) (C713); [1,3-bis-(2,4,6-trimethylphenyl)-2-imidazolidinylidene] dichloro (3-methyl-2-butenylidene) (tri-n-butylphosphine)ruthenium(II) (C749); [1,3-bis-(2,4,6-trimethylphenyl)-2-imidazolidinylidene] dichloro (phenylindenylidene) (triphenylphosphine) ruthenium(II) (C931); [1,3-bis-(2,4,6-trimethylphenyl)-2-imidazolidinylidene] dichloro (phenylindenylidene) (methyldiphenylphosphine) ruthenium(II) (C869); [1,3-bis-(2,4,6-trimethylphenyl)-2-imidazolidinylidene] dichloro (phenylindenylidene) (tricyclohexylphosphine) ruthenium (II) (C949); [1,3-bis-(2,4,6-trimethylphenyl)-2-imidazolidinylidene]dichloro(phenylindenylidene) (diethylphenylphosphine)ruthenium(II) (C835); and [1,3-bis-(2,4,6-trimethylphenyl)-2-imidazolidinylidene]dichloro (phenylindenylidene)(tri-n-butylphosphine)ruthenium(II) (C871).

In one embodiment, the system and method are used to remove palladium (Pd) from a chemical reaction. Illustrative examples of Pd catalysts and their removal from solution are provided in Examples 1 and 2. Some exemplary Pd complexes include Pd in both the Pd(0) and Pd(II) oxidation states of the following general formulae $PdX_2L^1L^2$ (general structure Ia) and $PdL^1L^2L^3L^4$ (general structure Ib) where X is an anionic ligand such as halides or carboxylates and any of the ligands $L^1L^2L^3L^4$ may equal four or less of the same or different ligands from the group of: phosphine ($R_3P$, $Ar_3P$ or $R_nP(Ar)_{3-n}$ where n=1-3); phosphinites ($(RO)_nPR_{3-n}$ (n=1,2,3)); phosphinimines (n=1,2,3)); amines $R_3N$ and aliphatic and aromatic diamines; diphosphines ($R_2P(CH_2)_nPR_2$ where R can be aryl or alkyl group and n=1-6; diphosphines linked through biphenyl (general structure II), binaphthylaromatic linkages (general structure III), or ferrocenyl aromatic subunits; 1,3-diarylimidazolium carbyl (general structure IV); 1,3-dialkylimidazolium carbyl; 1,3-alkylaryl imidazolium carbyl; 1,3-diarylimidazolidinium carbyl (general structure V); 1,3-dialkylimidazolidinium carbyl; 1,3-alkylarylimidazolidinium; 1,3-diarylbenzimidazolium carbyl (general structure VI); 1,3-dialkylbenzimidazolium carbyl; alkyl; aryl; and in situ formulations of Pd comprised of $PdX_2$ and L and L' ligands from the group described above, $Pd_2$(dibenzylideneacetone)$_3$ and L and/or L' ligands from the group described above, Pd(solvent)$_{2\ or\ 4}$ and L and L' ligands from the group described above.

II

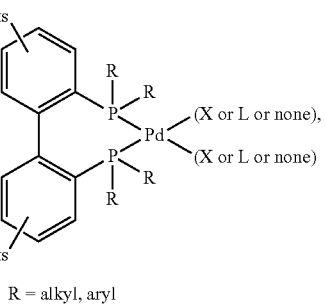

R = alkyl, aryl

III

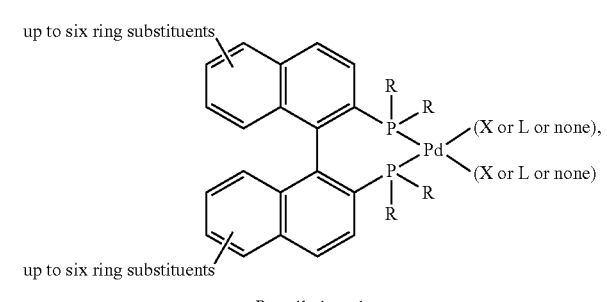

R = alkyl, aryl

IV

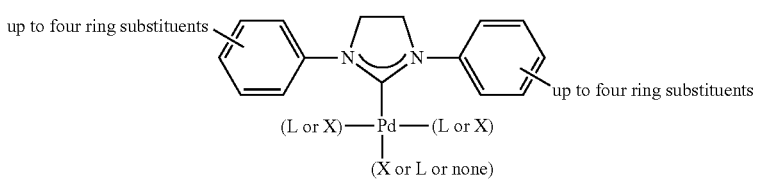

-continued

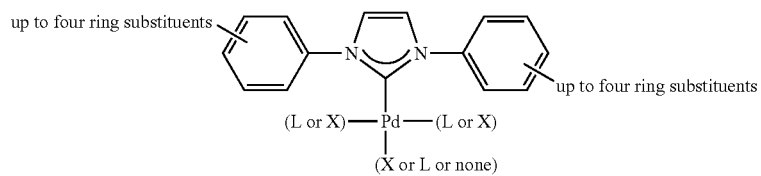

V

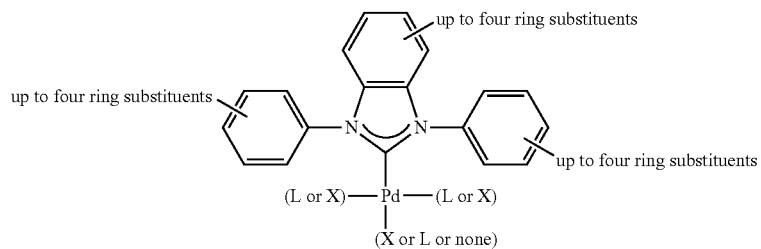

VI

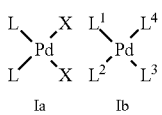

L = ligand such as phosphines, amines, etc. (see text)
X = anionic ligand such as a halide or carboxylates Further examples of Pd catalysts include:
bis(triphenylphosphine)palladium(II) dichloride, [1,1'-bis(diphenylphosphino)ferrocene]palladium(II) dichloride,
Bis(Dibenzylideneacetone)Palladium, Bis(Triphenylphosphine)Palladium(II) Chloride,
Bis(tri-tert-butylphosphine)palladium(0), Palladium Hydroxide, Palladium(II) Acetate,
Palladium(II) Bromide, Palladium(II) Nitrate, Tetrakis(Triphenylphosphine)Palladium(0),
Tris(Dibenylideneacetone)Dipalladium-Chloroform,
Tris(dibenzylideneacetone)dipalladium(0), Allylpalladium chloride dimer,
Bis(acetonitrile)palladium(II) chloride, Bis(benzonitrile)palladium(II) chloride, Palladium(II) chloride, Palladium(II) trifluoroacetate, Tetrakis(acetonitrile)palladium(II)tetrafluoroborate,
[1,2-Bis(diphenylphosphino)ethane]dichloropalladium(II), 1,1'-Bis(diphenylphosphino)ferrocenepalladium(II)dichloride dichloromethane adduct,
Bis(tricyclohexylphosphine)palladium(0), Bis(triphenylphosphine)palladium(II) acetate,
Bis [1,2-bis(diphenylphosphino)ethane]palladium(0), B is [tri(o-tolyl)phosphine]palladium(II)chloride, Dichlorobis(tricyclohexylphosphine)palladium(II) and trans-Benzyl(chloro)bis(triphenylphosphine)palladium(II).

Removal of palladium using silica gel supported isocyanide is effective for the removal of Pd(0) and Pd(II) species from solution. In an example, with 4 equivalents of 1, 99.9% Pd was removed within 24 hours (<1.0 ppm). In another example, 8 equivalents of 1 resulted in 5.4 ppm Pd after only 1 hour and 1.4 ppm (99.8% removal) after 4 hours.

In another example, the system and method are used to remove iridium (Ir) from an organic solution. Illustrative examples of Ir catalysts and their removal from solution are provided in Example 3. Some exemplary Ir complexes include Ir in the 0, +1 and +3 formal oxidation state, neutral and cationic complexes of the general formula I where L1 and L2 are any combination of ligand groups connected to the Ir atom through C, N, O, P, S atoms, whose ligand groups can be independent or interconnected by covalent bonds comprised of up to 5 atoms composed primarily of carbon atoms in alkyl chains or as part of arylene rings, possibly including N, O, P, S atoms, and chiral combinations thereof; the X group may be anionic ligands such as hydrides, halides, oxyalkyl or oxyaryl, carboxylates, phenolates and arylates or may be composed of a counteranion if the Ir-containing complex has a net positive charge, or X may be one or more alkenes, such as ethene or a diene such as 1,5-octadiene or of the general formula II, of any possible stereochemistry, where L1, L2, L3 are any combination of ligand groups connected to the Ir atom through C, N, O, P, S atoms, whose ligand groups can be independent or interconnected by covalent bonds comprised of up to 5 atoms composed primarily of carbon atoms in alkyl chains or as part of arylene rings, possibly including N, O, P, S atoms, and chiral combinations thereof, possibly lacking the L1 group or possibly lacking the L1 and L2 groups; the X1, X2 and X3 groups may be some combination of anionic ligands such as hydrides, halides, oxyalkyl or oxyaryl, carboxylates, phenolates and arylates any of which may be linked together in covalent bonding or lacking X2 or lacking X2 and X3, or may be composed of a counteranion replacing one of the X groups.

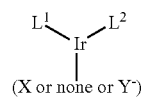

I

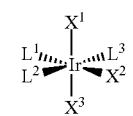

II

Example Ir catalysts include: Chloro(1,5-cyclooctadiene) iridium(I) Dimer, (1,5-Cyclooctadiene)(methoxy)iridium(I) Dimer, (Pentamethylcyclopentadienyl)iridium(III) Dichloride Dimer, Tribenzylphosphine(1,5-cyclooctadiene)[1,3-bis (2,4,6-trimethylphenyl)imidazol-2-ylidene], Iridium(I) hexafluorophosphate, Triphenylphosphine(1,5-cyclooctadiene)[1,3-bis(2,4,6-trimethylphenyl)imidazol-2-ylidene], Iridium(I) hexafluorophosphate, Tris(dimethylphenylphosphine)(1,5-cyclooctadiene)[1,3-bis(2,4,6-trimethylphenyl), Imidazol-2-ylidene]iridium(I) hexafluorophosphate, 1,5-Cyclooctadiene{[dibenzyl((4R,5R)-5-methyl-2-phenyl-4,5-dihydro-4-oxazolypmethyl]diphenylphosphinite κN:κP}iridium(I) tetrakis(3,5-bis(trifluoromethyl)phenyl) borate, 1,5-Cyclooctadiene{[dibenzyl((4S,5S)-5-methyl-2-phenyl-4,5-dihydro-4-oxazolyl)methyl]diphenylphosphinite κN:κP}iridium(I) tetrakis(3,5-bis(trifluoromethyl)phenyl) borate, 1,5-Cyclooctadiene{[dibenzyl((4R,5R)-5-methyl-2-phenyl-4,5-dihydro-4-oxazolyl)methyl] dicyclohexylphosphinite κN:κP}iridium(I) tetrakis(3,5-bis(trifluoromethyl) phenyl)borate, 1,5-Cyclooctadiene{[dibenzyl((4S,5 S)-5-methyl-2-phenyl-4,5-dihydro-4-oxazolyl)methyl] dicyclohexylphosphinite κN:κP}iridium(I) tetrakis(3,5-bis (trifluoromethyl)phenyl)borate, $[Ir(COD)Cl]_2$, $Ir/CaCO_3$, $Ir/Al_2O_3$ and Ir/C.

In yet another example, the system and method are used to remove rhodium (Rh) from a chemical reaction. Illustrative examples of Rh catalysts are the following: $L_3RhX$ where L=Ph3P, triarylphosphine, trialkylphosphine, etc. and X=halide, and cationic variants, where the X group is replaced with a positive charge and a counter anion. Any cationic Rh catalyst, preferably with chiral phosphine or chiral diphosphine ligands: [Rh cod (R)-Phanephos]BF4, [849950-56-7], [Rh cod (R)-PPhos]BF4 [573718-56-6], [Rh ((S)-Binap)2]BF4 [98302-53-5],(S)-[Rh COD TCFP]BF4 [705945-68-2], [Rh cod DiPFc] BF4 [255064-36-9], [Rh cod (S)-Xyl-Phanephos]BF4 [880136-41-4], [Rh cod (S)-Phanephos] O3SCF3 [200808-74-8], etc. Lantern-type dirhodium complexes of type Rh2L4 and Rh2L3L' where the L group is a carboxylate, carboxamide either bearing chiral substituents or without them. Some examples of such catalysts include dirhodium(II) tetrakis[N-tetrafluorophthaloyl-(S)-tert-leucinate], dirhodium(II) tetrakis[N-phthaloyl-(S)-tert-leucinate], dirhodium(II) tetrakis[N-tetrachlorophthaloyl-(S)-tert-leucinate] and those with (R) or (S)-configuration derived from amino acids where the R group can be Ph, Me, iPr, adamantyl, etc.

In another embodiment, the system and method are used to remove platinum (Pt) from solution. Illustrative examples of Pt catalysts are the following: PtX2 where X=halide, PtX2L2 where X=halide, acetate or other anionic ligand and L is a triaryl- or trialkylphosphine, Pt(PR3)2, X2Pt(1,5-cyclooctadiene) where X=a halide, X2Pt(NH3)2, X2Pt (NHR)2, PtX4, Pt(NH3)4, Pt(NHR)4 where R=alkyl or aryl and LPtX where L contains a N-heterocyclic carbene ligand.

Other examples of metal catalysts used in metal catalyzed reactions in which the present methods can be used include metal carbene olefin catalyst that may be a Group 8 transition metal complex having the structure of formula (I).

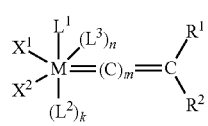

(I)

In formula (I), M is a Group 8 transition metal; $L^1$, $L^2$, and $L^3$ are neutral electron donor ligands; n is 0 or 1, such that $L^3$ may or may not be present; m is 0, 1, or 2; k is 0 or 1; $X^1$ and $X^2$ are anionic ligands; and $R^1$ and $R^2$ are independently selected from hydrogen, hydrocarbyl, substituted hydrocarbyl, heteroatom-containing hydrocarbyl, substituted heteroatom-containing hydrocarbyl, and functional groups, wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support.

Other catalysts that may be used in reactions disclosed herein include First Generation Grubbs-type catalysts, Second Generation Grubbs-type catalysts, "Grubbs-Hoveyda" catalysts, other transition metal carbine complexes, Group 8 transition metal complexes, or Group 8 transition metal complexes with a Schiff base ligand. These other transition metal carbine complexes may include neutral ruthenium or osmium metal carbene complexes containing metal centers that are formally in the +2 oxidation state, have an electron count of 16, and are penta-coordinated; neutral ruthenium or osmium metal carbene complexes containing metal centers that are formally in the +2 oxidation state, have an electron count of 18, and are hexa-coordinated; cationic ruthenium or osmium metal carbene complexes containing metal centers that are formally in the +2 oxidation state, have an electron count of 14, and are tetra-coordinated; and cationic ruthenium or osmium metal carbene complexes containing metal centers that are formally in the +2 oxidation state, have an electron count of 14 or 16, and are tetra-coordinated or penta-coordinated, respectively.

Other catalysts include hydrogenation catalysts (such as those using Ru, Ir, or Rh), asymmetric hydrogenation catalysts (such as those using Ru, Ir, or Rh), catalysts useful in ROMP reactions, and/or in other metathesis reactions, such as ring-closing metathesis, cross metathesis, ring-opening cross metathesis, self-metathesis, ethenolysis, alkenolysis, acyclic diene metathesis polymerization, and combinations thereof.

Additionally, Schrock well defined molybdenum and tungsten catalysts also may be used. These include atalysts described in Schrock, R. R. *Chem. Rev.* 2009, 109, 3211; Hartford, B. *Chemical & Engineering News*, "Z-Selective Metathesis of Macrocycles", Volume 89, Issue 45, Nov. 7, 2011, page 11; Yu, M.; Wang, C.; Kyle, A. F.; Jakubec, P.; Dixon, D. J.; Schrock, R. R.; Hoveyda, A. H. *Nature*, Nov. 3, 2011, 479, 88, each of which is incorporated by reference.

In general, the transition metal complexes used as catalysts herein can be prepared by several different methods, such as those described by Schwab et al. (1996) *J. Am. Chem. Soc.* 118:100-110, Scholl et al. (1999) *Org. Lett.* 6:953-956, Sanford et al. (2001) *J. Am. Chem. Soc.* 123: 749-750, U.S. Pat. Nos. 5,312,940, and 5,342,909, the disclosures of each of which is incorporated herein by reference. Also see U.S. Pat. Pub. No. 2003/0055262 to Grubbs et al., WO 02/079208, and U.S. Pat. No. 6,613,910 to Grubbs et al., the disclosures of each of which is incorporated herein by reference. Preferred synthetic methods are described in WO 03/11455A1 to Grubbs et al., the disclosure of which is incorporated herein by reference.

By removing transition metals or transition metal complexes from metal catalyzed reactions, reaction product compositions which are free of transition metals or transition metal complexes are obtained. The method described in this disclosure is useful in the synthesis of a variety of reaction products including pharmaceuticals, drug candidates, supplements, bioactive compounds, or diagnostic agents.

In an embodiment this disclosure also provides a kit. This kit includes the metal sequestering material and instructions for use. The metal sequestering material has a support, a linker bound to the support, and at least one isocyanide bound to the linker. The instructions may include a description and conditions for use and may provide a listing or guidance regarding which metal catalyst the material is suitable for.

The methods described in this disclosure may also be used to remove transition metals and/or transition metal complexes from effluents, from waste treatment processes and the like. These processes could be useful for metal recovery and/or purification or decontamination of effluent which contains transition metals.

Throughout this application, the singular form may encompass the singular and plural forms and the plural form may likewise encompass both the singular and plural forms.

The following examples further describe the invention. These examples are provided for illustrative purposes and are not to be construed as limiting.

Experimental Details

Synthesis of Isocyanide Grafted Silica Gel. Following a previously reported procedure, to an oven-dried 50 mL round bottom flask was added 31.6 mL (135 mmol, 30 g 1 equivalents) of (3-aminopropyl)triethoxysilane (APTES), the solution was cooled to 0° C. using an ice bath. To the cooled solution was then added 10.9 mL (135 mmol, 10 g, 1 equivalents) of ethylformate over 30 minutes. After the addition, the reaction was then removed from the ice bath and allowed to warm to room temperature over 30 minutes at which point it was placed in a pre-heated oil bath at 60° C. for 2 h. The reaction was then removed from the oil bath and left at room temperature overnight. The following day any unreacted ethyl formate was distilled off along with the ethanol co-product. The resulting clear oil was collected in 97% yield, and provided spectra which was in good agreement with previously reported data. $^1$H NMR (500 MHz, CDCl$_3$): δ (major isomer) 8.16 (s, 1H), 6.23 (br s, 1H), 3.81 (q, J=7.5 Hz, 6H), 3.30 (q, J=6.5 Hz, 2H), 1.69-1.63 (m, 3H), 1.24 (t, J=7.0 Hz, 9H), 0.67-0.61 (m, 2H).

By analogy to a previously reported procedure, to an oven-dried 250 mL 3-neck round bottom flask, under nitrogen, was added 20 g (80 mmol, 1 equivalent) of formamide S1, and 55.6 mL (400 mmol, 5 equivalents) of triethylamine to 100 mL of THF and cooled to −78° C. To the reaction was then added 9.0 mL (96 mmol, 1 equivalent) of POCl$_3$ as a solution in 45 mL of THF. The solution was added dropwise over 30 minutes and then left to stir for an additional 30 minutes at −78° C. The reaction was then placed in an ice bath and left for an hour, at which time 100 mL of ice water was slowly added to the reaction. The reaction was then extracted with copious amounts of diethyl ether (3×100 mL). The organic extracts were combined and dried over 3 A molecular sieves, and then concentrated in vacuo (rotary evaporator) to afford an orange-red oil. The oil was then purified over a short plug (3×10 cm) of dried silica gel and eluted with 20% diethyl ether in hexanes to afford 16.6 g (89%) of isocyanide 1 as a clear oil with spectra in good agreement with what was previously reported in the literature.[1] $^1$H NMR (500 MHz, CDCl$_3$): δ 3.84 (q, J=7.0 Hz, 6H), 3.42-3.39 (m, 2H), 1.82-1.76 (m, 3H), 1.25 (t, J=7.0 Hz, 9H), 0.75-0.72 (m, 2H).

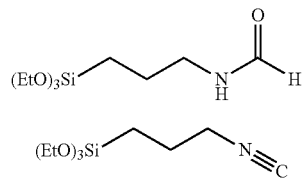

This procedure was adapted from one which was previously reported,[1] to a 250 mL round bottom flask was added 50 mL of freshly distilled toluene, 3.5 g of dried silica gel (48 h, 140° C.), and 0.7 mL (5 mmol) of triethylamine To the vigorously stirred suspension was added 9.7 g (42 mmol) of isocyanide 1 and the reaction was placed in a preheated oil bath at 80° C. and left to react for a 12 h period. Then the reaction was removed from the oil bath and allowed to cool to room temperature. The silica gel was collected on a medium porosity filter frit and washed with 100 mL of freshly distilled toluene and 100 mL of diethyl ether. The silica gel was then dried in vacuo for 24 h.

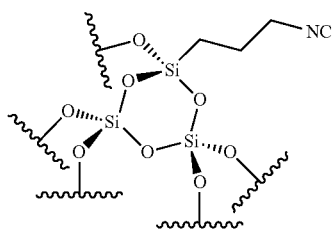

Example 1

Removal of Pd from Solution

Methods. To a 20 dram vial was added 35 mg (0.049 mmol) of PdCl$_2$(PPh$_3$)$_2$ and 10 mL of THF. The solution was stirred for 5 minutes until fully dissolved. Once the complex was fully dissolved, 500 mg (16 equivalents) of isocyanide containing silica gel was added and almost immediately a color change from bright yellow to clear was observed. The solution was stirred for 30 minutes at room temperature at which point the silica gel was removed by filtration through a medium porosity filter frit. The remaining silica gel was washed with another 10 mL of THF. The organic fractions were combined and concentrated en vacuo (roto evaporator) in a pre-weighed vial. The concentrated eluent was found to contain 19 mg (0.072 mmol, 1.5 equiv) of triphenylphosphine being displaced from the metal center.

Example 2

Removal of Pd from Solution

Figure 9:
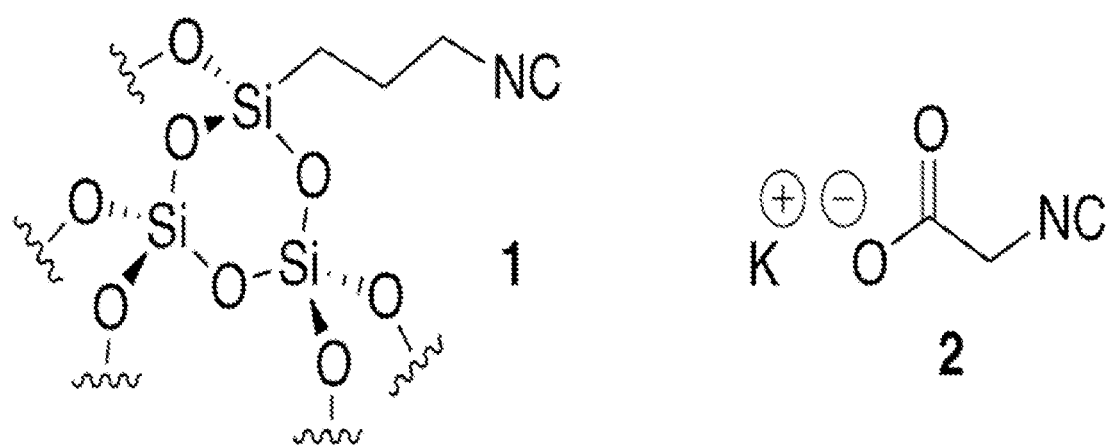
FIG. 9. Isocyanide-Containing Reagents Used as Palladium Scavengers.

We investigated Pd removal using both a isocyanide-grafted silica gel 1 and a homogeneous (soluble) isocyanide 2 (FIG. 9). The numerical designations of compounds, intermediates, etc. in this example intentionally differ from those used in elsewhere in this application.

As an initial evaluation of the solid-supported isocyanide, two different solutions of Pd complexes were treated with the silica gel and the residual Pd concentration determined after various time intervals. Two solutions, each containing known concentrations of Pd(PPh$_3$)$_4$ and Pd(OAc)$_2$ were made to evaluate the removal of Pd(0) and Pd(II) species. Each solution was treated with 4 and 8 equivalents of isocyanide-grafted silica gel 1 and allowed to stir at room temperature. After allowing the isocyanide-grafted silica gel 1 to settle, aliquots were removed at 1, 4, and 24 hour intervals after addition of isocyanide-grafted silica gel 1, and analyzed for Pd using a digestion protocol and inductively-coupled plasma mass spectrometry (ICP-MS).

Figure 10:
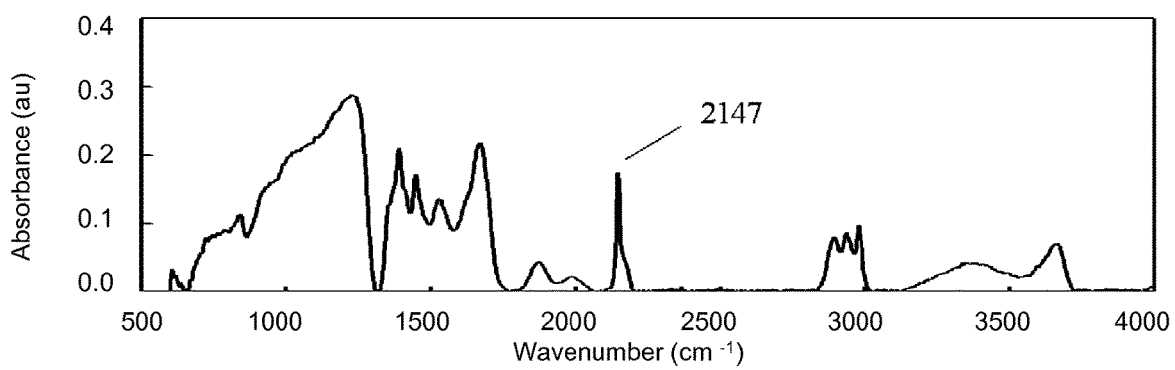
FIG. 10. Reflectance IR Spectrum of (a) Silica Gel 1; (b) Silica Gel 1-$Cl_2Pd(PPh_3)_2$ and (c) Overlay Expansion of the Isocyanide Region (2100-2300 $cm^{-1}$) from (a) and (b). Spectra were obtained for single silica gel particles using a MCT detector, 80 μm×80 μm area, 128 scans, 4 $cm^{-1}$ resolution. The peak at 2147 $cm^{-1}$ is assigned to the silica gel bound isocyanide and the new peak at 2231 cm–1 is assigned to an isocyanide bonded to Pd(II).
Figure 10:
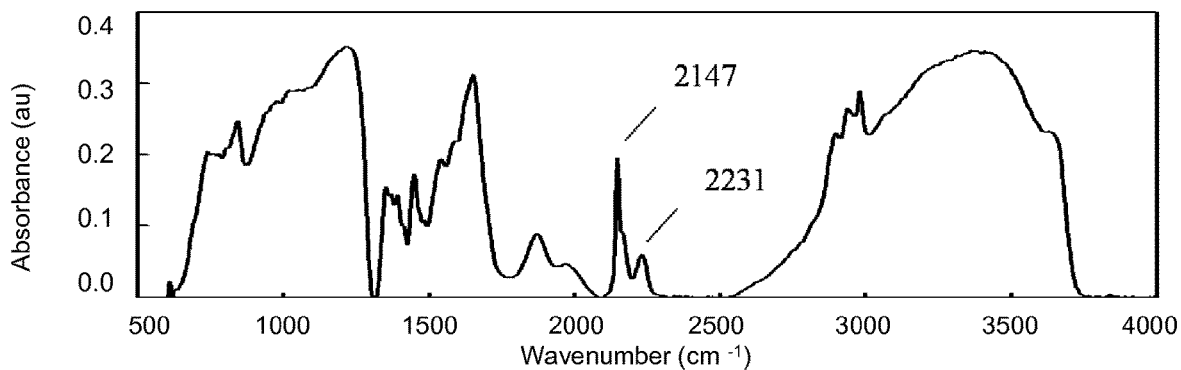
Figure 10:
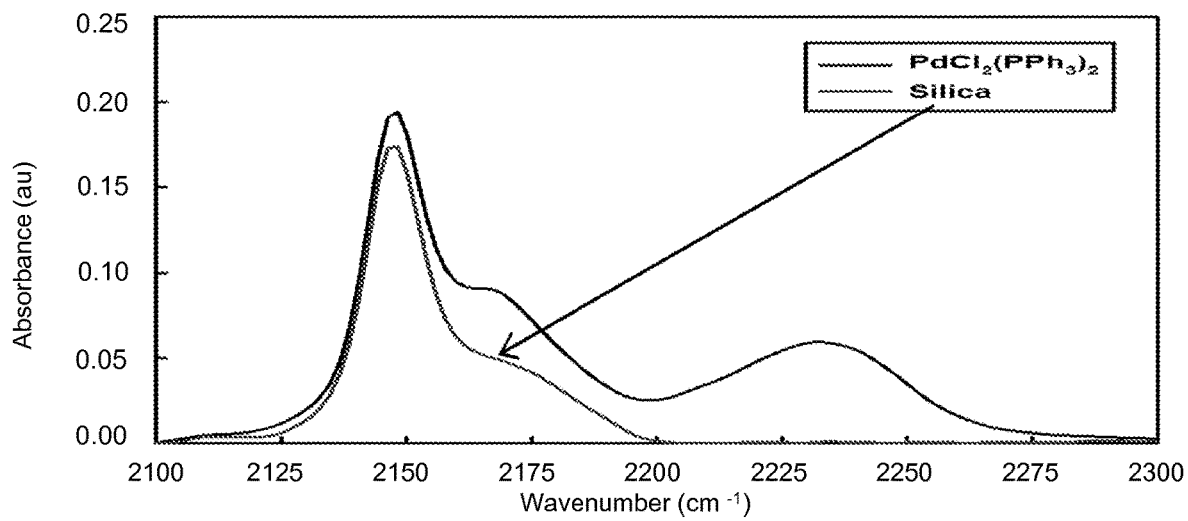

First, the isocyanide-grafted silica gel 1 was evaluated for the removal of
Pd(II) using a solution of Pd(OAc)$_2$ in toluene with an initial concentration of 1227.6 ppm Pd (FIG. 10). With 4 equivalents of isocyanide-grafted silica gel 1, a 24 h period was required to reach less than 1.0 ppm (99.9% Pd removed). For a reaction that used 5 mol % Pd catalyst, 20 mol % isocyanide-grafted silica gel 1 was needed. With 8 equivalents of isocyanide-grafted silica gel 1, there was faster capture of Pd; after only 1 h, there was 5.4 ppm Pd and after 4 h, 1.4 ppm Pd was reached (99.8% Pd removed). Without being bound by any theory, most likely the use of fewer equivalents of isocyanide-grafted silica gel 1 requires recruitment of isocyanides that may be less available on the surface of the material. When higher loading of the isocyanide silica gel is used, a greater fraction of surface accessible isocyanides may account for the faster rate of Pd binding, without being bound by any theory.

Next, isocyanide-grafted silica gel 1 was evaluated for the removal of Pd(0) from a stock solution of Pd(PPh$_3$)$_4$ in toluene. Interestingly, isocyanide-grafted silica gel 1 reduced Pd levels more quickly for Pd(0) as compared to Pd(II). Moreover, there was a less dramatic difference in Pd removal using 4 or 8 equivalents of isocyanide-grafted silica gel 1. To illustrate the difference between use of 4 and 8 equivalents, an expansion of the region from 0-100 ppm is shown; the starting value of 1227 ppm Pd is off scale (FIG. 10b). Only 4 equivalents of isocyanide-grafted silica gel 1 resulted in 99.0% removal of Pd after 1 h (11.9 ppm). A longer treatment period (>4 h) brought Pd levels below 2 ppm. Use of 8 equivalents of isocyanide-grafted silica gel 1 was somewhat more effective at the shorter time periods, but both 4 and 8 equivalents of isocyanide-grafted silica gel 1 could reach >99.8% Pd removal after a 24 h period.

Since screening showed promising results, the isocyanide scavengers were evaluated in a standard Suzuki coupling (Table 4). After the cross coupling was complete, several different treatment conditions were investigated. To establish a benchmark, the crude reaction was passed through celite (Table 4, entry 1). With a potential concentration of Pd as high as 15965 ppm in the crude product, the celite treatment was found to remove a significant fraction of Pd from the nonpolar product 3. In all of these cases, ppm Pd reported in the Tables is the amount of Pd detected in the crude, evaporated organic product (after removal of reaction solvent). Thus, the ppm Pd is not the concentration of Pd in the diluent made for the analytical determination. After only 4 h, 8 equivalents (24 mol %) of isocyanide-grafted silica gel 1 removed 99.998% Pd after simple filtration (fritted filter funnel) to remove the silica gel (entry 2); 16 equivalents (48 mol %) of isocyanide-grafted silica gel 1 was more effective (entry 3). After 4 h, 8 equivalents of isocyanide-grafted silica gel 1 could be removed by column chromatography through silica gel, which was found to remove 99.999% Pd (entry 4). In entries 2-5, there was no pretreatment with celite, which bodes well for silica gel-based recovery of expensive Platinum Group Metals. Purification through chromatography through silica gel is desirable for small-scale reactions, but stirring over isocyanide-grafted silica gel 1 followed by filtration is preferred in large-scale reactions where there are few by-products.

The homogeneous isocyanide KO$_2$CCH$_2$NC was also highly effective for the removal of residual palladium from the Suzuki reaction, when combined with silica gel chromatography (Table 4, entry 5). Previously (Galan et al, 2007—reference 2), our lab had shown that the solution-based isocyanide was effective for the removal of ruthenium metal from metathesis reactions. With this solution-based method, it was necessary to use column chromatography to remove the resulting polar (isocyanide)palladium complex (es) formed. Entry 5 shows that sub ppm levels of Pd could be attained rapidly using 5 equivalents of KO$_2$CCH$_2$NC. To the best of our knowledge, this commercially-available isocyanide has not been previously shown to remove Pd from a cross coupling reaction.

TABLE 4

Removal of Palladium from a Suzuki Reaction

PhB(OH)$_2$  Pd(PPh$_3$)$_4$ (3.0 mol %)  K$_2$CO$_3$, PhCH$_3$  80° C., 2 h; treatment

3

| Entry | Treatment[a] | Time/h | Chrom? | Pd/ppm[b] | % Pd removed |
|---|---|---|---|---|---|
| 1 | celite filtration | n/a | n/a | 143.79 | 99.099 |
| 2 | 1 (8 equiv) | 4 | no | 0.21 | 99.999 |
| 3 | 1 (16 equiv) | 4 | no | 0.02 | 99.999 |
| 4 | 1 (8 equiv) | 4 | yes | 0.08 | 99.999 |
| 5 | 2 (5 equiv) | 1 | yes | 0.35 | 99.998 |

[a]Equivalents of isocyanide are based on catalyst loading: e.g. 8 equiv 1 amounts to 24 mol % 1.
[b]Pd concentration before treatment was 15,959 ppm.

Removal of Pd from more polar products of Suzuki cross coupling is more difficult, but possible with isocyanides. Cross coupling of 3-bromopyridine with phenyl boronic acid produced biaryl 4 which is capable of coordination to Pd (Table 5). In this case, celite was not effective, where only 32.1% Pd was removed (entry 1). At the completion of the reaction, a significant fraction of palladium was still soluble and could not be removed by celite. Direct column chromatography, without the addition of a metal scavenger, removed 99.5% Pd (entry 2). However, 94 ppm residual Pd was still quite high, and left a yellow colored product. Addition of isocyanide-grafted silica gel 1 and filtration removal (fritted filter funnel using a medium porosity frit) using 8 and 16 equivalents of isocyanide-grafted silica gel 1 reduced the Pd impurity levels to 23.29 and 14.26 ppm (entries 3, 4). Use of the homogeneous isocyanide reagent along with silica gel chromatography (entry 5) achieved similar results to 16 equivalents of isocyanide-grafted silica gel 1 (entry 4).

TABLE 5

Removal of Palladium from a Suzuki Reaction with Pd(0)

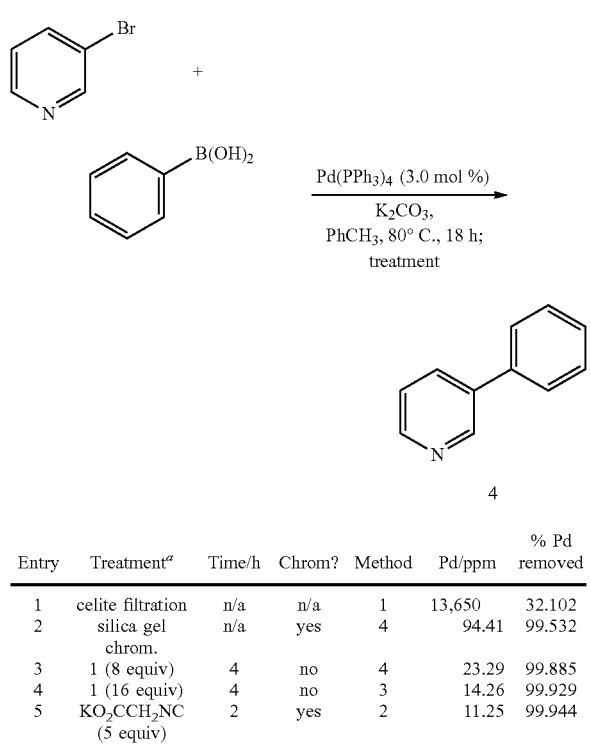

| Entry | Treatment[a] | Time/h | Chrom? | Method | Pd/ppm | % Pd removed |
|---|---|---|---|---|---|---|
| 1 | celite filtration | n/a | n/a | 1 | 13,650 | 32.102 |
| 2 | silica gel chrom. | n/a | yes | 4 | 94.41 | 99.532 |
| 3 | 1 (8 equiv) | 4 | no | 4 | 23.29 | 99.885 |
| 4 | 1 (16 equiv) | 4 | no | 3 | 14.26 | 99.929 |
| 5 | KO$_2$CCH$_2$NC (5 equiv) | 2 | yes | 2 | 11.25 | 99.944 |

[a]Equivalents of isocyanide are based on catalyst loading: e.g. 8 equiv 1 amounts to 24 mol % 1.

In a polar product, isocyanides effectively removed Pd when a different Pd(II) precatalyst was used (Table 6). Celite was ineffective (entry 1) and silica gel chromatography, on its own, reduced Pd to 470 ppm (entry 2). Treatment with 8 or 16 equivalents of isocyanide-grafted silica gel 1 led to 39.56 and 7.8 ppm Pd (entries 3,4). This data shows some variance in the effectiveness of Pd removal, but a bed filtration purification of the crude product using 16 equivalents of silica 1 brought Pd levels below 10 ppm. The solution phase reagent KO$_2$CCH$_2$NC, combined with flash chromatography, was less effective (entry 5).

TABLE 6

Removal of Palladium from a Suzuki Reaction with Pd(II)

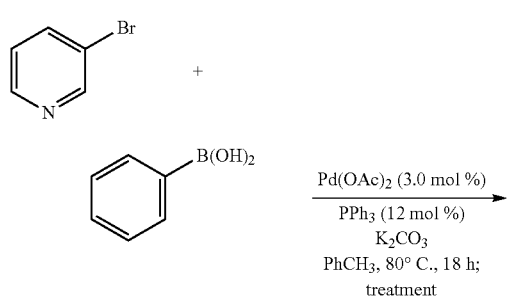

TABLE 6-continued

| Entry | Treatment[a] | Time/h | Chrom? | Method | Pd/ppm | % Pd removed |
|---|---|---|---|---|---|---|
| 1 | celite filtration | n/a | n/a | 1 | 5404 | 73.119 |
| 2 | silica gel chrom. | n/a | yes | 4 | 470.99 | 97.668 |
| 3 | 1 (8 equiv) | 4 | no | 4 | 39.56 | 99.804 |
| 4 | 1 (16 equiv) | 4 | no | 3 | 7.83 | 99.961 |
| 5 | KO$_2$CCH$_2$NC (5 equiv) | 2 | yes | 2 | 111.48 | 99.445 |

[a]Equivalents of isocyanide are based on catalyst loading: e.g. 8 equiv 1 amounts to 24 mol % 1.

The same series of treatment conditions revealed that the isocyanide-grafted silica gel 1 was best for removal of Pd from the product of a Heck reaction. In this case, Pd(II) was employed as the precatalyst and the reaction was conducted over an 18 h period. Celite proved moderately effective (Table 7, entry 1). Isocyanide-grafted silica gel 1 reduced Pd levels significantly using a 4 h treatment time followed by simple filtration to remove the silica gel (entries 2,3). Use of silica gel chromatography offered only a slight improvement in this case (entry 4). The homogeneous isocyanide KO$_2$CCH$_2$NC, when followed by silica gel chromatography, gave 99.95% Pd removal (entry 5).

TABLE 7

Removal of Palladium from a Heck Reaction

| Entry | Treatment[a] | Time/h | Chrom? | Method | Pd/ppm | % Pd removed |
|---|---|---|---|---|---|---|
| 1 | celite filtration | n/a | n/a | 1 | 34.65 | 99.853 |
| 2 | 1 (8 equiv) | 4 | no | 4 | 0.37 | 99.998 |
| 3 | 1 (16 equiv) | 4 | no | 4 | 1.45 | 99.994 |

TABLE 7-continued

| 4 | 1 (8 equiv) | 3 | yes | 3 | 0.83 | 99.997 |
| 5 | KO$_2$CCH$_2$NC (5 equiv) | 2 | yes | 2 | 11.69 | 99.951 |

[a]Equivalents of isocyanide are based on catalyst loading: e.g. 8 equiv 1 amounts to 40 mol % 1.

Palladium removal with isocyanide scavengers also worked for the widely-used Buchwald-Hartwig amination. We investigated a representative of this reaction because of its widespread use, because of the unique Pd ligand system employed, due to the elevated reaction temperatures and due to the potential of the substituted aniline products to bind and retain Pd. This latter issue may complicate Pd removal making purification difficult, especially in anilines that are more heavily adorned with polar and/or coordinating functional groups. Simple filtration through celite was ineffective, leaving high levels of residual Pd (Table 8, entry 1). Isocyanide-grafted silica gel 1 reduced Pd levels to less than 3 ppm Pd using a 4 h treatment time and simple filtration (entries 2,3). Use of isocyanide-grafted silica gel 1 combined with column chromatography removed 99.999% Pd and reduced Pd levels to below 1 ppm (entry 4). The homogeneous isocyanide KO$_2$CCH$_2$NC, when followed by silica gel chromatography, registered 0.5 ppm Pd, for 99.999% removal (entry 5).

TABLE 8

Removal of Palladium from a Buchwald-Hartwig Reaction

| Entry | Treatment[a] | Time/h | Chrom? | Method | Pd/ppm | % Pd removed |
|---|---|---|---|---|---|---|
| 1 | celite filtration | n/a | n/a | 1 | 4146 | 83.489 |
| 2 | 1 (8 equiv) | 4 | no | 4 | 1.52 | 99.994 |
| 3 | 1 (16 equiv) | 4 | no | 4 | 2.35 | 99.991 |
| 4 | 1 (8 equiv) | 3 | yes | 3 | 0.60 | 99.998 |
| 5 | KO$_2$CCH$_2$NC (5 equiv) | 2 | yes | 2 | 0.50 | 99.998 |

[a]Equivalents of isocyanide are based on catalyst loading: e.g. 8 equiv 1 amounts to 40 mol % 1.

Figure 12:
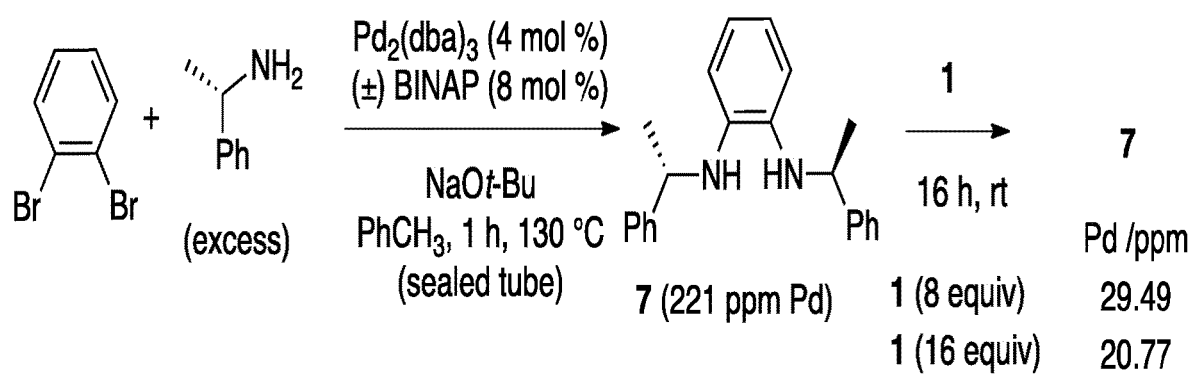
FIG. 12. Removal of Palladium from the Product of a Double Buchwald-Hartwig Amination.

The isocyanides were able to remove Pd from very polar, chelating diamine products obtained through Buchwald-Hartwig aminations (FIG. 12). The double Buchwald-Hartwig reaction of amines onto 1,2-dibromobenzene provides a key step to build benzimidazoles and benzimidazolium ring systems. As an intermediate used in heterocycle synthesis, the diamine 7 is typical of intermediates that might be encountered in the synthesis of pharmaceuticals and drug candidates. The 1,2-benzenediamine 7 is capable of bidentate coordination to Pd, which was expected to make Pd removal more difficult. In this case, we isolated crude 7, which was found to be contaminated with 221 ppm Pd. In this very challenging case, subsequent mixing of a toluene solution of the crude diamine 7 with 8 or 16 equivalents of isocyanide-grafted silica gel 1 for 16 hours at room temperature followed by filtration resulted in similar tenfold reduction of residual palladium in the diamine 7 without the added step of column chromatography. In these more challenging cases, higher equivalences of isocyanide-grafted silica gel 1 is the most desirable for Pd removal.

Figure 13:
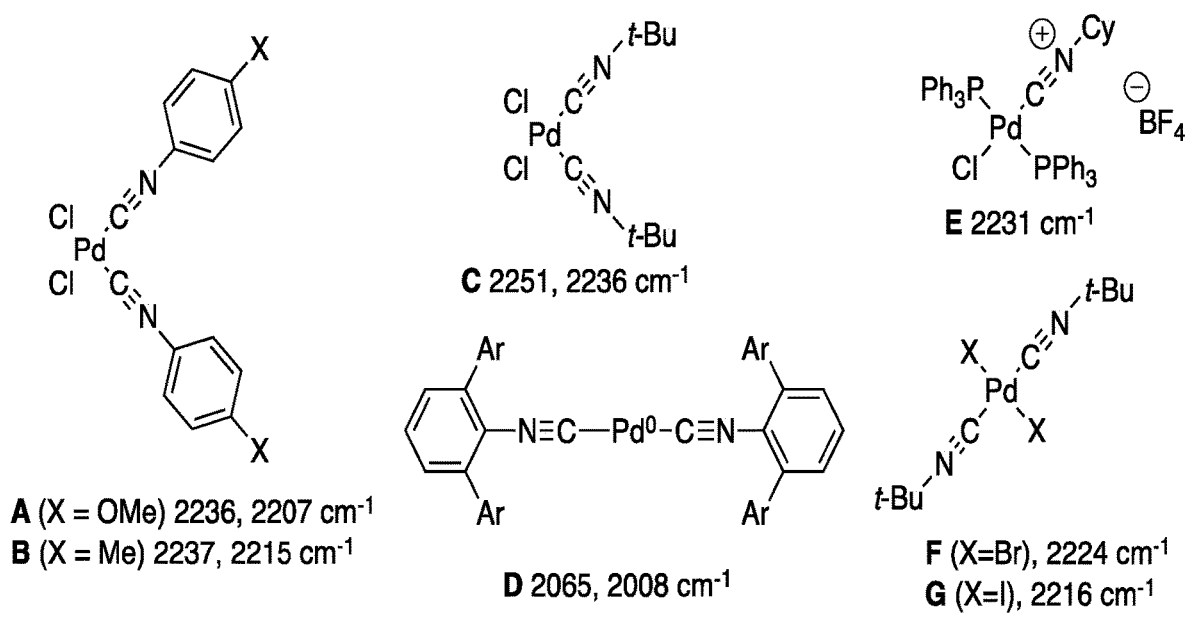
FIG. 13. Literature Examples of Pd Isocyanide Complexes.
Figure 14:
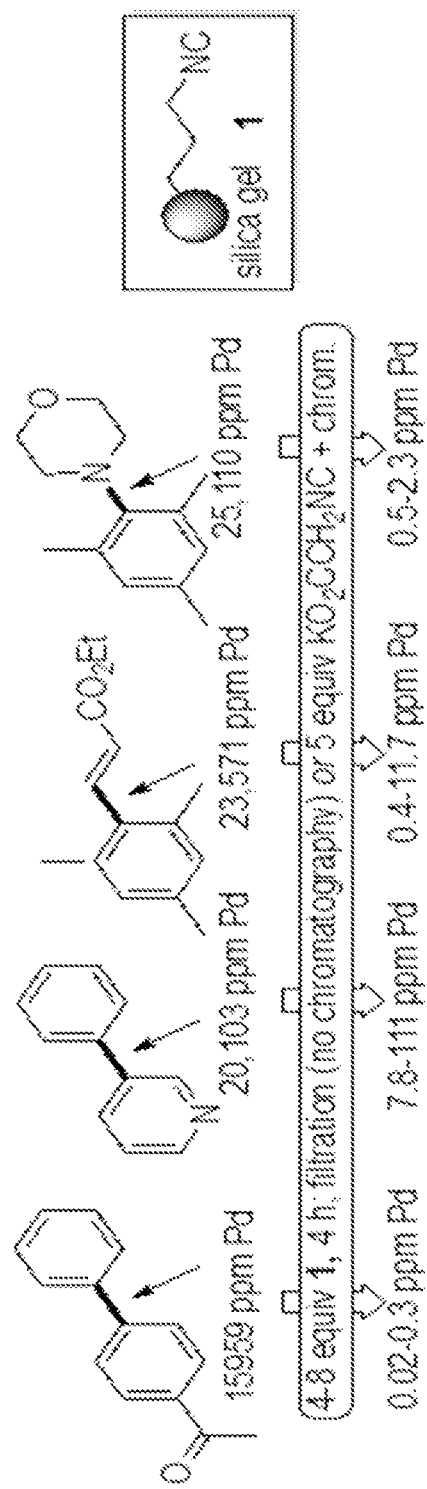
FIG. 14. Isocyanide reagents removed residual Pd from Suzuki, Heck and Buchwald-Hartwig cross couplings to sub ppm levels.

Isocyanide complexes of Pd(II) and Pd(0) are documented in the literature. For example, Angelici et al. (*Inorg. Chem.* 1988, 27, 85) prepared cis-Cl$_2$Pd(CNR)$_2$ in a displacement reaction starting from Cl$_2$Pd(NCCH$_3$)$_2$. Ito and coworkers (*J. Org. Chem.* 1991, 56, 1948) used a Pd(OAc)2-t-octylisocyanide catalyst system, thought to form a Pd(0) isocyanide complex in situ, to achieve intramolecular bissilylation of alkynes. In a Pd(II) complex (*Angew. Chem. Int. Ed.* 1995, 33, 2445), an isocyanide is capable of displacing a Ph$_3$P ligand. tert-Butyl isocyanide can displace both phosphines from Pt(Pt-Bu$_3$)$_2$ to form the trinuclear species [Pt$_3$(μ-CNt-Bu)$_3$(CNt-Bu)$_3$] (*J. Orgomet. Chem.* 1981, 214, 405). Recently, Figueroa et al. (*J. Am. Chem. Soc.* 2009, 131, 11318) successfully prepared monomeric (ArNC)$_2$Pd(0) employing aryl isocyanides with very bulky aromatic groups. For the most part, preparations of Pd(0) isocyanide complexes result in polynuclear species, e.g. Pd$_2$(dba)$_3$ and ArNC gave [Pd$_3$(CNAr)$_6$] (where Ar=2,6-dimethylphenyl) (*J. Orgomet. Chem.* 1983, 259, 355). To the best of our knowledge, displacement of phosphines from Pd(0) complexes has not been used as a preparative route to form Pd(CNR)n. In FIG. 13, the IR stretching frequencies of some metal-bound isocyanide ligands are listed for select literature compounds.

The model Pd catalyst Cl$_2$Pd(PPh$_3$)$_2$ was removed from solution by isocyanide-grafted silica gel 1. A THF solution of Cl$_2$Pd(PPh$_3$)$_2$ was treated with 25 equivalents of isocyanide-grafted silica gel 1. The yellow solution became clear and colorless when the silica gel was allowed to settle after a few minutes. After 30 min, filtration was used to remove the silica gel and the eluent was found to contain triphenylphosphine, indicating that a ligand displacement reaction had taken place. The scavenging silica gel was isolated and characterized by reflectance IR spectroscopy.

A reflectance IR spectrum of the product formed between isocyanide-grafted silica gel 1 and Cl$_2$Pd(PPh$_3$)$_2$ revealed a new isocyanide absorption consistent with a Pd(II)-bound isocyanide. This commonly used precatalyst was chosen because several X$_2$Pd(CNR)$_2$ organometallic complexes are known in the literature, allowing for spectroscopic comparisons to be made (FIG. 13). A diagnostic IR absorption shows direct evidence of isocyanide coordinated to the palladium atom. In FIG. 10A, the reflectance IR spectrum of isocyanide-grafted silica gel 1 is provided. The strong absorption at 2147 cm$^{-1}$ is indicative of silica gel bound isocyanide (cf. the ν(CNR) absorption of the isocyanide precursor, CNCH$_2$CH$_2$CH$_2$Si(OEt)$_3$ is 2150 cm$^{-1}$). The reflectance IR spectrum of the silica gel isolated after scavenging PdCl$_2$(PPh$_3$)$_2$ (30 min in THF, rt) is shown in FIG. 10B. In addition to the "free" isocyanide peak at 2147 cm$^{-1}$, a new IR peak appeared at 2231 cm$^{-1}$. This peak is shifted 84 cm$^{-1}$ as compared to the free isocyanide, consistent with Angelici's observed difference between peak frequencies in the free isocyanide and in isocyanide bound to both Pd(II) and Pt(II) complexes. The broadness of the new peak may be due to a single species or due to multiple species with different coordination numbers. The two absorbances of 1C are 15 cm$^{-1}$ apart and may not be distinguishable in a broad peak, which could be due to cis-Cl$_2$Pd(1)$_2$. It is also possible that there is a monodentate species, unknown in the literature, or that a bidentate trans-isomer, trans-Cl$_2$Pd(1)$_2$ is present. To the best of our knowledge, trans-Cl$_2$Pd(CNR)$_2$ species do not appear to be known, but the congener trans-Br$_2$Pd(CNt-Bu)$_2$ is and has absorbance at 2224 cm$^{-1}$, closely matching the observed stretching frequency (J. Amer. Chem. Soc. 1971, 93, 6705). The new peak is consistent with at least one Pd-(CNR) bond. The foregoing theories do not bind this disclosure.

In conclusion, isocyanide reagents offer effective means for the removal of residual palladium from cross coupling reactions. The silica gel bound reagent can be used on its own to bind Pd from solution, with a simple filtration needed to remove the isocyanide-grafted silica gel 1 bound to Pd. The commercially-available isocyanide KO$_2$CCH$_2$NC reduced Pd levels in shorter time periods with comparable results to that of isocyanide-grafted silica gel 1 when combined with silica gel chromatography. With nonpolar products of cross coupling, celite and untreated silica gel were somewhat effective for removing Pd. In general, the isocyanide scavenging reagents were able to reach 1-10 ppm levels of residual Pd, often without the need of a chromatography step. Reflectance IR measurements show the appearance of a new isocyanide, consistent with binding to Pd(II).

Materials and Methods.

For Pd(II). Two solutions were prepared, each consisting of 11.3 mg (0.05 mmol) of Pd(OAc)$_2$ dissolved in 5 mL of toluene. To the stirred solution was added either 133 mg (0.2 mmol) or 266 mg (0.4 mmol) of silica gel 1. Aliquots of the solution were taken after 1 h, 4 h, and 24 h of treatment time by allowing the silica gel to settle and then removing ~1 mL sample from the toluene solution. The mass of the sample obtained (between 800 and 1100 mg) was recorded on an analytical balance and used to determine relative ppm of palladium that remained in solution. The mass of each aliquot removed was recorded, the solvent was evaporated and the remaining material was digested with 2 mL of TraceSelect grade nitric acid. The samples was then diluted to 50 mL final volume and analyzed by ICP-MS. This value was used to back calculate the level of Pd in the aliquot which was originally removed, and is indicative of the amount of Pd in solution when the aliquot was removed.

For Pd(0). Two solutions of 57.8 mg (0.05 mmol) of Pd(PPh3)4 was dissolved in 5 mL of toluene, to the stirring solution was added 133 mg (0 2 mmol) or 266 mg (0.4 mmol) of silica gel 1. Aliquots (0.880 to 1.339 mL) of the solution were taken after 1 h, 4 h, and 24 hours of treatment by letting the silica settle and removing a sample from the toluene. The mass of the sample obtained was recorded and used to determine relative ppm of palladium that remained in solution. The mass of the sample obtained (between 763 and 1161 mg) was recorded and used to determine relative ppm of palladium that remained in solution. The mass of each aliquot removed was recorded, the solvent was evaporated and the remaining material was digested with 2 mL of TraceSelect grade nitric acid. The samples was then diluted to 50 mL final volume and analyzed by ICP-MS. This value could be used to back calculate the level of Pd in the aliquot which was originally removed, and reflective of the residual Pd in solution when the aliquot was removed.

Figure 11:
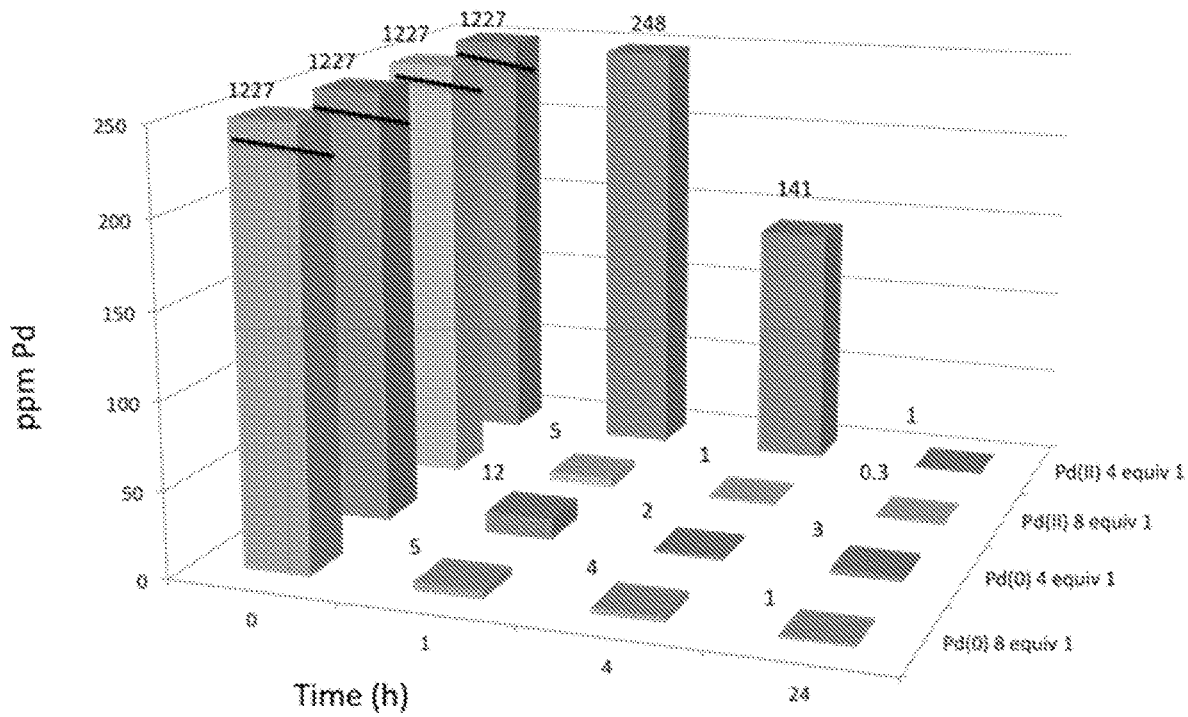
FIG. 11. Removal of Pd(0) and Pd(II) from (A) a toluene solution and from (B) a Suzuki coupling. The listed numbers are the ppm vales of Pd recorded by ICP-MS measurements. (A) Conditions: 0.01 M Pd(OAc)2 or Pd(PPh3)4 in toluene, treated with 1 (n equivalents) at room temperature, under stirring. (B) removal of Pd from the Suzuki Coupling depicted in eq 1 using Pd(0) or Pd(II) precatalysts (4 h, rt) using various methods.
Figure 11:
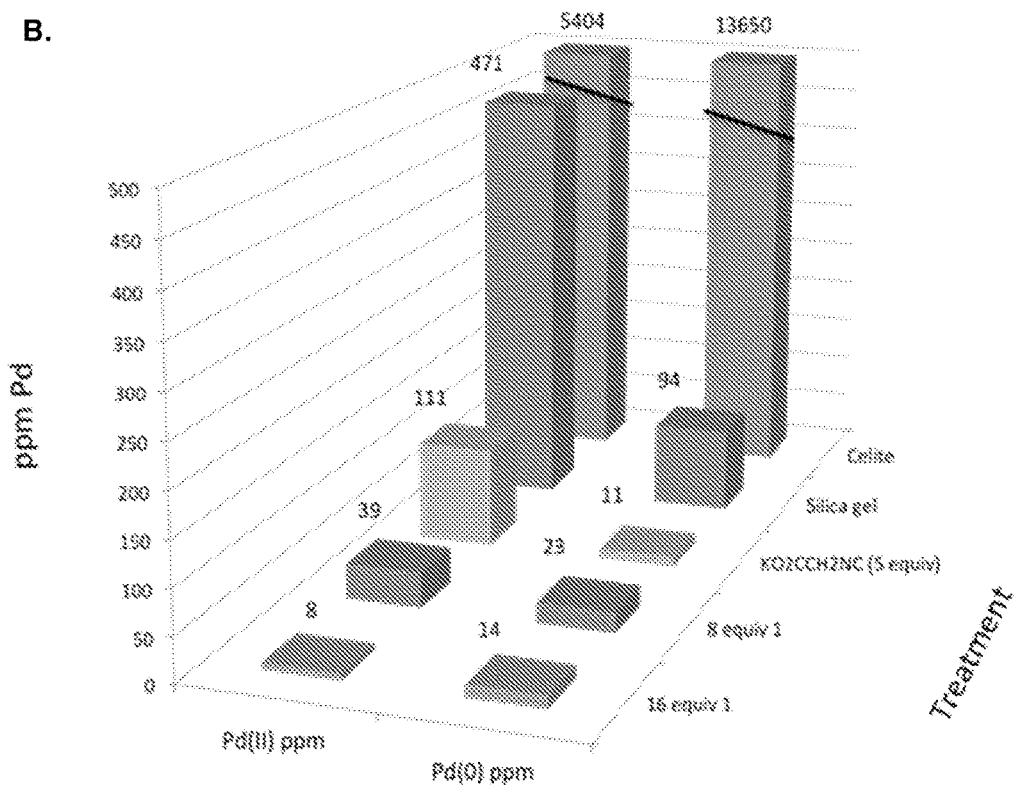
Figure 15:
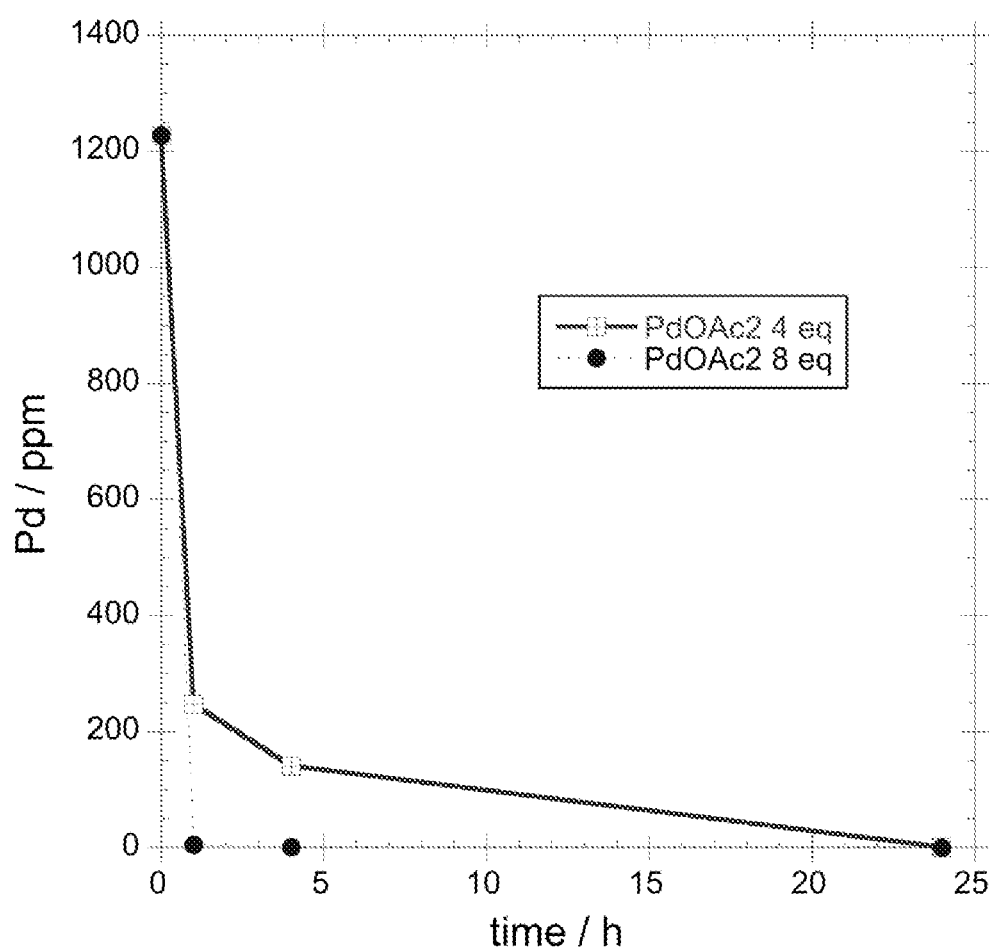
FIG. 15. Detailed plot of $Pd(OAc)_2$ removal from a 0.01 M solution in toluene at room temperature using silica gel 1. At the indicated time, the silica gel was allowed to settle, an aliquot was removed, weighed, concentrated and digested with nitric acid prior to ICP-MS analysis.

The following data given in Table S1 was used to generate the plot in FIG. 11A. A detailed graph is provided in FIG. 15 below.

TABLE S1

Removal of Pd(OAc)$_2$ Using Scavenger 1

| Entry | Time/h | Equivalents of 1$^a$ | ppm Pd | % Removed |
|---|---|---|---|---|
| 1 | 0 | none | 1227.6 | |
| 2 | 1 | 4 | 247.8 | 79.814 |
| 3 | 4 | 4 | 141.3 | 88.490 |
| 4 | 24 | 4 | 0.8 | 99.935 |
| 5 | 1 | 8 | 5.4 | 99.560 |
| 6 | 4 | 8 | 1.4 | 99.886 |
| 7 | 24 | 8 | 0.3 | 99.976 |

$^a$Based on number of mmoles of Pd catalyst.

Figure 16:
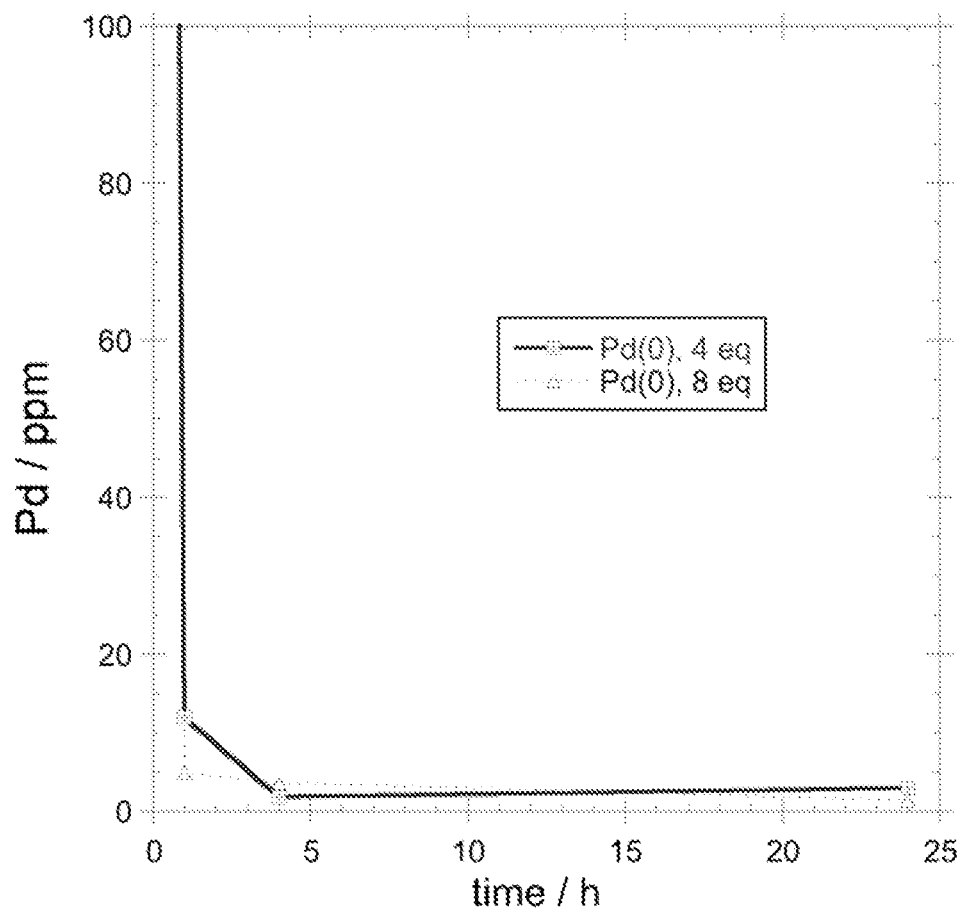
FIG. 16. Detailed Plot of Pd(PPh3)4 Removal from a 0.01 M solution in toluene at room temperature using silica gel 1. At the indicated time, the silica gel was allowed to settle, an aliquot was removed, weighed, concentrated and digested with nitric acid prior to ICP-MS analysis.

The following data given in Table S2 was used to generate the plot in FIG. 1A. The detailed graph is provided in FIG. 16 below.

TABLE S2

Removal of Pd(PPh$_3$)$_4$ Using Scavenger 1

| Entry | Time/h | Equivalents of 1$^a$ | ppm Pd | % Removed |
|---|---|---|---|---|
| 1 | 0 | none | 1227.6 | — |
| 2 | 1 | 4 | 11.9 | 99.031 |
| 3 | 4 | 4 | 1.8 | 99.853 |
| 4 | 24 | 4 | 2.9 | 99.764 |
| 5 | 1 | 8 | 4.9 | 99.601 |
| 6 | 4 | 8 | 3.6 | 99.707 |
| 7 | 24 | 8 | 1.4 | 99.886 |

$^a$Based on number of mmoles of Pd catalyst.

General Procedure for Reaction Workup

Control Workup The reaction was directly purified over 0.5 g of Celite and eluted with an equal volume of the reaction solvent. The sample was concentrated under vacuum (rotary evaporator), a weight of recovered material was obtained, and the desired product was then digested for 12 h at room temperature in 2 mL of concentrated nitric acid.

Method 1 The reaction was not treated with any scavenging material, simply concentrated under vacuum (rotary evaporator), and then directly purified over 1 gram of silica gel per mmol of catalyst used, and eluted with a mobile phase of 10% diethyl ether in hexanes. The fractions which contained product were pooled and concentrated, a weight of material recovered was obtained and the desired product was then digested for 12 h at room temperature in 2 mL of concentrated nitric acid.

Method 2 To the reaction was added 5 equivalents (relative to Pd catalyst used) of KO$_2$CCH$_2$NC as a solution in 1 mL of methanol. The isocyanide was left to stir in the reaction for 1-4 hr, at the temperature of the reaction. The reaction was then concentrated under vacuum (rotary evaporator) and then directly purified over 1 gram of silica gel per mmol of catalyst used, and eluted with a mobile phase of 10% diethyl ether in hexanes. The fractions which contained product were pooled and concentrated, a weight of material recovered was obtained, and the desired product was then digested for 12 h at room temperature in 2 mL of concentrated nitric acid.

Method 3 To the reaction was added 4-8 equivalents (relative to Pd catalyst used) of isocyanide containing silica gel 1, the reaction was left to stir for 1-4 hr at the temperature of the reaction. The reaction was then concentrated under vacuum (rotary evaporator) and then directly purified over 1 gram of silica gel per mmol of Pd catalyst used, and eluted using 10% diethyl ether in hexanes as the mobile phase. The fractions which contained product were pooled and concentrated, a weight of material recovered was obtained and the desired product was then digested for 12 h at room temperature in 2 mL of concentrated nitric acid.

Method 4 To the reaction was added 8-16 equivalents (relative to Pd catalyst used) of isocyanide containing silica gel 1, the reaction was left to stir for 4 hr at the temperature of the reaction. The reaction was then filtered over a medium porosity filter frit, the material was washed with an equal portion (5 mL) of $CH_2Cl_2$ and the eluent was collected and concentrated under vacuum (rotary evaporator). A weight of recovered material was obtained and the desired product was then digested for 12 h at room temperature in 2 mL of concentrated nitric acid.

Cross Coupling Reactions

General Procedure for the Suzuki Reaction with Phenyl Boronic acid and 4-Bromoacetophenone

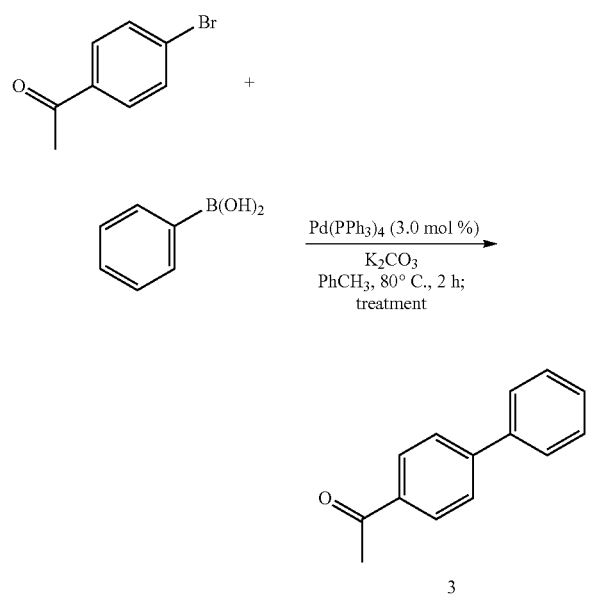

3

To an oven dried 50 mL Schlenk tube was added 1.0 mmol of the aryl bromide, 1.5 mmol (1.5 equivalents) of the aryl boronic acid, and 1.5 mmol (1.5 equivalents) of potassium carbonate. 5 mL of freshly distilled toluene was then added to the Schlenk tube followed by the addition of 0.03 mmol (3 mol %) of tetrakis(triphenylphosphine)palladium(0). The reaction was then placed directly in a preheated oil bath at 80° C. for 2 h and then treated following one of the previously described procedures: control or methods 1-4. Without any treatment, concentration of the reaction and digestion/ICP-MS analysis gave a Pd concentration of 15,959 ppm Pd. The desired product could be isolated for characterization purposes, providing spectra data in good agreement with previously published results. $^1$H NMR (500 MHz, CDCl$_3$, ppm) δ 8.01 (d, J=8.5 Hz, 2 H), 7.65 (d, J=9.0 Hz, 2 H), 7.60-7.58 (m, 2 H), 7.44 (t, J=7.5 Hz, 2 H), 7.39-7.36 (m, 1 H), 2.59 (s, 3 H).

TABLE 4

(repeated from above) Removal of Palladium from a Suzuki Reaction

| Entry | Treatment[a] | Time/h | Chrom? | Method | Pd/ppm | % Pd removed |
|---|---|---|---|---|---|---|
| 1 | celite filtration | n/a | n/a | control | 143.79 | 99.099 |
| 2 | 1 (8 equiv) | 4 | no | 4 | 0.21 | 99.999 |
| 3 | 1 (16 equiv) | 4 | no | 4 | 0.02 | 99.999 |
| 4 | 1 (8 equiv) | 4 | yes | 3 | 0.08 | 99.999 |
| 5 | KO$_2$CCH$_2$NC (5 equiv) | 1 | yes | 2 | 0.35 | 99.998 |

[a]Equivalents of isocyanide are based on catalyst loading: e.g. 8 equiv 1 amounts to 24 mol % 1.

General Procedure for the Suzuki Reaction with Phenyl Boronic acid and 3-Bromopyridine

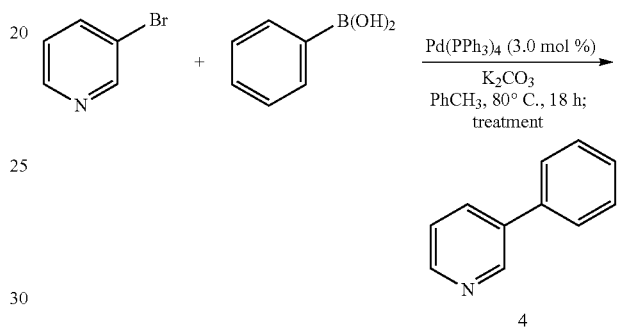

4

Using tetrakis[triphenylphosphine]palladium(0) as the source of the metal, to an oven dried 50 mL Schlenk tube was added 1.0 mmol of 3-bromopyridine, 1.25 mmol (1.25 equivalents) of the aryl boronic acid, and 1.25 mmol (1.25 equivalents) of potassium carbonate. 5 mL of freshly distilled toluene was then added to the Schlenk tube followed by the addition of 0.03 mmol (3 mol %) of tetrakis(triphenylphosphine)palladium(0). The reaction was then placed directly in a preheated oil bath at 80° C. for 18 h and then treated following one of the previously described procedures: control or methods 1-4. Without any treatment, concentration of the reaction and digestion/ICP-MS analysis gave a Pd concentration of 20,103 ppm Pd. The desired product could be isolated for characterization purposes, providing spectra data in good agreement with previously published results. 1H NMR (300 MHz, CDCl3, ppm) δ 8.85 (d, J=2.4 Hz, 1 H), 8.59-8.57 (m, 1 H), 7.87-7.83 (m, 1 H), 7.57-7.55 (m, 2 H), 7.50-7.32 (m, 4 H).

TABLE S3

Removal of Palladium from a Suzuki Reaction with Pd(0)-

| Entry | Treatment[a] | Time/h | Chrom? | Method | Pd/ppm | % Pd removed |
|---|---|---|---|---|---|---|
| 1 | celite filtration | n/a | n/a | control | 13,650 | 32.102 |
| 2 | silica gel chrom. | n/a | yes | 1 | 94.41 | 99.532 |
| 3 | 1 (8 equiv) | 4 | no | 4 | 23.29 | 99.885 |
| 4 | 1 (16 equiv) | 4 | no | 3 | 14.26 | 99.929 |
| 5 | KO$_2$CCH$_2$NC (5 equiv) | 2 | yes | 2 | 11.25 | 99.944 |

[a]Equivalents of isocyanide are based on catalyst loading: e.g. 8 equiv 1 amounts to 24 mol % 1.

with Pd(II)

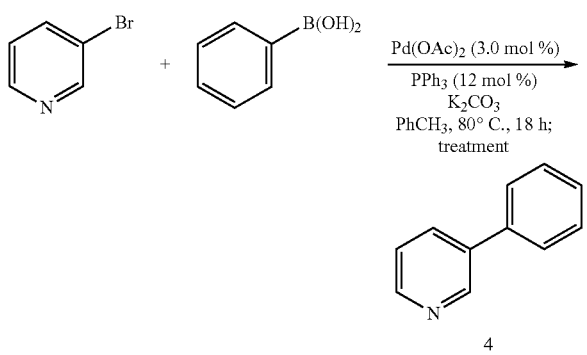

Using palladium(II)acetate as the metal source, to an oven dried 50 mL Schlenk tube was added 1.0 mmol of 3-bromopyridine, 1.25 mmol (1.25 equivalents) of the aryl boronic acid, 1.25 mmol (1.25 equivalents) of potassium carbonate, and 0.12 mmol (12 mol %) of triphenylphosphine. 5 mL of freshly distilled toluene was then added to the Schlenk tube followed by the addition of 0.03 mmol (3 mol %) of palladium(II)acetate. The reaction was then placed directly in a preheated oil bath at 80° C. for 18 h and then treated following one of the previously described procedures: control or methods 1-4. Without any treatment, concentration of the reaction and digestion/ICP-MS analysis gave a Pd concentration of 20,103 ppm Pd. The desired product could be isolated for characterization purposes, providing spectra data in good agreement with previously published results.

TABLE S4

Removal of Palladium from a Suzuki Reaction with Pd(II)

| Entry | Treatment[a] | Time/h | Chrom? | Method | Pd/ppm | % Pd removed |
|---|---|---|---|---|---|---|
| 1 | celite filtration | n/a | n/a | control | 5404 | 73.119 |
| 2 | silica gel chrom. | n/a | yes | 1 | 470.99 | 97.668 |
| 3 | 1 (8 equiv) | 4 | no | 4 | 39.56 | 99.804 |
| 4 | 1 (16 equiv) | 4 | no | 3 | 7.83 | 99.961 |
| 5 | KO$_2$CCH$_2$NC (5 equiv) | 2 | yes | 2 | 111.48 | 99.445 |

[a]Equivalents of isocyanide are based on catalyst loading: e.g. 8 equiv 1 amounts to 24 mol % 1.

General Procedure for the Heck Reaction between 2-Bromomesitylene and Ethyl Acrylate

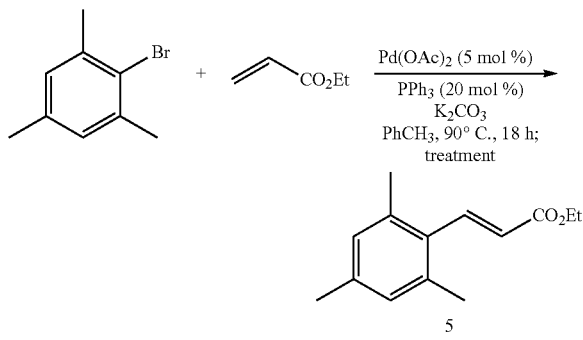

To an oven dried 50 mL Schlenk tube was added 1.0 mmol of the aryl bromide, 2.0 mmol (2.0 equivalents) of ethyl acrylate, and 1.5 mmol (1.5 equivalents) of potassium carbonate. 5 mL of freshly distilled toluene was then added to the Schlenk tube followed by the addition of 0.05 mmol (5 mol %) of Pd(OAc)$_2$ and 0.2 mmol (20 mol %) of triphenylphosphine. The reaction was then placed directly in a preheated oil bath at 90° C. for 18 h and then treated following one of the previously described procedures: control or methods 1-4. Without any treatment, concentration of the reaction and digestion/ICP-MS analysis gave a Pd concentration of 23,571 ppm Pd. The desired product could be isolated for characterization purposes, providing spectra data in good agreement with previously published results. 1H NMR (500 MHz, CDCl3, ppm) δ 7.85 (d, J=16.5 Hz, 1 H), 6.89 (s, 2 H), 6.07 (d, J=16.5 Hz, 1 H), 4.28 (q, J=7.5 Hz, 2 H), 2.33 (s, 6 H), 2.28 (s, 3 H), 1.34 (t, J=7.5 Hz, 3 H).

TABLE S5

Removal of Palladium from a Heck Reaction

| Entry | Treatment[a] | Time/h | Chrom? | Method | Pd/ppm | % Pd removed |
|---|---|---|---|---|---|---|
| 1 | celite filtration | n/a | n/a | control | 34.65 | 99.853 |
| 2 | 1 (8 equiv) | 4 | no | 4 | 0.37 | 99.998 |
| 3 | 1 (16 equiv) | 4 | no | 4 | 1.45 | 99.994 |
| 4 | 1 (8 equiv) | 3 | yes | 3 | 0.83 | 99.997 |
| 5 | KO$_2$CCH$_2$NC (5 equiv) | 2 | yes | 2 | 11.69 | 99.951 |

[a]Equivalents of isocyanide are based on catalyst loading: e.g. 8 equiv 1 amounts to 40 mol % 1.

General Procedure for the Buchwald-Hartwig Reaction between 2-Bromomesitylene and Morpholine

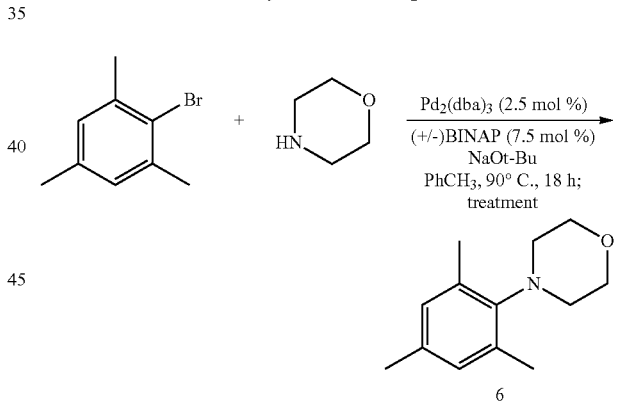

To an oven dried 50 mL Schlenk tube was added 10 mmol of the aryl bromide, 1.2 mmol (1.2 equivalents) of morpholine, and 1.2 mmol (1.2 equivalents) of sodium tert-butoxide. 5 mL of freshly distilled toluene was then added to the Schlenk tube followed by the addition of 0.025 mmol (5 mol %) of Pd2(dba)3 and 0.075 mmol (7.5 mol %) of (+/−) BINAP. The reaction was then placed in a preheated oil bath at 90° C. for 18 h and then treated following one of the previously described procedures: control or methods 1-4. Without any treatment, concentration of the reaction and digestion/ICP-MS analysis gave a Pd concentration of 25,110 ppm Pd. The desired product could be isolated for characterization purposes, providing spectra data in good agreement with previously published results. 1H NMR (500 MHz, CDCl3, ppm) δ 6.89 (s, 2 H), 3.89-3.85 (m, 4 H), 3.15-3.13 (m, 4 H), 2.39 (s, 6 H), 2.32 (s, 3 H).

TABLE S6

Removal of Palladium from a Buchwald Hartwig Reaction

| Entry | Treatment[a] | Time/h | Chrom? | Method | Pd/ppm | % Pd removed |
|---|---|---|---|---|---|---|
| 1 | celite filtration | n/a | n/a | control | 4146 | 83.489 |
| 2 | 1 (8 equiv) | 4 | no | 4 | 1.52 | 99.994 |
| 3 | 1 (16 equiv) | 4 | no | 4 | 2.35 | 99.991 |
| 4 | 1 (8 equiv) | 3 | yes | 3 | 0.60 | 99.998 |
| 5 | $KO_2CCH_2NC$ (5 equiv) | 2 | yes | 2 | 0.50 | 99.998 |

[a]Equivalents of isocyanide are based on catalyst loading: e.g. 8 equiv 1 amounts to 40 mol % 1.

Reflectance IR Determination

Removal of $Cl_2Pd(PPh_3)_2$ from a Toluene Solution

To a 20 dram vial equipped with a magnetic stirbar was added 35 mg (0.049 mmol) of $PdCl_2(PPh_3)_2$ and 10 mL of THF. The solution was stirred for 5 minutes until fully dissolved. Once the complex was fully dissolved, 500 mg (16 equivalents) of isocyanide containing silica gel 1 was added and almost immediately a color change from bright yellow to clear was observed (see FIG. 1). The solution was stirred for 30 minutes at room temperature at which point the silica gel was collected by filtration through a medium porosity filter frit. The isolated silica gel was washed with another 10 mL of THF. The filtrate and washings were combined and concentrated in vacuo (rotary evaporator) in a pre-weighed vial. The concentrated eluent was found to contain 19 mg (0.072 mmol, 1.5 equivalents) of triphenylphosphine being displaced from the metal center.

Analytical Method for the Determination of Pd by ICP-MS

Standard Curve. The calibration curve was made from dilutions of a High Purity Pd Standard which was 1000 μg per mL of Pd in 5% HCl. Calibration curve was made with standards of 0.0, 0.01, 0.1, 1.0, 10, 100, 200, 400, 600, 800, 1000 ppb Pd in 2.76% TraceSelect grade nitric acid solution.

Samples for analysis were concentrated and transferred to pre-weighed 50 mL metal-free centrifuge tube and the weight was recorded. The samples were then digested with 2.0 mL of TraceSelect grade concentrated (69%) nitric acid (12 h, rt). After the digestion period, the samples were diluted to a final volume of 50.0 mL with distilled deionized water. After the digestion, all samples were subsequently filtered through a 0.45 micron syringe filter prior to being analyzed. The total palladium content was determined by monitoring $^{105}Pd$, $^{106}Pd$, and $^{108}Pd$. Samples were run in triplicate with the final value being the average of the three runs.

Control. To determine an appropriate method for the digestion of the organic samples, two known samples were made and analyzed. Sample A contained 10.8 mg (0.048 mmol) and sample B contained 5.6 mg (0.025 mmol) of solid Pd(OAc)2. Both samples were dissolved in 2 mL of TraceSelect grade nitric acid (>69%) for 12 h at room temperature. The samples were then diluted to 50 mL total volume in Nanopure water and filtered through a 0.45 μm syringe filter.

Sample A contained 0.0481 mmol of palladium or 5.12 mg in 50 mL for a concentration of 1024 μg per mL or 1024 ppm. One mL of this sample was further diluted to 100 mL for a final concentration of 1.02 ppm. This sample was then directly analyzed and compared to the standard curve. The observed concentration for this sample was 0.985 ppm, for 3.9% error.

Sample B contained 0.025 mmol of palladium or 2.65 mg in 50 mL for a concentration of 530 μg per mL or 530 ppm. One mL of this sample was further diluted to 100 mL for a final concentration of 530 ppb. This sample was directly analyzed and compared to the standard curve. The observed concentration for this sample was 537 ppb, for 1.3% error.

Representative Digestion Procedure. A known mass of all samples (weighed to the nearest 0.1 mg for solids and the nearest mg for liquids) were digested in 2 mL of TraceSelect grade nitric acid (>69%) for 12 h at room temperature. After the digestion period the samples were diluted to 50 mL, total volume, in Nanopure water. The samples were then filtered through a 0.45 μm syringe filter to remove any particulate material. The diluted samples were then directly analyzed by ICP-MS.

Example 3

Removal of Ir from Solution

Methods. To a 20 dram vial was added 30 mg (0.038 mmol) of $(Ph_3P)_2Ir(CO)Cl$ (Vaska's complex) in 10 mL of toluene, the solution was stirred for 30 minutes to fully dissolve the complex. Once the complex was dissolved, an initial 0.2 mL aliquot was removed from the reaction and transferred into a 1 dram vial. This was followed by the addition of 500 mg (20 equivalents) of isocyanide containing silica gel to the solution. During the course of the reaction, the stir bar was periodically stopped allowing the silica gel to settle. At these junctures aliquots of equal volume were then removed from the reaction after 5, 15, and 30 minutes after the addition of the silica gel. The aliquots were concentrated in vacuo (rotary evaporator) and analyzed by thin-film IR. The initial aliquot contained the strong absorption peak at 1960 $cm^{-1}$ indicative of the carbonyl characteristic of Vaska's complex. The remaining aliquots did not display any absorption peak, indicating the complex was removed from the solution phase and onto the solid phase by the silica gel. A color change was also observed during this time period of a yellow to clear solution.

Example 4

Removal of Ruthenium (Ru) Catalysts from Solution

Herein we disclose a user friendly filtration method for the rapid and efficient removal of ruthenium from a metathesis reaction. A solid-supported isocyanide reagent quenches ruthenium carbene activity through a well-defined Buchner reaction, and is applicable to a variety of Grubbs catalysts currently used to promote alkene and ene-yne metathesis.

Figure 3:
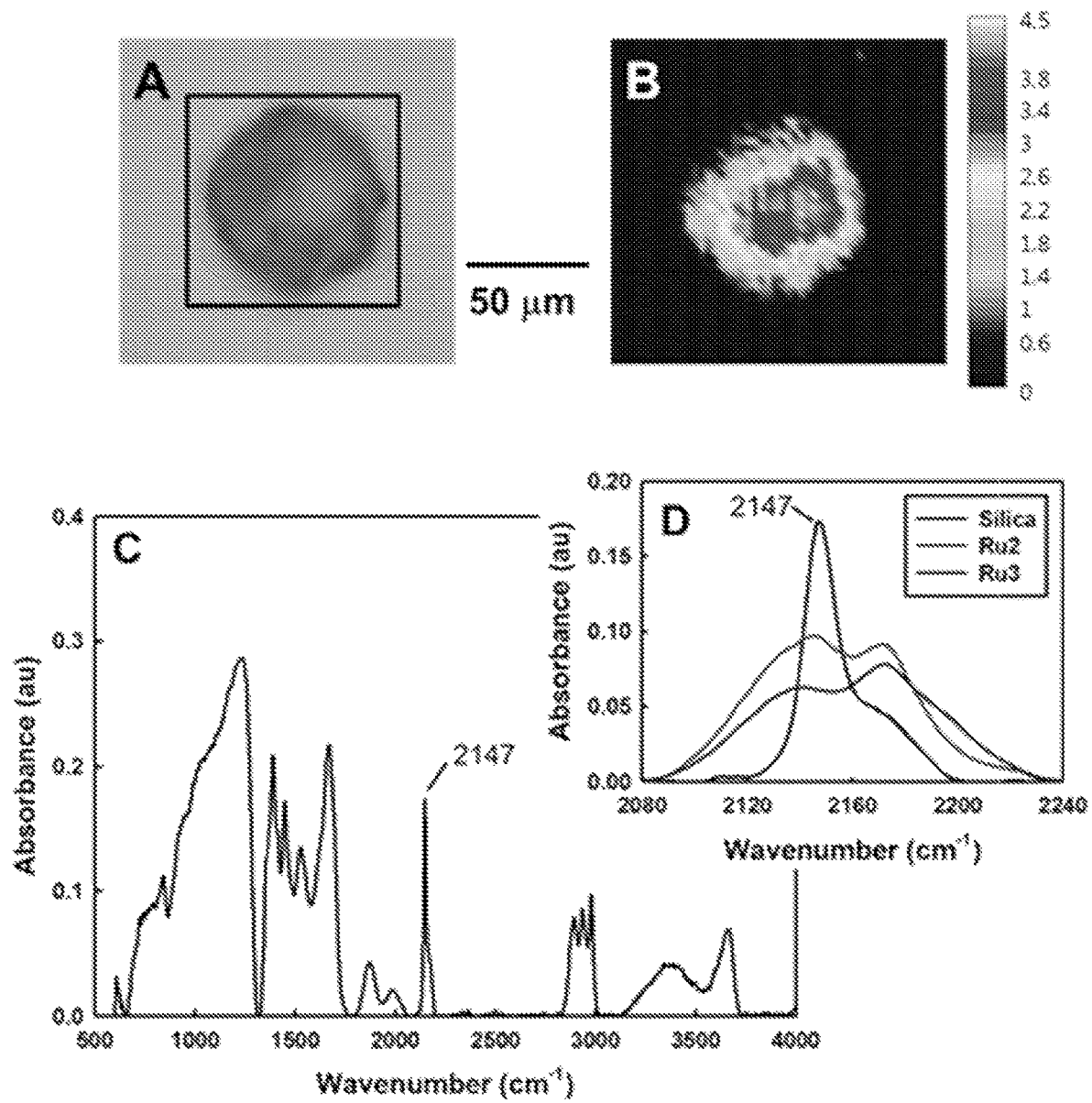
FIG. 3. A) Optical image of a single particle of silica gel 2 with aperture area (70×70 mm) marked. B) focal plane array (FPA) image of 2 integrated to show relative abundance of isocyanide. C) Full FT-IR spectrum of 2; the isocyanide peak (2147 $cm^{-1}$) is noted. D) Isocyanide region for 2, modified silica 2-quenched Ru2, and modified silica 2-quenched Ru3 respectively.
Figure 4:
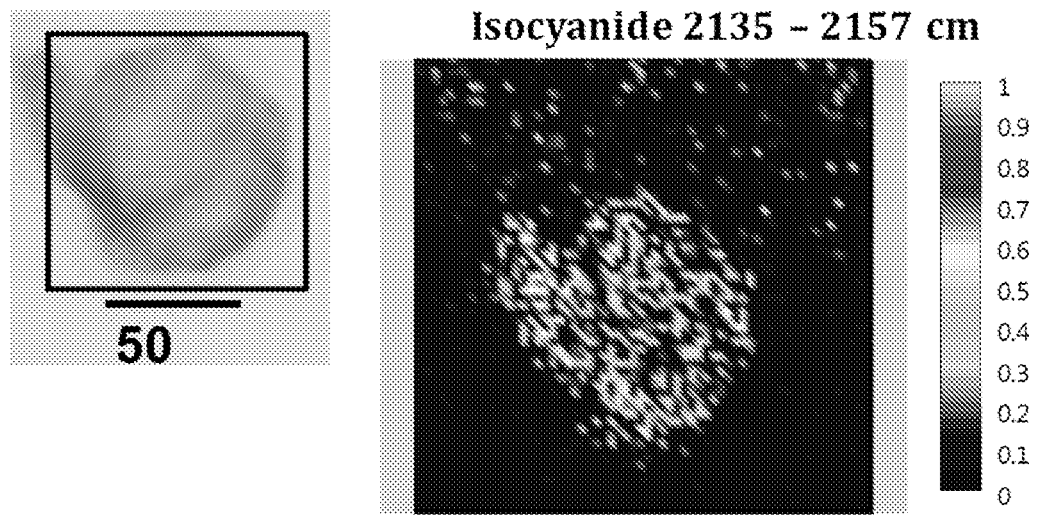
FIG. 4. Reflectance mode IR of the isocyanide-grafted silica gel after quenching Ru2, and the FPA image of the intensity of the remaining isocyanide signal.
Figure 4:
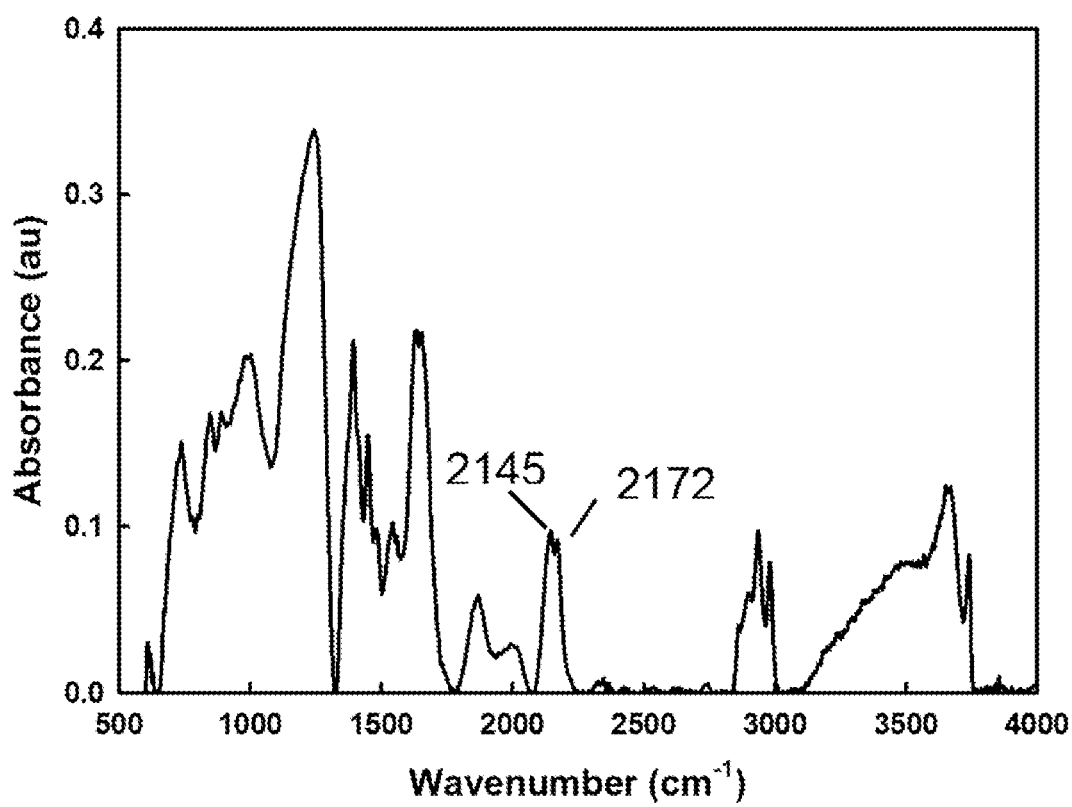
Figure 5:
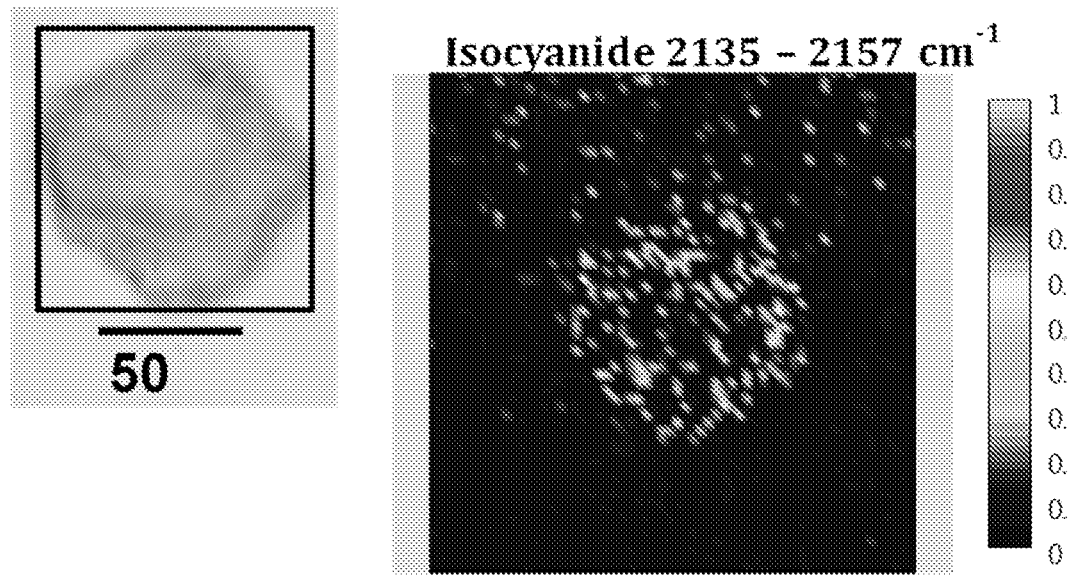
FIG. 5. The reflectance mode IR of the silica-grafted isocyanide after quenching Ru3, and the FPA image showing the intensity of the remaining isocyanide signal.
Figure 5:
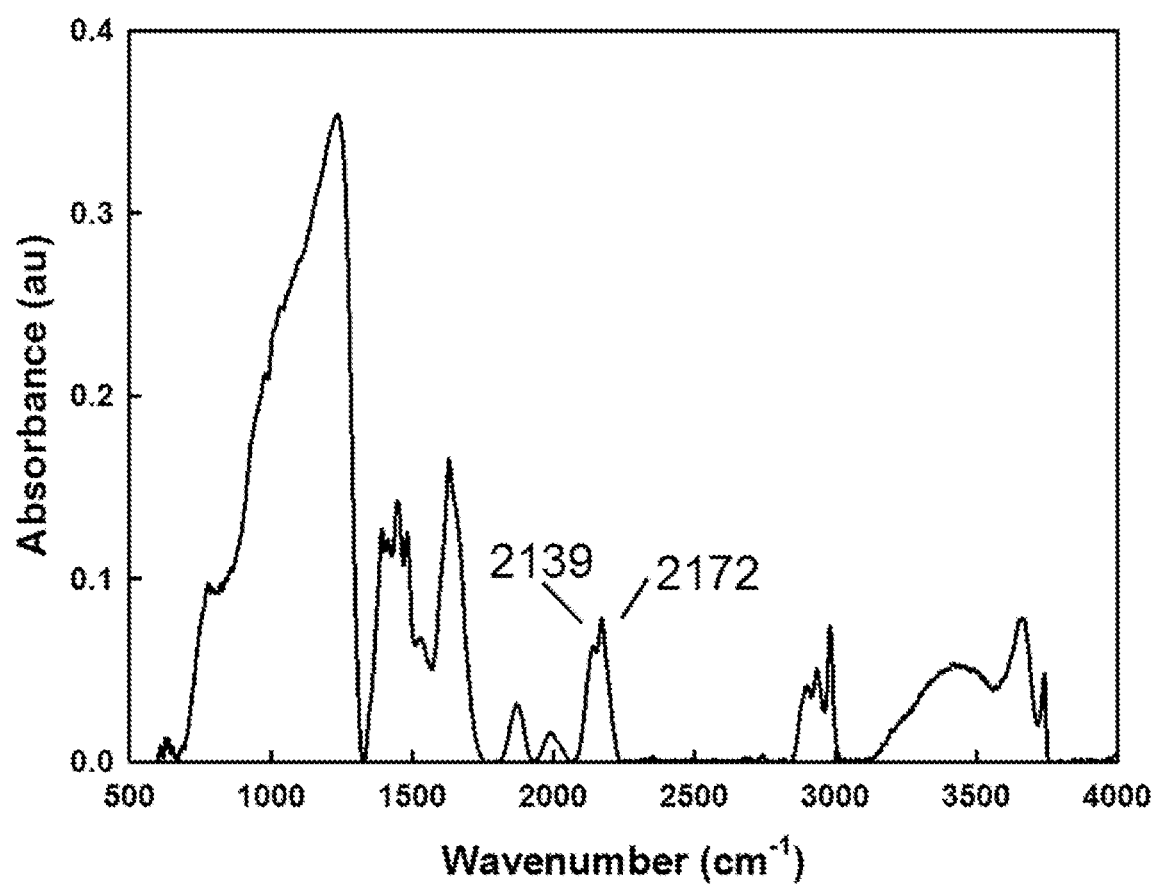

The isocyanide-modified silica gel was synthesized by analogy to previously reported procedures. Grafting the isocyanide monomer 1 was accomplished with a procedure also adapted from the literature (see Berry et al, 1986). The polymer-bound isocyanide in 2 (Scheme 1) was detected with reflectance-based IR microscopy. An advantage of this method is the ability to analyze a single silica gel particle. An absorption signal at 2147 $cm^{-1}$ was found, corresponding to the surface-bound isocyanide (FIG. 3). This value was in good agreement with the absorption band found for the monomer, 2150 $cm^{-1}$, and in agreement with previously published results (see Berry et al, 1986). Loading of the isocyanide on the silica gel was subsequently determined by titration. Typically the isocyanide was titrated to be between 1.1 and 1.6 mmol/g of silica gel.

The isocyanide-grafted silica gel was able to remove the Grubbs catalyst (Ru2) and the Grubbs-Hoveyda catalyst (Ru3). These catalysts are very efficient at promoting the ring-closing metathesis (RCM) of diethyl diallylmalonate. As a qualitative test, Ru2 was exposed to the modified silica gel 2. After stirring for 30 minutes, the color of the solution changed from red to yellow. The silica gel was then removed and the eluent was collected. To the eluent was added 50 mg of diethyl diallylmalonate after 2 h, no reaction was observed by TLC or $^1$H NMR. Identical results were obtained with Ru3.

To determine if the metal was bound to the isocyanide ligand on the surface of the silica gel, the quenched Ru2 and Ru3 were analyzed by IR microscopy and compared to the solution-based results of the isocyanide monomer (FIG. 3). The previous study conducted in our lab demonstrated that more than one isocyanide will coordinate to the metal center. With this monomer we observed two different isocyanide absorption bands indicating more than one isocyanide may be coordinated to the metal center (FIG. 3d). The IR frequencies of the silica based- and solution based isocyanide coordinated products of Ru2 and Ru3 were in close agreement with each other (Table 1, entries 3-6).

TABLE 1

Observed Isocyanide IR Frequencies in Isolation and Following Ru quenching.

| Entry | Reagent | IR Frequency (cm$^{-1}$) |
|---|---|---|
| 1 | Monomer | 2150 |
| 2 | Silica grafted isocyanide | 2147 |
| 3 | Silica quenched isocyanide Ru2 | 2145, 2172 |
| 4 | Solution quenched isocyanide Ru2 | 2143, 2184 |
| 5 | Silica quenched isocyanide Ru3 | 2139, 2172 |
| 6 | Solution quenched isocyanide Ru3 | 2132, 2174 |

The removal of residual ruthenium was evaluated in a standard assay, the ring-closing metathesis (RCM) of diethyl diallylmalonate (Table 1). The residual ruthenium was determined by inductively coupled plasma mass spectrometry (ICP-MS). As a control, untreated silica gel only partially removed ruthenium (entry 1). The solution treatment with soluble isocyanide and passage through a silica gel plug (our previous method) gave a tenfold reduction in ruthenium (entry 2). Next, addition of 30 equivalents and 60 equivalents of isocyanide-grafted silica gel 2 was tested (entries 3 and 4). 60 equivalents 2 worked best but required at least 30 min; longer time was found to be unnecessary (entries 5-7). During the first 30 minutes, a color change from a red/brown to a light yellow was noted. Entry 8 demonstrated that doubling the amount of 2 to 1 g (120 equivalents) not surprisingly also reduced the residual concentration of ruthenium. To further test the limits of this method, a reaction was run with increased catalyst loading (Entry 9). This method was also found to work with the Ru3 catalyst with similar efficiency at 2.5 and 10 mol % catalyst loading (entries 10 and 11).

When combined with silica gel purification, the ruthenium was removed to ca. 1 ppm. With the simple RCM reaction, purification of the cyclopentene product is trivial since the only by-product is ethylene gas. More commonly, column chromatography is needed to purify the desired product. Entry 12 combines this method with column chromatography. The reaction was stirred with 500 mg of the silica gel for 30 minutes and then directly concentrated, and dry loaded on a pre-equilibrated 1×10 cm bed of silica gel. The product was eluted with 10% ethyl acetate in hexanes to afford the desired cyclopentene product in 93% yield. This result demonstrates that, in combination with column chromatography this method can remove over 99.99% of the original ruthenium, leaving behind 1.17 ppm Ru in the final sample.

Next we sought to evaluate this method for catalysts under more typical reaction conditions (Table 3).

TABLE 3

The Evaluation of Temperature as a Variable in the removal of Ru.

EtO$_2$C   CO$_2$Et

1. Catalyst, (2.5 mol %)
   PhCH$_3$, temp, 2h
2. 500 mg (60 equiv)
   Treated Silica gel,
   30 min EtO$_2$C   CO$_2$Et (2)

| Entry | Catal. | Rxn Temp (° C.) | Temperature Temp (° C.) | Conc [Ru]/ µg/5 mg | % Ru Removed |
|---|---|---|---|---|---|
| 1 | Ru2 | 80 | 80 | 0.59 | 99.01 |
| 2 | Ru3 | 80 | 80 | 0.03 | 99.96 |
| 3 | Ru3 | 80 | Rt | 0.02 | 99.96 |
| 4 | Ru3 | Rt | 80 | 0.03 | 99.95 |

Higher temperatures are often used to promote difficult ring closing and cross-metathesis reactions. Elevated reaction temperatures were screened because they can lead to catalyst decomposition and olefin isomerization. In RCM, a ruthenium methylidene is the propagating species which has been shown to thermally decompose to a dinuclear hydride species. We wanted to test for "clean-up" of ill-defined decomposition products that originated from the catalyst, not just active ruthenium carbenes. Depending on the application and the temperature used, ruthenium carbenes may no longer be present at the end of a metathesis reaction. Entries 1 and 2 demonstrated that this method worked equally well for high temperature reactions. It was also noticed that during the clean-up of these reactions, the color change from red (Ru2), or green (Ru3), to yellow took mere minutes. To be sure the effectiveness of this treatment was not a product of the temperature but of the silica gel, two additional experiments were run. Entry 3 was performed at 80° C. with a room temperature quench, and entry 4, a room temperature reaction with a quench performed at 80° C. Both entries provided similar values of residual ruthenium, indicating that the temperature of the quenching procedure is not a critical variable.

Finally the effectiveness of this method was evaluated in more challenging metathesis applications. The synthesis of trisubstituted alkenes requires more forcing conditions and a more active catalyst. The Grubbs-Stewart catalyst Ru4 was evaluated for this RCM (eq 3). Two samples were evaluated, one was directly analyzed after removal of the modified silica gel, and the other sample was column purified prior to analysis. Both samples provided low levels of ruthenium. Next an ene-yne metathesis reaction with an alkenol was evaluated using catalyst Ru2 and Ru3 (eq 4,5). This reaction is also known to cause catalyst decomposition and aid in the formation of ruthenium hydrides. Despite the potential for the formation of several different ruthenium species during this reaction, quenching with silica gel 2 was effective at reducing the ruthenium content in the product. Finally, the recently reported Z-selective catalyst Ru5 was also evaluated in the homodimerization of methyl 10-undecenoate. This catalyst is also known to have a unique mechanism of decomposition, different from the earlier generations of ruthenium catalysts. Quenching with silica gel 2 significantly reduced the levels of ruthenium; in method A, the amount of Ru was below the level of detection of the instrument.

In conclusion, using isocyanide-grafted silica gel 2 was found to be an effective method for the removal of ruthenium from metathesis reactions. This method was found to be effective in typical applications with several commonly-used metathesis catalysts. This method can also be used as a standalone procedure simply requiring filtration, or can be used in combination with column chromatography to further reduce the levels of residual Ru.

Materials. Grubbs' ruthenium carbene complexes were obtained from Materia Inc. (Pasadena, Calif.). Silica gel (60 Å, 40-63 μm (230-400 mesh)) was obtained from Sorbent Technologies and dried in an oven (24-48 h, 140° C.) prior to use. APTES (Alfa Aesar), ethyl formate (Sigma Aldrich), $POCl_3$ (Sigma Aldrich), and TraceSelect Grade Nitric acid (Fluka) were used as received. Triethylamine was distilled and stored over potassium hydroxide prior to use. All other solvents were dried by passage through alumina (THF, dichloromethane) or alumina and Q5 (toluene) and stored under nitrogen. Ruthenium stock solutions were prepared with high-purity water (18 MΩ-cm) from a Millipore Milli-Q water purification system. The ruthenium was obtained from a standard solution of 1000 μg/mL (+/−5 μg/mL) in 2% HCl (High Purity Standards). Ruthenium standards were prepared in 4% nitric acid (sample background). Thin layer chromatography was performed on glass-backed ilica plates (F254, 250 micron thickness), visualized with UV light or stained with $KMnO_4$ stain. $^1H$ NMR spectra were recorded at 500 or 300 MHz. 1H NMR chemical shifts are reported in ppm relative to the internal standard tetramethylsilane (δ=0.0 ppm). ICP measurements were made on a Thermo Scientific X-Series 2 inductively coupled plasma quadrupole mass spectrometer (ICP-MS). FTIR spectra were recorded in the reflection mode by using a Bruker Optics Hyperion 3000 microscope (15× objective) with focal plane array detector (FPA) or single element MCT detector interfaced to a Vertex model 70 bench.

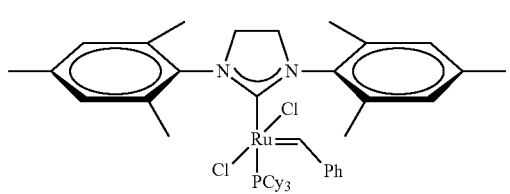

Thin Film FT-IR Characterization of the Quenched Catalysts. To a 1 dram vial was added 10 mg (0.012 mmol) of Rut and 1 mL of $CH_2Cl_2$. Once the catalyst was fully in solution 8.4 mg of isocyanide monomer 1 was added and the solution rapidly changed from red to yellow. The solution was directly concentrated in vacuo (rotary evaporator). The remaining residue was dissolved in a minimum volume of $CHCl_3$, spotted on a salt plate and analyzed by FT-IR (thin film). The frequencies associated with the isocyanide which were observed for the complex were 2143 and 2184 $cm^{-1}$.

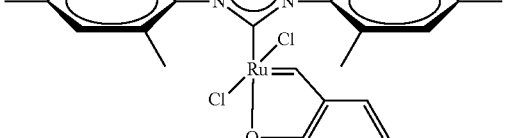

To a 1 dram vial was added 7 mg (0.012 mmol) of Ru3 and 1 mL of $CH_2Cl_2$. Once the catalyst was fully in solution 8.4 mg of the isocyanide monomer was added and the solution rapidly changed from green to yellow. The solution was directly concentrated en vacuo (roto evaporator). The remaining residue was dissolved in the minimum volume of $CHCl_3$ and spotted on a salt plate. The frequencies associated with the isocyanide which were observed for the complex were 2133 and 2174 $cm^{-1}$.

Characterization of Modified Silica Gel by Single Bead FT-IR. The spectral resolution was 4 $cm^{-1}$ and 128 scans were typical averaged. MCT-based spectra were recorded at discrete areas (70 μm×70 μm or 80 μm×80 μm) to capture a single particle.

Typical Ring-Closing Metathesis and ICP Analytical Procedure

Initial screen for Activity. A solution of 10 mg (0.011 mmol) of Ru2 in 10 mL of distilled $CH_2Cl_2$ was added 500 mg of the silica gel, the solution was stirred for 30 min at room temperature and during that time the solution changed from red to yellow. The silica gel was removed by filtering through a pasteur pipette, the silica gel was washed with 4 mL distilled of $CH_2Cl_2$, and all the eluent was collected in an oven-dried 20 dram vial. To the eluent was then added 50 mg (0.21 mmol) of diethyl diallylmalonate. The reaction was then left to stir for 2 h at which point the reaction was analyzed by TLC (20% ethyl acetate in hexanes), and no conversion was observed. The reaction was concentrated and analyzed by $^1H$ NMR which also demonstrated that, relative to mesitylene, there was no conversion of the starting material. This experiment was repeated with 10 mg (0.016 mmol) of Hov2 with the same results.

Optimization of the Procedure. A 20.5 mmol stock solution of diethyl diallylmalonate in anhydrous $CH_2Cl_2$ was prepared for the ring-closing metathesis reactions which were conducted in this solvent. The following is a representative procedure used:

To a 50 mL oven-dried Schlenk tube under nitrogen was added 25 mL of stock solution of $CH_2Cl_2$ containing 125 mg (0.524 mmol) of diethyl diallylmalonate. To this solution was then added 11.1 mg (0.0131 mmol, 2.5 mol %) of Ru2 and the solution was left to stir at room temperature for 2 h. After the reaction was complete, 500 mg (60 equivalents) of the isocyanide grafted silica gel 2 was added and left to stir for 30 minutes. After 30 minutes, the silica gel was removed with a medium porosity filter frit, and was washed with another 10 mL of $CH_2Cl_2$. The eluent was combined in pre-weighed 50 mL metal-free centrifuge tubes and concentrated in vacuo (rotary evaporator). Once concentrated, the sample weight was recorded and the samples were then digested with 2.0 mL of TraceSelect grade concentrated nitric acid (1h, rt). After the digestion period, the samples were diluted to a final volume of 50.0 mL with distilled deionized water. After the digestion, all samples were subsequently filtered through a 0.45 micron syringe filter prior to being analyzed. Calibration standards (0.0, 1.0, 10.0, 100.0, 400.0, 600.0, 800.0, 1,000.0, 2,500.0 ppb) of ruthenium were prepared by a dilution of a 1000 µg/mL standard solution of ruthenium. The total ruthenium content was determined by monitoring $^{99}$Ru, $^{100}$Ru and $^{101}$Ru. Samples were run in triplicate with the final value being the average of the three runs.

As an example of the calculations used for the determination of ruthenium content, here is a representative example from entry 8 in Table 2. Table 2 shows the optimization of removal of ruthenium from a Standard Metathesis Reaction (a) Using regular silica gel (b) This reaction was subsequently purified over 5.2 g (1×10 cm) of silica gel. The total ruthenium content of the treated sample was 0.038 ppm or 0.038 µg per mL. Therefore the 50 mL solution contained 1.91 µg of ruthenium. The original isolated product from this reaction weighed 109 mg, and contained 1.91 µg of ruthenium. This could be expressed as 87.6 µg Ru/5000 mg sample or as 17.5 ppm Ru in the crude isolated organic product.

TABLE 2

Optimization of Removal of Ruthenium from a Standard Metathesis Reaction

| entry | RuX (mol %) | treatment 2 (equivalents) | time (min) | concn [Ru]$^a$ | concn [Ru]/ ppm | Ru removed/ % |
|---|---|---|---|---|---|---|
| 1$^b$ | Ru2 (2.5) | — | 60 | 7.754 | 1552 | 88.87 |
| 2 | Ru2 (2.5) | 4.4 mg (4.4) KO$_2$CCH$_2$NC | 30 | 0.779 | 156 | 98.49 |
| 3 | Ru2 (2.5) | 250 mg (30) | 30 | 3.374 | 674 | 94.14 |
| 4 | Ru2 (2.5) | 500 mg (60) | 15 | 6.709 | 1342 | 90.98 |
| 5 | Ru2 (2.5) | 500 mg (60) | 30 | 0.659 | 132 | 99.02 |
| 6 | Ru2 (2.5) | 500 mg (60) | 45 | 0.585 | 118 | 99.01 |
| 7 | Ru2 (2.5) | 500 mg (60) | 120 | 0.551 | 110 | 99.20 |
| 8 | Ru2 (2.5) | 1000 mg (120) | 30 | 0.088 | 18 | 99.86 |
| 9 | Ru2 (5.0) | 500 mg (30) | 30 | 0.372 | 74 | 99.79 |
| 10 | Ru3 (2.5) | 500 mg (60) | 30 | 0.269 | 54 | 99.56 |
| 11 | Ru3 (10) | 500 mg (15) | 30 | 0.293 | 58 | 99.86 |
| 12 | Ru1 (2.5) | 500 mg (60) | 30 | 2.338 | 468 | 95.58 |
| 13$^b$ | Ru2 (2.5) | 500 mg (60) | 30 | 0.006 | 1.2 | 99.99 |

$^a$Concentration expressed as µg [Ru]/5 mg of crude, evaporated organic sample.
$^b$Using 500 mg untreated silica gel.
$^c$This reaction was subsequently purified over 5.2 g (1 × 10 cm) of silica gel.

Additional Metathesis Examples

Evaluating Temperature as a Variable. To an oven-dried Schlenk tube under nitrogen was added 25 mL of freshly distilled toluene followed by the addition of 125 mg (0.524 mmol) of diethyl diallylmalonate. The solution was then placed in a preheated oil bath at 80° C. for 30 minutes prior to the addition of the catalyst. To this heated solution was then added 11.1 mg (0.0131 mmol, 2.5 mol %) of Ru2 and the reaction was allowed to react for 30 minutes. After 30 minutes, 500 mg (60 equivalents) of the isocyanide-grafted silica gel 2 was added to the reaction and the reaction was left to stir for 30 minutes at 80° C. After 30 minutes the reaction was removed from the oil bath and was filtered through a medium porosity filter frit to remove the silica gel. The remaining silica was washed with another 10 mL of toluene. The eluent was collected, combined and concentrated in vacuo (rotary evaporator) in a pre-weighed vial. The sample weight was recorded and then the sample was digested following the procedure outlined above.

Procedure for the Ene-Yne Metathesis Reaction.

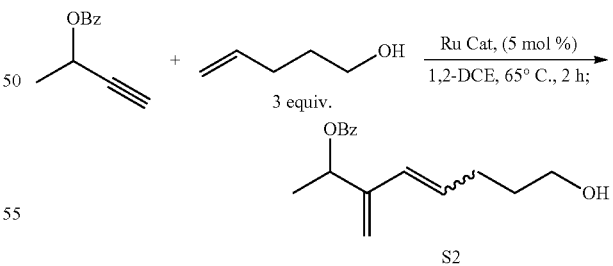

To an oven-dried 50 mL Schlenk tube under nitrogen, was added 156 mg (0.9 mmol, 1.0 equivalents) of butynyl benzoate, 310 mg (3.6 mmol, 3.0 equivalents) of 4-penten-1-ol, and 15 mL of freshly distilled 1,2-DCE. To the reaction was then added 38.2 mg (0.045 mmol, 5 mol %) of Ru2 and the reaction was placed in a preheated oil bath at 60° C. After two hours the reaction was judged to be complete by TLC and quenched with the addition of 570 mg (30 equivalents) of the isocyanide containing silica gel 2 and left to stir for 30 min at 60° C. The silica gel was then removed from the reaction using a medium porosity filter frit which was washed with 10 mL of $CH_2Cl_2$. The eluent was combined and divided in half. Half of the eluent was concentrated and column purified over 3 g of silica gel (2.0 g per 0.01 mmol of catalyst used) prior to analysis and the second half was concentrated and directly analyzed for ruthenium content without and further purification methods being used.

Procedure for the Substituted RCM Reaction.

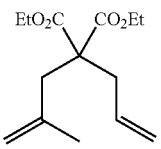

Diethyl 2-allyl-2-(2-methyl allyl)malonate. To an oven-dried 100 mL 3-neck round bottom flask under nitrogen was added 60 mL of THF and 460 mg (12 mmol, 1.2 equivalents) of 60% sodium hydride suspension in mineral oil. The solution was cooled in an ice water bath for 30 minutes at which point 2 g (10 mmol, 1 equivalent) of diethyl allyl-malonate was slowly added to the reaction. Once the evolution of gas ceased, 1.08 g (12 mmol, 1.2 equivalents) of 3-chloro-2-methylprop-1-ene was added to the reaction. The ice bath was removed and the reaction was allowed to warm to room temperature over an hour. The reaction was then placed in a preheated oil bath at 60° C. and left to react overnight. The following day the reaction was removed from the heat source and cooled to room temperature before being quenched with the addition of aqueous ammonium chloride. The reaction was extracted with diethyl ether, the organic extracts were combined, washed with brine, and then dried over magnesium sulfate. The organic layer was then concentrated under vacuum (rotary evaporator) and the yellow oil was column purified over $SiO_2$ using a mobile phase of 10% ethyl acetate in hexanes. The desired product S2 was collected as a clear oil in 86% yield, $^1$H NMR spectra in good agreement with the literature. $^1$H NMR (300 MHz, $CDCl_3$): δ 5.76-5.63 (m, 1H), 5.11-5.05 (m, 2H), 4.88 (s, 1H), 4.76 (s, 1H), 4.21-4.12 (m, 4H), 2.70-2.66 (m, 4H), 1.67 (s, 3H), 0.89 (t, J=7.0 Hz, 6H).

Procedure for Substituted RCM.

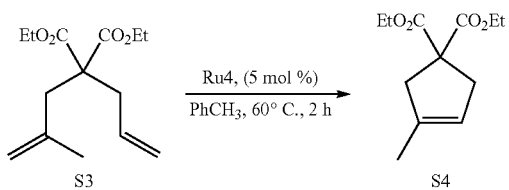

To an oven-dried Schlenk tube under nitrogen was added 10 mL of freshly distilled toluene and 254 mg (1.0 mmol) of diethyl 2-allyl-2-(2-methyl allyl)malonate. The reaction was then placed in a preheated oil bath at 60° C. for 30 min prior to adding the catalyst. After 30 minutes, 40 mg (0.05 mmol, 5 mol %) of Ru4 catalyst was added to the reaction. After 2 h the reaction was judged to be complete by TLC and was quenched with the addition of 500 mg (30 equivalents) of the functionalized silica gel 2. The solution was then left to stir for 30 min at the reaction temperature and then the silica gel was removed with a medium porosity filter frit which was washed with 10 mL of toluene. The eluent was combined and divided in half. One half was directly concentrated and analyzed for ruthenium content, the second half was column purified over 5 g of silica gel (2.0 g per 0.01 mmol of catalyst used) prior to analysis.

The Procedure for the Cross Metathesis:

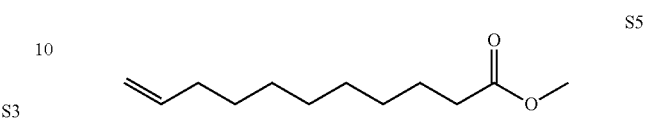

Methyl 10-undenenoate. To a 50 mL round bottom flask was added 25 mL of methanol and 12.4 g (90.0 mmol, 3 equivalents) of potassium carbonate. To the stirring reaction was added 6 mL (30.0 mmol, 1 equivalent) of undec-10-enoyl chloride in a drop wise fashion. The reaction was left to stir overnight and then quenched with the addition of water. The reaction was extracted with diethyl ether, the organic extracts were combined, washed with water and brine, then dried over magnesium sulfate, and concentrated under vacuum (rotary evaporator). The crude oil was column purified over $SiO_2$ with 5% ethyl acetate in hexanes to afford the product S5 as a clear oil in 87% yield, providing an $^1$H NMR spectra matching what was previously reported. $^1$H NMR (300 MHz, $CDCl_3$): δ 5.85-5.74 (m, 1H), 5.02-4.90 (m, 2H), 3.66 (s, 3H), 2.30 (t, J=7.8 Hz, 2H), 2.05 (q, J=7.2 Hz, 2H), 1.64-1.57 (m, 2H), 1.39-1.29 (m, 10H).

Procedure for the Cross Metathesis.

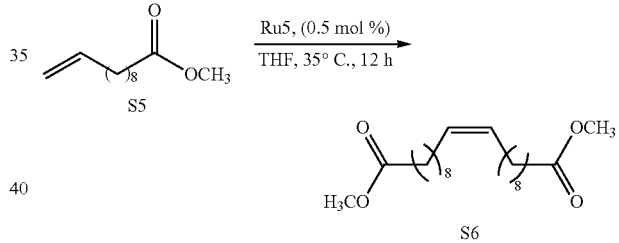

To an oven-dried 50 mL Schlenk tube was added 990 mg (5.0 mmol) of methyl 10-undenenoate in 1.1 mL of freshly distilled THF. The reaction was placed in a pre-heated oil bath at 35° C., to the reaction was added 16 mg (0.025, 0.05 mol %) of Ru5. The reaction was left for 12 h and was then quenched with the addition of 500 mg (30 equivalents) of the isocyanide grafted silica gel 2. The reaction was left to stir for 30 minutes at 35° C. at which time the silica gel was removed by filtering the reaction through a medium porosity filter frit. The silica gel was eluted with 10 ml of distilled $CH_2Cl_2$, the eluent was combined and divided in half. One half of the reaction was directly concentrated and analyzed for ruthenium content, the second half of the reaction was concentrated and column purified over 2.5 g (2.0 g of silica gel per 0.01 mmol of catalyst), prior to analysis.

Example 5

Removal of Palladium (Pd) from Cross Coupling Reactions Using Isocyanide Reagents Owing to its versatility in cross-coupling reactions, palladium (Pd) has found broad application in organic synthesis. Despite the venerated status of Pd in organic synthesis, a problem associated with Pd-mediated cross coupling is practical in nature: the palladium catalyst and decomposed Pd by-products can be difficult to remove from the desired product. This is especially a concern in the synthesis of bioactive compounds where trace transition metal is undesired. In the pharmaceutical industry, there is a regulatory standard requiring less than 5-10 ppm of residual palladium in any active pharmaceutical ingredient (API). As a result, screening assays are often used to help identify the best available scavenger or purification may be done after the cross coupling step. Isocyanides 1 and 2 were found to remove Pd efficiently in several different cross coupling reactions, for both Pd(0) and Pd(II) oxidation states (Scheme B1).

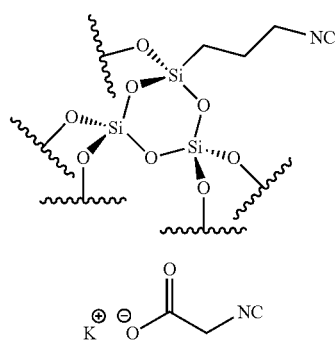

New scavengers are needed that function effectively for the wide range of Pd catalysts existing in either the Pd(0) or Pd(II) oxidation states. Existing scavenger materials include solid-supported amines and thiols, but not isocyanides. For instance, trimercaptotriazine was one of the first reagents identified that could remove palladium species, and when placed on a polystyrene support, was able to remove palladium from a reaction workup. Crudden et al. demonstrated that both thiol- and amine-containing silica and mesoporous silica supports effectively removed palladium(II) from solution. Accordingly, thiol-grafted silica gel has been used by industrial groups for the removal of palladium. One of the shortcomings of existing reagents is the ability to bind strongly to multiple oxidation states of the metal. Regardless of the initial catalyst used, both Pd(II) and Pd(0) oxidation states are present at the end of the cross coupling reaction. Thiol-based systems work best for palladium(II) and phosphine ligands tend to work best for palladium(0). As a result, no single scavenger has emerged that can efficiently remove all of the different metal species present, and this shortcoming continues to drive the development of new metal scavengers.

Isocyanides present unique ligand properties due to their sigma donor strength and their weak pi acidity. The polar isocyanide 2 was previously shown to quench and remove ruthenium from metathesis reactions in solution and more recently, isocyanide 1, supported on silica gel effectively removes a wide variety of Grubbs ruthenium carbenes from metathesis reactions to less than 10 ppm Ru. Because isocyanide is a good ligand for other late transition metals, and because of Pd's importance in cross coupling reactions, we investigated Pd removal using isocyanide reagents, where a unique isocyanide Pd bond might offer the needed flexibility to bind Pd(0) and Pd(II) with similar effectiveness.

Figure 18:
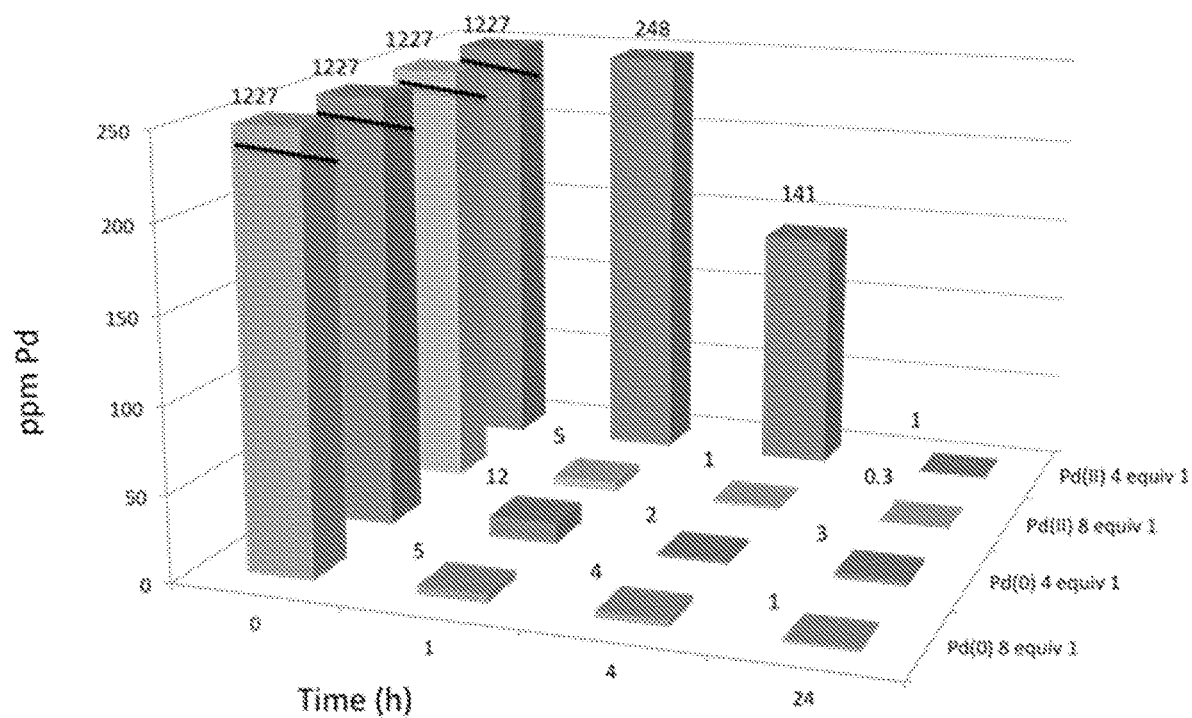
FIG. 18. Removal of Pd(0) and Pd(II) from a toluene solution. Conditions: 0.01 M $Pd(OAc)_2$ or $Pd(PPh_3)_4$ in toluene, treated with 1 (n equivalent) at room temperature, under stirring.

First, the isocyanide silica gel 1 was evaluated for the removal of Pd(II) using a solution of Pd(OAc)$_2$ in toluene at an initial concentration of 1227 ppm Pd, as seen in FIG. 18. To the solution was added either 4 or 8 equivalent 1. After a time interval, the silica gel was allowed to settle, and an aliquot was removed and analyzed for Pd using a digestion protocol followed by analysis using inductively-coupled plasma mass spectrometry (ICP-MS). With 4 equivalent 1, a 24 h period is required to reach less than 1 ppm (99.935% Pd removed). For a reaction that used 5 mol % Pd catalyst, this amounts to 20 mol % silica gel 1 needed. With 8 equivalent 1, there is faster capture of Pd; after only 1 h, there was 5 ppm Pd and after 4 h, 1 ppm Pd was reached (99.886% Pd removed). Most likely the use of fewer equivalents 1 requires recruitment of isocyanides that may be less available on the surface of the material.

Next isocyanide 1 was evaluated for the removal of Pd(0) from a stock solution of Pd(PPh3)4 in toluene. Isocyanide 1 reduced Pd levels more quickly for Pd(0) and there was a less dramatic difference between 4 or 8 equivalent 1. Only 4 equivalent 1 results in 99.031% removal of Pd after 1 h (12 ppm). A longer treatment period (>4 h) brought Pd levels below 2 ppm. Use of 8 equivalent 1 is somewhat more effective at the shorter time periods, but both 4 and 8 equivalent treatments could reach >99.764% Pd removal after a 24 h period.

Since screening showed promising results, the isocyanide scavengers were evaluated in a standard Suzuki coupling (Table B1). After the cross coupling was complete, several different treatment conditions were investigated. To establish a benchmark, the crude reaction was passed through celite (Table B1, entry 1). With a Pd concentration as high as 16000 ppm Pd in the product, the celite treatment was found to remove a significant fraction of Pd from the nonpolar product 3. In all of these reactions, ppm Pd reported is the amount of Pd detected in the crude, evaporated organic product (after removal of reaction solvent). After only 4 h, 8 equivalent (24 mol %) 1 removed 99.999% Pd after simple filtration (fritted filter funnel) to remove the silica gel (entry 2); 16 equivalent (48 mol %) silica gel 1 was more effective (entry 3). After 4 h, 8 equivalent silica gel 1 was removed by column chromatography through silica gel, which resulted in the removal of 99.999% Pd (entry 4). In entries 2-5, there was no pretreatment with celite, which bodes well for silica gel-based recovery of expensive platinum group metals. Purification through silica gel is acceptable for small-scale reactions, but stirring over silica 1 followed by filtration would be preferred in large-scale reactions.

The homogeneous isocyanide KO$_2$CCH$_2$NC was also highly effective for the removal of residual palladium from the Suzuki reaction, when combined with silica gel chromatography (Table B1, entry 5). Previously, our laboratory had shown that the isocyanide 2 was effective for the removal of ruthenium metal from metathesis reactions. To the best of our knowledge, this commercially-available isocyanide has not been previously shown to remove Pd from a cross coupling reaction.

TABLE B1

Removal of Palladium from a Suzuki Reaction

TABLE B1-continued

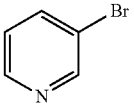

| Entry | Treatment[a] | Time/h | Chrom? | Pd/ppm[b] | % Pd removed |
|---|---|---|---|---|---|
| 1 | celite filtration | n/a | n/a | 143.79 | 99.101 |
| 2 | 1 (8 equiv) | 4 | no | 0.21 | 99.999 |
| 3 | 1 (16 equiv) | 4 | no | 0.02 | 99.999 |
| 4 | 1 (8 equiv) | 4 | yes | 0.08 | 99.999 |
| 5 | 2 (5 equiv) | 1 | yes | 0.35 | 99.998 |

[a]Equivalents of isocyanide are based on catalyst loading: e.g. 8 equiv 1 amounts to 24 mol % 1.
[b]Maximum theoretical concentration of Pd in 3 before treatment: 16,000 ppm.

Removal of Pd from the polar products of Suzuki cross coupling is more difficult, but possible with isocyanides. Cross coupling of 3-bromopyridine with phenylboronic acid was performed with two different Pd precatalysts (Table B2). The resulting biaryl 4 is capable of coordination to Pd, so passive treatment methods such as celite were expected to be ineffective. Celite alone was found to be a poor scavenger with either Pd source (FIG. 19). Silica gel purification gave substantial improvements for Pd(0), but less improvement was seen with Pd(II). The silica 1 was used to treat the crude reaction, followed by simple filtration without chromatography, and gave similar results with either Pd source (4 h, rt). Use of polar 2 combined with silica gel purification gave excellent results. Celite and unmodified silica gel did not effectively remove Pd, leaving yellow samples after treatment. The product of this Suzuki coupling is difficult to purify due to the presence of the pyridine. Each of the isocyanide treatments were performed without any prior celite purification.

Palladium can also be removed effectively from a Heck reaction, with similar results as those observed in Tables B1 and B2.

Palladium removal with isocyanide scavengers is also effective for the widely-used Buchwald-Hartwig amination. The unique Pd ligand system employed, the elevated reaction temperatures and the potential of the substituted aniline product to bind and retain Pd were expected to pose a challenge for the Pd removal step. Simple filtration through celite was ineffective, leaving high levels of residual Pd (Table B3, entry 1). In contrast, isocyanide silica 1 reduced Pd levels to less than 3 ppm Pd using a 4 h treatment time and simple filtration (entries 2, 3). Use of silica gel 1 combined with column chromatography removes 99.998% Pd and reduces Pd levels to below 1 ppm (entry 4). The homogeneous isocyanide, when followed by silica gel chromatography, registered 0.5 ppm Pd, for 99.998% removal (entry 5).

TABLE B2

Removal of Palladium from a Polar Product of Suzuki Coupling Using Pd(0) and Pd(II) Precatalysts

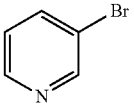

| Entry | Treatment[a] | Time/h | Chrom? | Pd(0) Pd/ppm[b] | Pd(II) Pd/ppm[b] |
|---|---|---|---|---|---|
| 1 | celite filtration | n/a | n/a | 13,650 | 5404 |
| 2 | silica gel chrom. | 4 | yes | 94.41 | 470.99 |
| 3 | 1 (8 equiv) | 4 | no | 23.29 | 39.56 |
| 4 | 1 (16 equiv) | 4 | yes | 14.26 | 7.83 |
| 5 | 2 (5 equiv) | 2 | yes | 11.25 | 111.48 |

[a]Equivalents of isocyanide are based on catalyst loading: e.g. 8 equiv 1 amounts to 24 mol % 1.
[b]Maximum theoretical concentration of Pd in 4 before treatment: 20,100 ppm.

TABLE B3

Removal of Palladium from a Buchwald-Hartwig Reaction

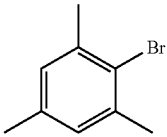

| Entry | Treatment[a] | Time/h | Chrom? | Pd/ppm[b] | % Pd removed |
|---|---|---|---|---|---|
| 1 | celite filtration | n/a | n/a | 4146 | 83.613 |
| 2 | 1 (8 equiv) | 4 | no | 1.52 | 99.994 |
| 3 | 1 (16 equiv) | 4 | no | 2.35 | 99.991 |
| 4 | 1 (8 equiv) | 3 | yes | 0.60 | 99.998 |
| 5 | 2 (5 equiv) | 2 | yes | 0.50 | 99.998 |

[a]Equivalents of isocyanide are based on catalyst loading: e.g. 8 equiv 1 amounts to 40 mol % 1.
[b]Maximum theoretical concentration of Pd in 6 before treatment: 25,300 ppm.

Last, an even more challenging case was examined for Pd removal using isocyanide scavengers. A double Buchwald-Hartwig amination was conducted, which requires high Pd catalyst loading and high reaction temperatures. The double Buchwald-Hartwig reaction of amines onto a 1,2-dibromoarene provides a key step to build benzimidazoles and benzimidazolium ring systems. As an intermediate used in heterocycle synthesis, the diamine 7 is typical of intermediates that might be encountered in the synthesis of pharmaceuticals and drug candidates. Furthermore, the 1,2-benzenediamine 7 is capable of bidentate coordination to Pd, which should make Pd removal more difficult. Diamine 7 was isolated and purified by silica gel chromatography and contained 221 ppm Pd. On treatment with 1, a tenfold reduction of Pd was found (Scheme B2). It is particularly difficult to remove Pd from polar, chelating diamines

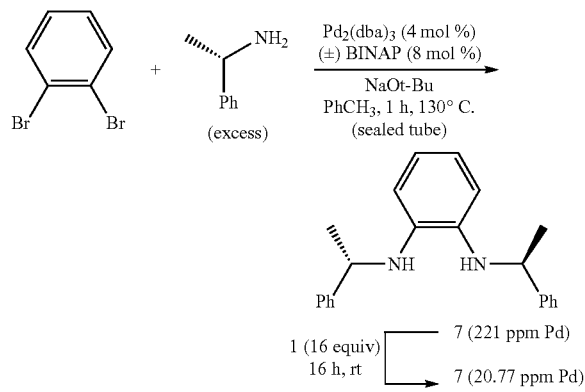

Isocyanide complexes of Pd(II) and Pd(0) are documented in the literature. For example, Angelici et al. prepared cis-$Cl_2Pd(CNR)_2$ in a displacement reaction starting from $Cl_2Pd(NCCH_3)_2$. Ito and coworkers used a $Pd(OAc)_2$-t-octylisocyanide catalyst system, thought to form a Pd(0) isocyanide complex in situ, to achieve intramolecular bis-silylation of alkynes. In a Pd(II) complex, an isocyanide is capable of displacing a $Ph_3P$ ligand. tert-Butyl isocyanide can displace both phosphines from $Pt(Pt-Bu_3)_2$ to form the trinuclear species $[Pt_3(\mu\text{-CNt-Bu})_3(\text{CNt-Bu})_3]$. Figueroa et al. successfully prepared monomeric $(ArNC)_2Pd(0)$ employing aryl isocyanides with very bulky aromatic groups. For the most part, preparations of Pd(0) isocyanide complexes result in polynuclear species.

The Pd complex $Cl_2Pd(PPh_3)_2$ was removed from solution by silica gel 1. A THF solution of $Cl_2Pd(PPh_3)_2$ was treated with 16 equivalent of silica gel 1. The yellow solution became clear and colorless when the silica gel was allowed to settle after a few minutes. After 30 min, the silica gel was isolated by filtration and the eluent was found to contain $Ph_3P$, indicating that a ligand displacement reaction had taken place.

Figure 19A:
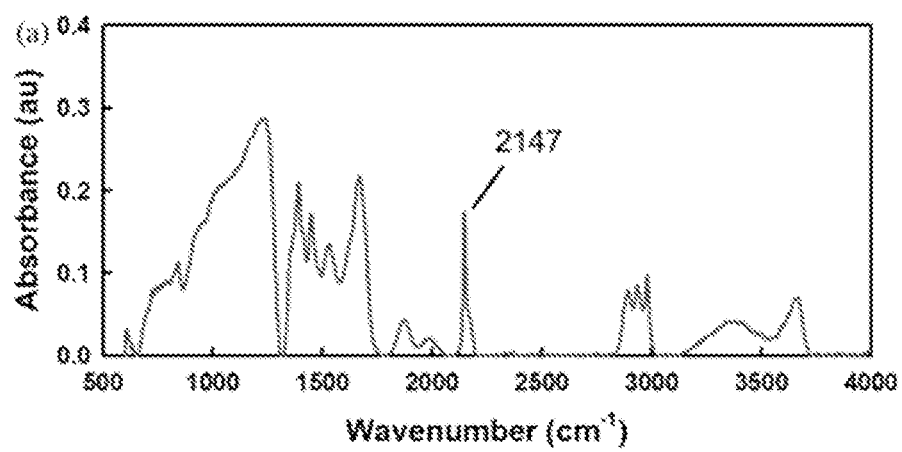
FIGS. 19a-19b. Reflectance IR Spectra of (a) Silica Gel 1 (FIG. 19a), and (b) Silica Gel 1-$Cl_2Pd(PPh_3)_2$ (FIG. 19b).
Figure 19B:
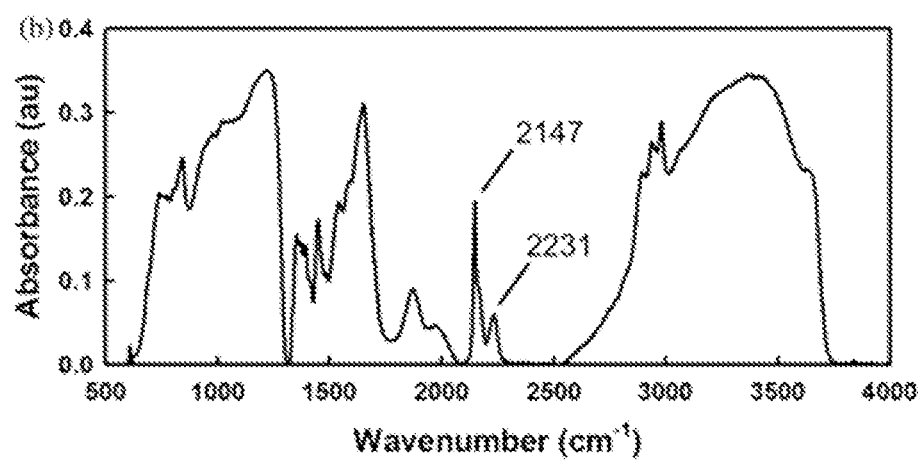

A reflectance IR spectrum of the product formed between silica gel 1 and $Cl_2Pd(PPh_3)_2$ revealed a new isocyanide absorption consistent with a Pd(II)-bound isocyanide (FIG. 19). This commonly used precatalyst was chosen because several $X_2Pd(CNR)_2$ organometallic complexes are known in the literature allowing for spectroscopic comparisons to be made. In FIG. 19a, the reflectance IR spectrum of silica gel 1 shows a strong absorption at 2147 $cm^{-1}$, which is indicative of an isocyanide. The reflectance IR spectrum of the silica gel isolated after scavenging $PdCl_2(PPh_3)_2$ is shown in FIG. 19b. In addition to the isocyanide peak at 2147 $cm^{-1}$, a new absorbance appeared at 2231 $cm^{-1}$. This new peak is shifted 84 $cm^{-1}$ as compared to the free isocyanide, consistent with Angelici's observed difference between peak frequencies in the free isocyanide and in isocyanide bound to both Pd(II) and Pt(II) complexes. The broadness of the new peak may be due to a single species or due to multiple species with different coordination numbers. It is also possible that there is a monodentate species, unknown in the literature, or that a bidentate trans-isomer, trans-$Cl_2Pd(1)_2$ is present. To the best of our knowledge, trans-$Cl_2Pd(CNR)_2$ species do not appear to be known, but the congener trans-$Br_2Pd(CNt-Bu)_2$ is and has an absorbance at 2224 $cm^{-1}$, similar to the observed stretching frequency. The new peak is consistent with at least one Pd-(CNR) bond.

Isocyanide reagents offer effective means for the removal of residual palladium from cross coupling reactions. Isocyanides have not been used previously to remove Pd from cross coupling reactions. Isocyanide reagents, due to their unique ligand properties, are able to effectively remove Pd(0) and Pd(II) with similar effectiveness. In general, the isocyanide scavenging reagents were able to reach 1-10 ppm levels of residual Pd, often without the need of a chromatography step. Reflectance IR of the Pd treated silica gel show a new peak consistent with a Pd-isocyanide bond.

Experimental Details—Silica gel 1. Prepared as previously reported, with an isocyanide loading level 1.1-1.6 mmole/g.

Experimental Details—Pd(II). Two solutions were prepared, each consisting of 11.3 mg (0.05 mmol) of $Pd(OAc)_2$ dissolved in 5 mL of toluene. To the stirred solution was added either 133 mg (0.2 mmol) or 266 mg (0.4 mmol) of silica gel 1. Aliquots of the solution were taken after 1 h, 4 h, and 24 h of treatment time by allowing the silica gel to settle and then removing ~1 mL sample from the toluene solution. The mass of the sample obtained (between 800 and 1100 mg) was recorded on an analytical balance and used to determine relative ppm of palladium that remained in solution. The mass of each aliquot removed was recorded, the solvent was evaporated and the remaining material was digested with 2 mL of TraceSelect grade nitric acid. The samples was then diluted to 50 mL final volume and analyzed by ICP-MS. This value was used to back calculate the level of Pd in the aliquot which was originally removed, and is indicative of the amount of Pd in solution when the aliquot was removed.

Experimental Details—Pd(0). Two solutions of 57.8 mg (0.05 mmol) of $Pd(PPh_3)_4$ was dissolved in 5 mL of toluene, to the stirring solution was added 133 mg (0.2 mmol) or 266 mg (0.4 mmol) of silica gel 1. Aliquots (0.880 to 1.339 mL) of the solution were taken after 1 h, 4 h, and 24 hours of treatment by letting the silica settle and removing a sample from the toluene. The mass of the sample obtained was recorded and used to determine relative ppm of palladium that remained in solution. The mass of the sample obtained (between 763 and 1161 mg) was recorded and used to determine relative ppm of palladium that remained in solution. The mass of each aliquot removed was recorded, the solvent was evaporated and the remaining material was digested with 2 mL of TraceSelect grade nitric acid. The samples was then diluted to 50 mL final volume and analyzed by ICP-MS. This value could be used to back calculate the level of Pd in the aliquot which was originally removed, and reflective of the residual Pd in solution when the aliquot was removed.

Figure 20:
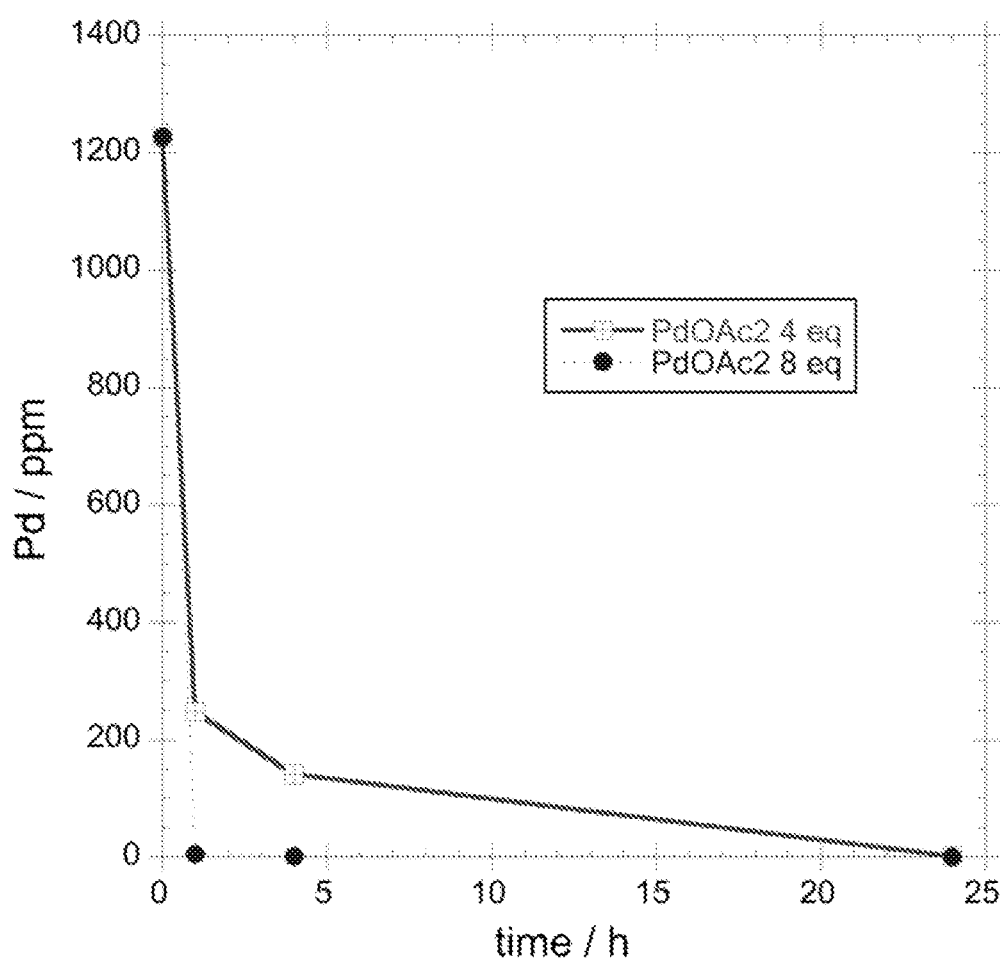
FIG. 20. Detailed plot of $Pd(OAc)_2$ removal from a 0.01 M solution in toluene at room temperature using silica gel 1. At the indicated time, the silica gel was allowed to settle, an aliquot was removed, weighed, concentrated and digested with nitric acid prior to ICP-MS analysis.

The following data given in Table B4 was used to generate the plot in FIG. 18. A detailed graph is provided in FIG. 20.

TABLE B4

Removal of $Pd(OAc)_2$ Using Scavenger 1

| Entry | Time/h | Equiv 1$^a$ | ppm Pd | % Removed |
|---|---|---|---|---|
| 1 | 0 | none | 1227.6 | |
| 2 | 1 | 4 | 247.8 | 79.814 |
| 3 | 4 | 4 | 141.3 | 88.490 |
| 4 | 24 | 4 | 0.8 | 99.935 |
| 5 | 1 | 8 | 5.4 | 99.560 |

TABLE B4-continued

Removal of Pd(OAc)$_2$ Using Scavenger 1

| Entry | Time/h | Equiv 1[a] | ppm Pd | % Removed |
|---|---|---|---|---|
| 6 | 4 | 8 | 1.4 | 99.886 |
| 7 | 24 | 8 | 0.3 | 99.976 |

[a]Based on number of mmoles of Pd catalyst.

Figure 21:
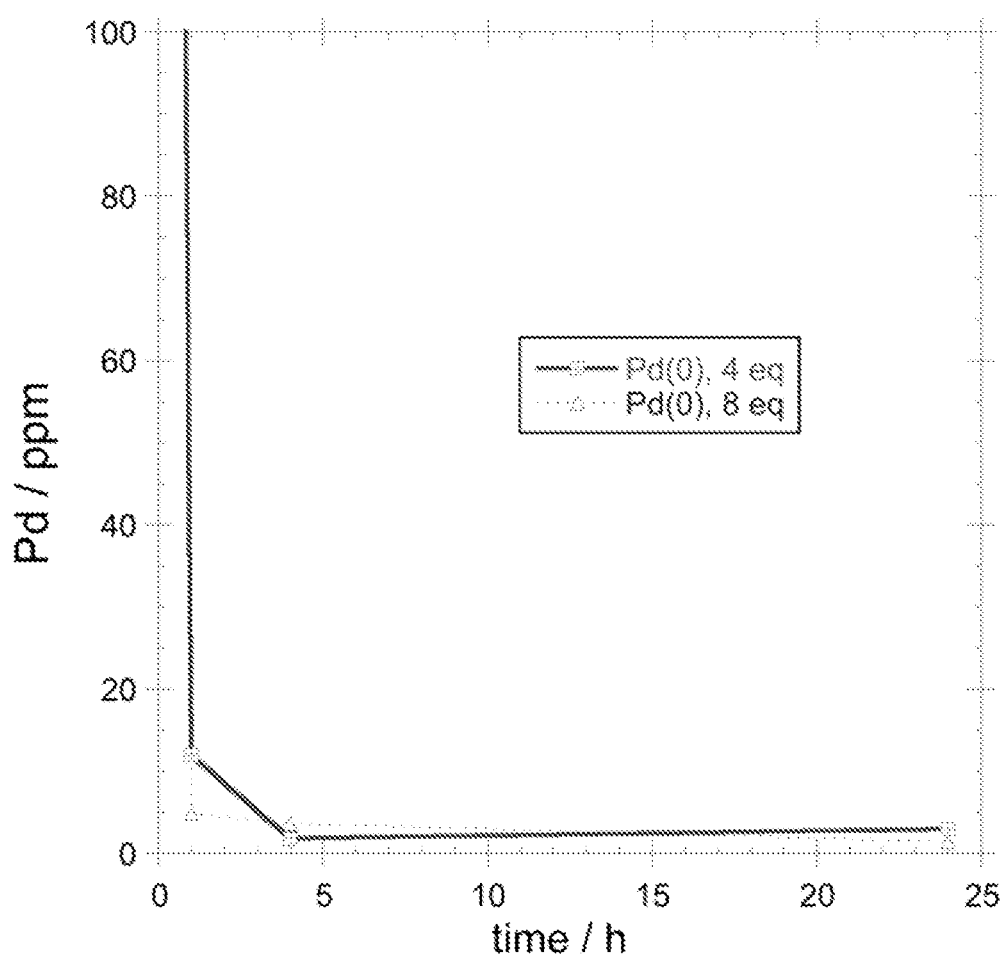
FIG. 21. Detailed Plot of $Pd(PPh_3)_4$ Removal from a 0.01 M solution in toluene at room temperature using silica gel 1. At the indicated time, the silica gel was allowed to settle, an aliquot was removed, weighed, concentrated and digested with nitric acid prior to ICP-MS analysis.

The following data given in Table B5 was used to generate the plot in FIG. 18. The detailed graph is provided in FIG. 21.

TABLE B5

Removal of Pd(PPh$_3$)$_4$ Using Scavenger 1

| Entry | Time/h | Equiv 1[a] | ppm Pd | % Removed |
|---|---|---|---|---|
| 1 | 0 | none | 1227.6 | — |
| 2 | 1 | 4 | 11.9 | 99.031 |
| 3 | 4 | 4 | 1.8 | 99.853 |
| 4 | 24 | 4 | 2.9 | 99.764 |
| 5 | 1 | 8 | 4.9 | 99.601 |
| 6 | 4 | 8 | 3.6 | 99.707 |
| 7 | 24 | 8 | 1.4 | 99.886 |

[a]Based on number of mmoles of Pd catalyst.

General Procedure for Removal of Palladium—Celite Filtration. The reaction was directly purified over 0.5 g of Celite and eluted with an equal volume of the reaction solvent. The sample was concentrated under vacuum (rotary evaporator), a weight of recovered material was obtained, and the desired product was then digested for 12 h at room temperature in 2 mL of concentrated nitric acid.

Method 1. The reaction was not treated with any scavenging material, simply concentrated under vacuum (rotary evaporator), and then directly purified over 1 gram of silica gel per mmol of catalyst used, and eluted with a mobile phase of 10% diethyl ether in hexanes. The fractions which contained product were pooled and concentrated, a weight of material recovered was obtained and the desired product was then digested for 12 h at room temperature in 2 mL of concentrated nitric acid.

Method 2. To the reaction was added 5 equiv (relative to Pd catalyst used) of KO2CCH2NC as a solution in 1 mL of methanol. The isocyanide was left to stir in the reaction for 1-4 h, at the temperature of the reaction. The reaction was then concentrated under vacuum (rotary evaporator) and then directly purified over 1 gram of silica gel per mmol of catalyst used, and eluted with a mobile phase of 10% diethyl ether in hexanes. The fractions which contained product were pooled and concentrated, a weight of material recovered was obtained and the desired product was then digested for 12 h at room temperature in 2 mL of concentrated nitric acid.

Method 3. To the reaction was added 4-8 equiv (relative to Pd catalyst used) of isocyanide containing silica gel 1, the reaction was left to stir for 1-4 h at the temperature of the reaction. The reaction was then concentrated under vacuum (rotary evaporator) and then directly purified over 1 gram of silica gel per mmol of Pd catalyst used, and eluted using 10% diethyl ether in hexanes as the mobile phase. The fractions which contained product were pooled and concentrated, a weight of material recovered was obtained and the desired product was then digested for 12 h at room temperature in 2 mL of concentrated nitric acid.

Method 4. To the reaction was added 8-16 equivalent (relative to Pd catalyst used) of isocyanide containing silica gel 1, the reaction was left to stir for 4 h at the temperature of the reaction. The reaction was then filtered over a medium porosity filter frit, the material was washed with an equal portion (5 mL) of CH$_2$Cl$_2$ and the eluent was collected and concentrated under vacuum (rotary evaporator). A weight of recovered material was obtained and the desired product was then digested for 12 h at room temperature in 2 mL of concentrated nitric acid.

General Procedure for the Suzuki Reaction with Phenyl Boronic acid and 4-Bromoacetophenone.

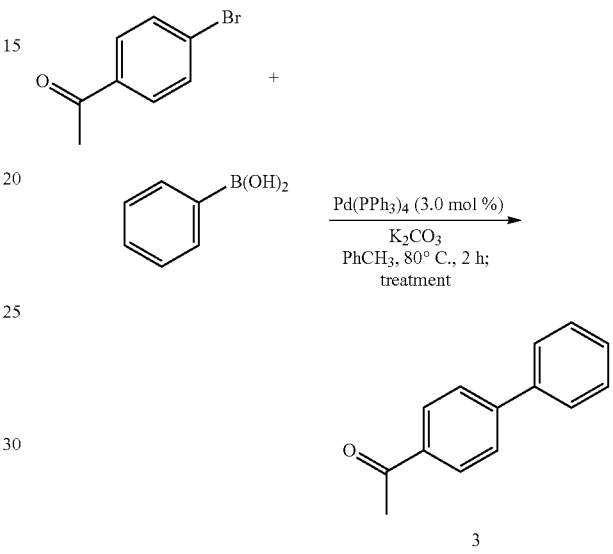

To an oven dried 50 mL Schlenk tube was added 1.0 mmol of the aryl bromide, 1.5 mmol (1.5 equivalent) of the aryl boronic acid, and 1.5 mmol (1.5 equivalent) of potassium carbonate. 5 mL of freshly distilled toluene was then added to the Schlenk tube followed by the addition of 0.03 mmol (3 mol %) of tetrakis(triphenylphosphine)palladium(0). The reaction was then placed directly in a preheated oil bath at 80° C. for 2 h and then treated following one of the previously described procedures. Without any treatment, the theoretical maximum concentration of elemental Pd in the product is calculated to be 16,000 ppm Pd (3.19 mg Pd in a 1 mmole product sample containing 0.03 mmol Pd). This was the value used to determine '% Pd removed.' The desired product could be isolated for characterization purposes, providing spectra data in good agreement with previously published results. 1H NMR (500 MHz, CDCl3, ppm) δ 8.01 (d, J=8.5 Hz, 2 H), 7.65 (d, J=9.0 Hz, 2 H), 7.60-7.58 (m, 2 H), 7.44 (t, J=7.5 Hz, 2 H), 7.39-7.36 (m, 1 H), 2.59 (s, 3 H).

General Procedure for the Suzuki Reaction with Phenyl Boronic Acid and 3-Bromopyridine.

With Pd(0):

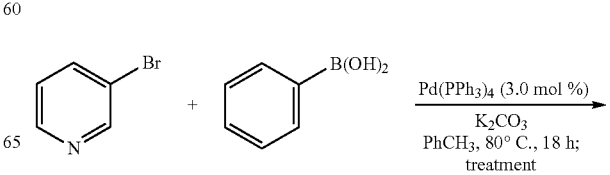

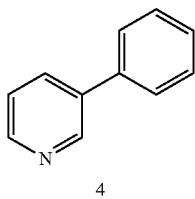

Using tetrakis[triphenylphosphine]palladium(0) as the source of the metal, to an oven dried 50 mL Schlenk tube was added 1.0 mmol of 3-bromopyridine, 1.25 mmol (1.25 equiv) of the aryl boronic acid, and 1.25 mmol (1.25 equiv) of potassium carbonate. 5 mL of freshly distilled toluene was then added to the Schlenk tube followed by the addition of 0.03 mmol (3 mol %) of tetrakis(triphenylphosphine)palladium(0). The reaction was then placed directly in a preheated oil bath at 80° C. for 18 h and then treated following one of the previously described procedures. Without any treatment, the theoretical maximum concentration of elemental Pd in the product is calculated to be 20,100 ppm Pd (3.19 mg Pd in a 1 mmole product sample containing 0.03 mmol Pd). This was the value used to determine '% Pd removed.' The desired product could be isolated for characterization purposes, providing spectra data in good agreement with previously published results. 1H NMR (300 MHz, CDCl3, ppm) δ 8.85 (d, J=2.4 Hz, 1 H), 8.59-8.57 (m, 1 H), 7.87-7.83 (m, 1 H), 7.57-7.55 (m, 2 H), 7.50-7.32 (m, 4 H).

TABLE B6

Removal of Palladium from a Suzuki Reaction with Pd(0)

| Entry | Treatment[a] | Time/h | Chrom? | Method | Pd/ppm | % Pd removed |
|---|---|---|---|---|---|---|
| 1 | celite filtration | n/a | n/a | control | 13,650 | 32.090 |
| 2 | silica gel chrom. | n/a | yes | 1 | 94.41 | 99.530 |
| 3 | 1 (8 equiv) | 4 | no | 4 | 23.29 | 99.884 |
| 4 | 1 (16 equiv) | 4 | no | 3 | 14.26 | 99.929 |
| 5 | KO2CCH2NC (5 equiv) | 2 | yes | 2 | 11.25 | 99.944 |

[a]Equivalents of isocyanide are based on catalyst loading: e.g. 8 equiv 1 amounts to 24 mol % 1.

With Pd(II):

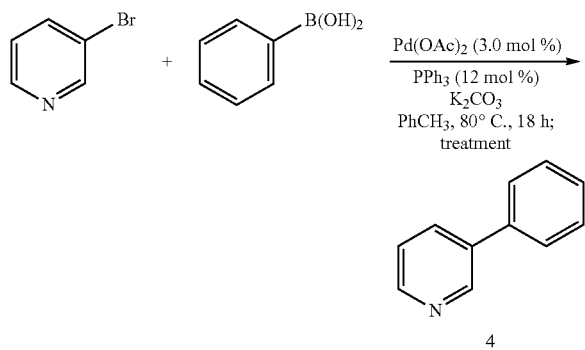

Using palladium(II)acetate as the metal source, to an oven dried 50 mL Schlenk tube was added 1.0 mmol of 3-bromopyridine, 1.25 mmol (1.25 equiva;emt) of the aryl boronic acid, 1.25 mmol (1.25 equiv) of potassium carbonate, and 0.12 mmol (12 mol %) of triphenylphosphine. 5 mL of freshly distilled toluene was then added to the Schlenk tube followed by the addition of 0.03 mmol (3 mol %) of palladium(II)acetate. The reaction was then placed directly in a preheated oil bath at 80° C. for 18 h and then treated following one of the previously described procedures. Without any treatment, the theoretical maximum concentration of elemental Pd in the product is calculated to be 20,100 ppm Pd (3.19 mg Pd in a 1 mmole product sample containing 0.03 mmol Pd). This was the value used to determine '% Pd removed. The desired product could be isolated for characterization purposes, providing spectra data in good agreement with previously published results.

TABLE B7

Removal of Palladium from a Suzuki Reaction with Pd(II)

| Entry | Treatment[a] | Time/h | Chrom? | Method | Pd/ppm | % Pd removed |
|---|---|---|---|---|---|---|
| 1 | celite filtration | n/a | n/a | control | 5404 | 73.114 |
| 2 | silica gel chrom. | n/a | yes | 1 | 470.99 | 97.657 |
| 3 | 1 (8 equiv) | 4 | no | 4 | 39.56 | 99.803 |
| 4 | 1 (16 equiv) | 4 | no | 3 | 7.83 | 99.961 |
| 5 | KO2CCH2NC (5 equiv) | 2 | yes | 2 | 111.48 | 99.445 |

[a]Equivalents of isocyanide are based on catalyst loading: e.g. 8 equiv 1 amounts to 24 mol % 1.

General Procedure for the Heck Reaction between 2-Bromomesitylene and Ethyl Acrylate.

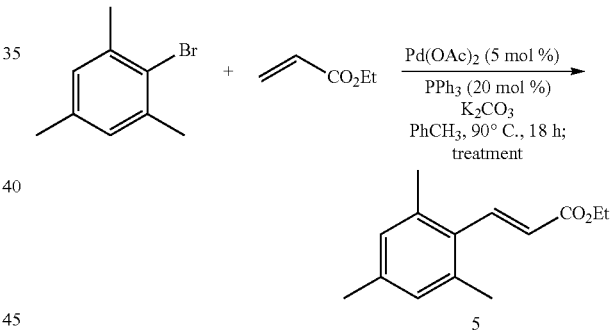

To an oven dried 50 mL Schlenk tube was added 1.0 mmol of the aryl bromide, 2.0 mmol (2.0 equivalent) of ethyl acrylate, and 1.5 mmol (1.5 equivalent) of potassium carbonate. 5 mL of freshly distilled toluene was then added to the Schlenk tube followed by the addition of 0.05 mmol (5 mol %) of Pd(OAc)2 and 0.2 mmol (20 mol %) of triphenylphosphine. The reaction was then placed directly in a preheated oil bath at 90° C. for 18 h and then treated following one of the previously described procedures. Without any treatment, the theoretical maximum concentration of elemental Pd in the product is calculated to be 23,800 ppm Pd (5.32 mg Pd in a 1 mmole product sample containing 0.05 mmol Pd). This was the value used to determine '% Pd removed.' The desired product could be isolated for characterization purposes, providing spectra data in good agreement with previously published results. 1H NMR (500 MHz, CDCl3, ppm) δ 7.85 (d, J=16.5 Hz, 1 H), 6.89 (s, 2 H), 6.07 (d, J=16.5 Hz, 1 H), 4.28 (q, J=7.5 Hz, 2 H), 2.33 (s, 6 H), 2.28 (s, 3 H), 1.34 (t, J=7.5 Hz, 3 H).

TABLE B8

Removal of Palladium from a Heck Reaction

| Entry | Treatment[a] | Time/h | Chrom? | Method | Pd/ppm | % Pd removed |
|---|---|---|---|---|---|---|
| 1 | celite filtration | n/a | n/a | control | 34.65 | 99.854 |
| 2 | 1 (8 equiv) | 4 | no | 4 | 0.37 | 99.998 |
| 3 | 1 (16 equiv) | 4 | no | 4 | 1.45 | 99.994 |
| 4 | 1 (8 equiv) | 3 | yes | 3 | 0.83 | 99.997 |
| 5 | KO$_2$CCH$_2$NC (5 equiv) | 2 | yes | 2 | 11.69 | 99.951 |

[a]Equivalents of isocyanide are based on catalyst loading: e.g. 8 equiv 1 amounts to 40 mol % 1.

General Procedure for the Buchwald-Hartwig Reaction between 2-Bromomesitylene and Morpholine.

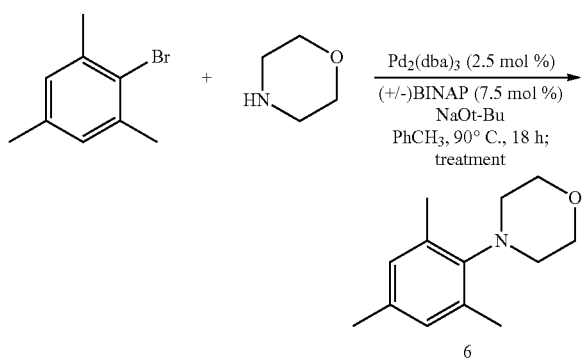

To an oven dried 50 mL Schlenk tube was added 1.0 mmol of the aryl bromide, 1.2 mmol (1.2 equivalent) of morpholine, and 1.2 mmol (1.2 equivalent) of sodium tert-butoxide. 5 mL of freshly distilled toluene was then added to the Schlenk tube followed by the addition of 0.025 mmol (5 mol %) of Pd2(dba)3 and 0.075 mmol (7.5 mol %) of (+/−) BINAP. The reaction was then placed directly in a preheated oil bath at 90° C. for 18 h and then treated following one of the previously described procedures. Without any treatment, the theoretical maximum concentration of elemental Pd in the product is calculated to be 25,300 ppm Pd (5.32 mg Pd in a 1 mmole product sample containing 0.05 mmol Pd). This was the value used to determine '% Pd removed.' The desired product could be isolated for characterization purposes, providing spectra data in good agreement with previously published results. 1H NMR (500 MHz, CDCl3, ppm) δ 6.89 (s, 2 H), 3.89-3.85 (m, 4 H), 3.15-3.13 (m, 4 H), 2.39 (s, 6 H), 2.32 (s, 3 H).

Removal of Pd from Diamine 7.

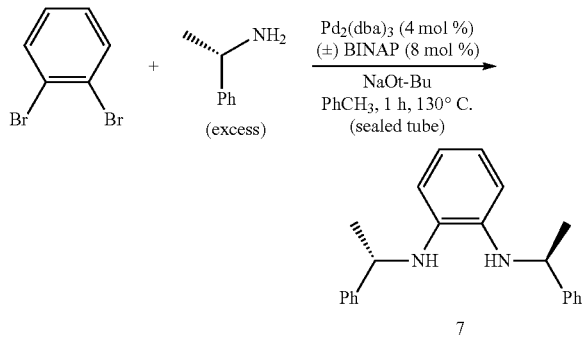

To an oven dried 100 mL Schlenk tube was added 0.105 mmol (4 mol %) of Pd2(dba)3 and 0.21 mmol (8.0 mol %) of (+/−) BINAP in 5 mL of toluene. The Schlenk tube was degassed with nitrogen for 15 minutes and then sealed and placed in an oil bath at 140° C. for 15 min After 15 minutes the solution was allowed to cool to room temperature at which point 2.5 mmol of the aryl bromide, 12.5 mmol (5.0 equiv) of the amine, and 10.0 mmol (4.0 equiv) of sodium tert-butoxide in 13 mL of toluene. The reaction was then degassed with nitrogen for 15 minutes and then sealed and placed directly in a preheated oil bath at 140° C. for 90 min. the reaction was cooled to room temperature and diluted with 45 mL of diethyl ether and passed through a 10 cm plug of Celite which was then washed with another 45 mL of diethyl ether. The solution was concentrated to afford the crude product as a red oil. This material was dissolved in enough toluene to bring the final volume of the solution to 10 mL and split into 5 equal fractions. Each fraction was further diluted to a final volume of 5 mL prior to treatment. The control was directly analyzed without any treatment, the remaining samples were mixed with 8 or 16 equiv of isocyanide containing silica gel 1 for 16 h at room temperature. After a 16 hour treatment period, the silica gel was removed by filtration and the pad of collected silica gel was washed with an equal volume of diethyl ether. The organic fractions were then concentrated and analyzed for residual Pd. The product 7 could be isolated for characterization purposes, providing spectra data in good agreement with previously published results. 1H NMR (500 MHz, CDCl3, ppm) δ 7.39 (d, J=7.0 Hz, 4 H), 7.30 (t, J=7.5 Hz, 4 H), 7.21 (t, J=7.0 Hz, 2 H), 6.57-6.55 (m, 2 H), 6.45-6.42 (m, 2 H), 4.48 (q, J=6.0 Hz, 2 H), 3.71 (br s, 2 H), 1.57 (d, J=6.5 Hz, 6 H).

TABLE B9

ICP Determination of Untreated and Treated 7.

| entry | treatment | Pd/ppm |
|---|---|---|
| 1 | none | 221.6 |
| 2 | 1 (8 equiv), 16 h, rt | 29.5 |
| 3 | 1 (16 equiv), 16 h, rt | 20.8 |

Figure 22:
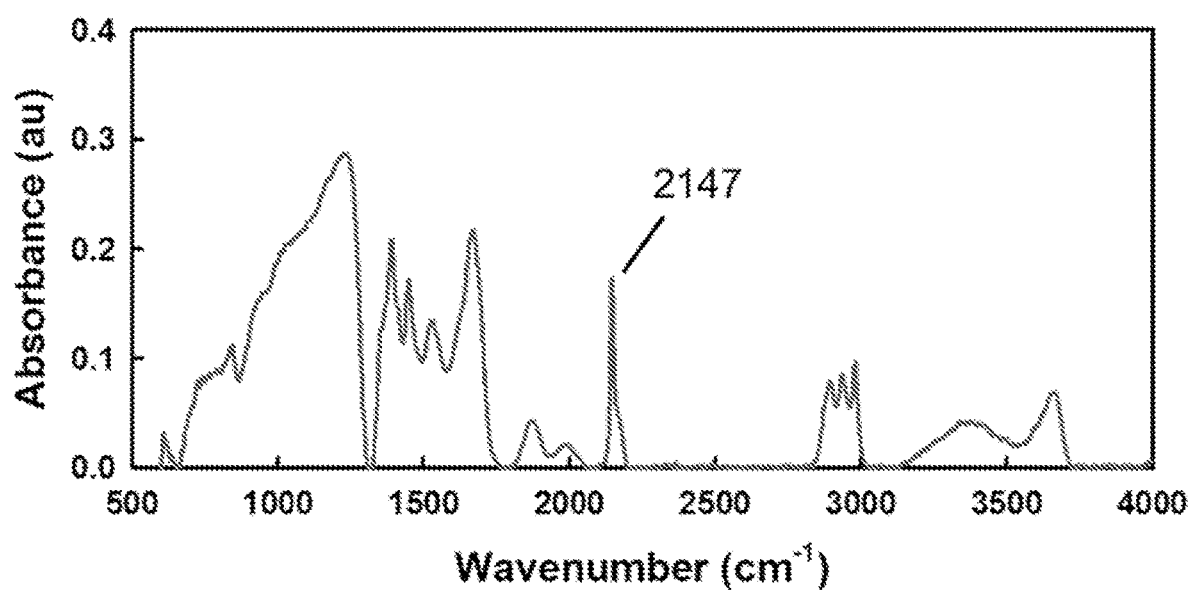
FIG. 22. The reflectance mode IR of the isocyanide-grafted silica gel 1. The peak at 2147 $cm^{-1}$ is assigned to a silica gel-bound isocyanide.

Reflectance IR Determination. Single particles of silica gel were viewed under the reflectance IR microscope, and the IR spectrum was recorded. The spectral resolution was 4 cm$^{-1}$ and 128 scans were averaged and can be seen in FIG. 22.

Figure 23:
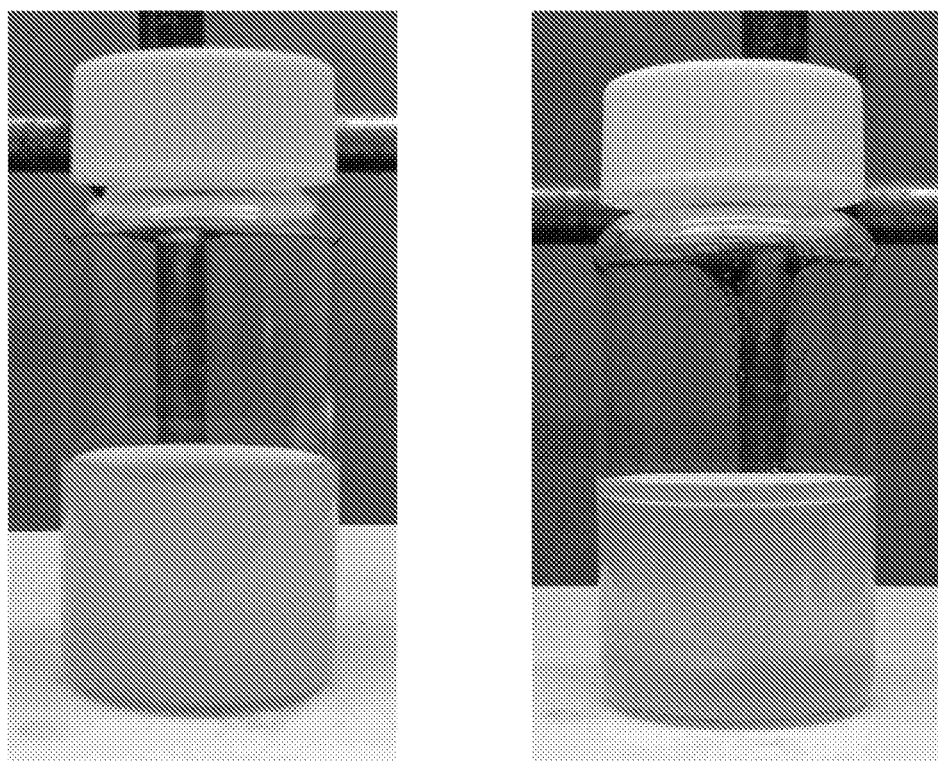
FIG. 23. Solution of $PdCl_2(PPh_3)$, before (left) and after (right) stirring with isocyanide-grafted silica gel 1 for 30 minutes.
Figure 24:
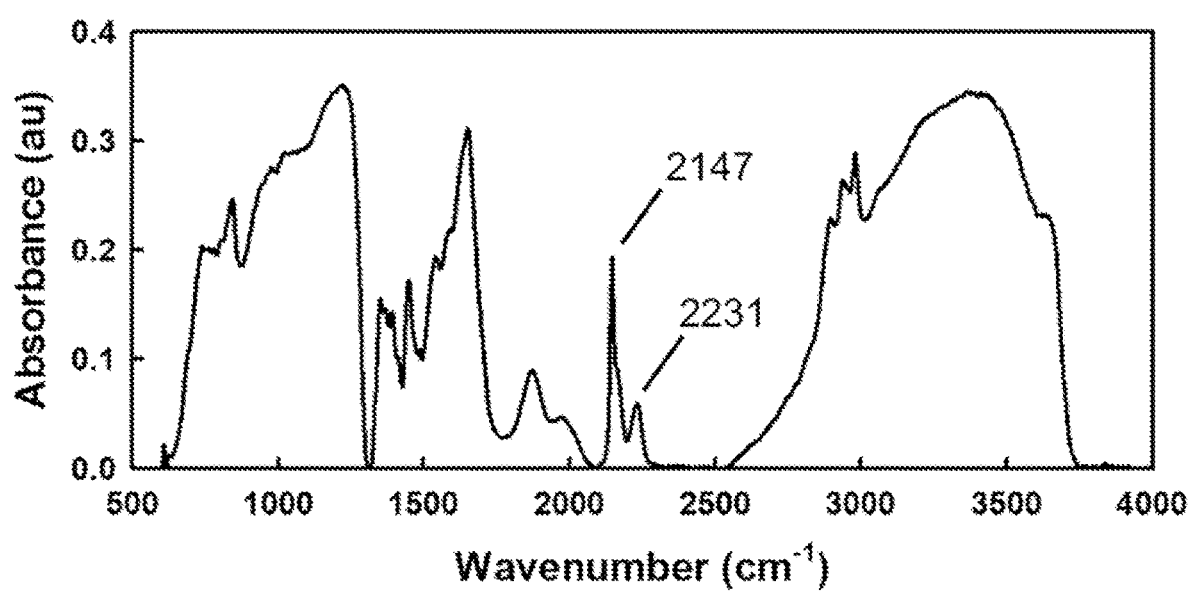
FIG. 24. The reflectance mode IR of the isocyanide-grafted silica gel 1 after treatment with a solution of $Cl_2Pd(PPh_3)_2$. The peak at 2231 $cm^{-1}$ is assigned to a isocyanide bound to Pd(II).
Figure 25:
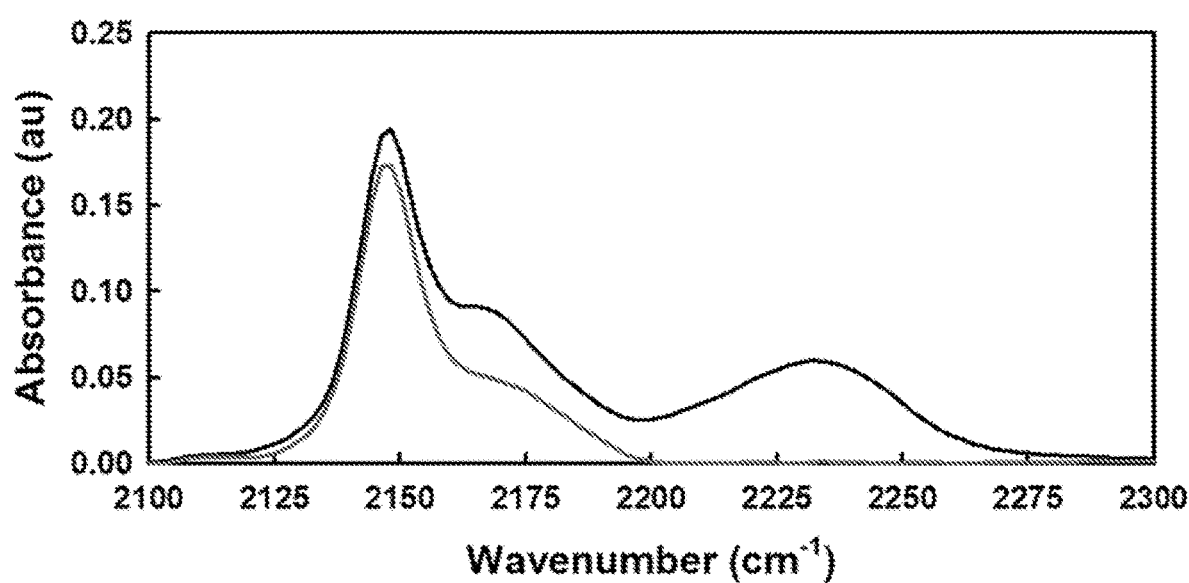
FIG. 25. Expansion of the 2300-2100 $cm^{-1}$ region. The peak at 2147 $cm^{-1}$ is assigned to the silica gel bound isocyanide and the new peak at 2231 $cm^{-1}$ is assigned to an isocyanide bonded to Pd(II).
Figure 26:
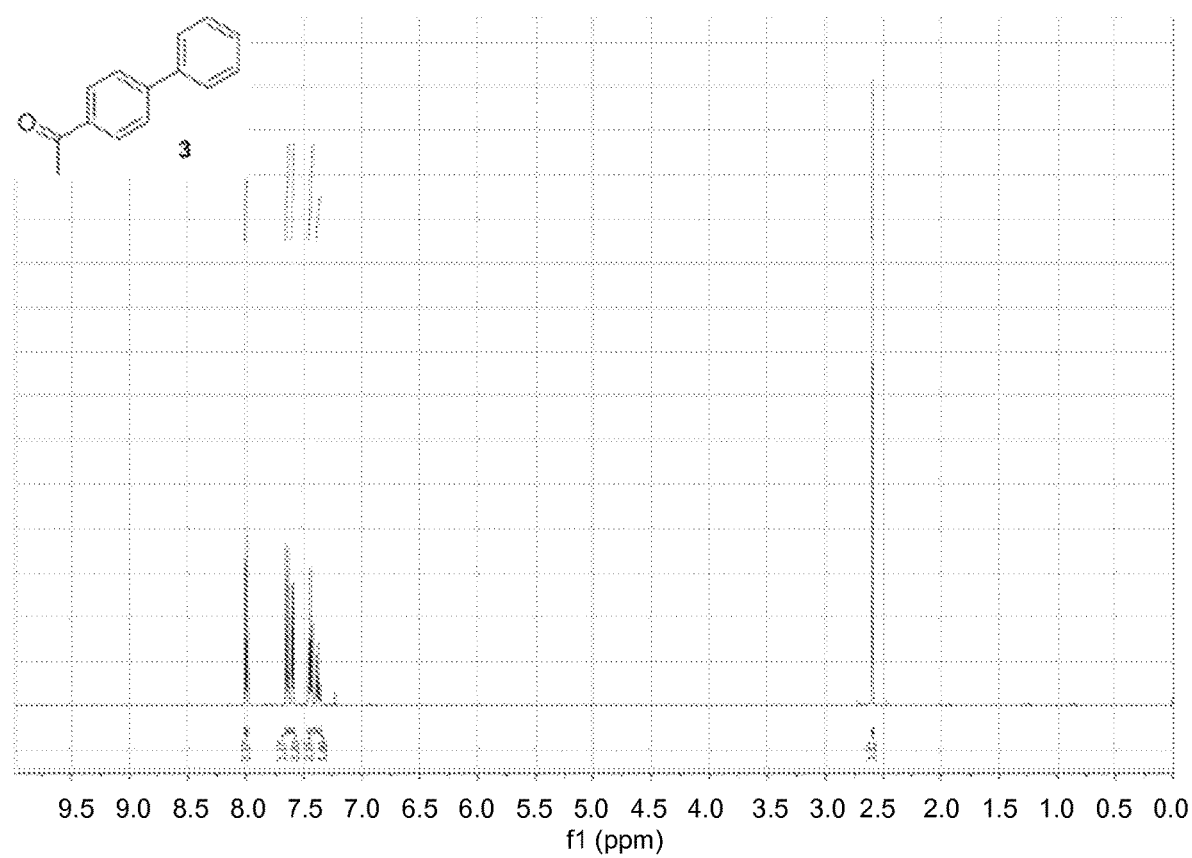
FIGS. 26-30. Analysis by ICP-MS.
Figure 27:
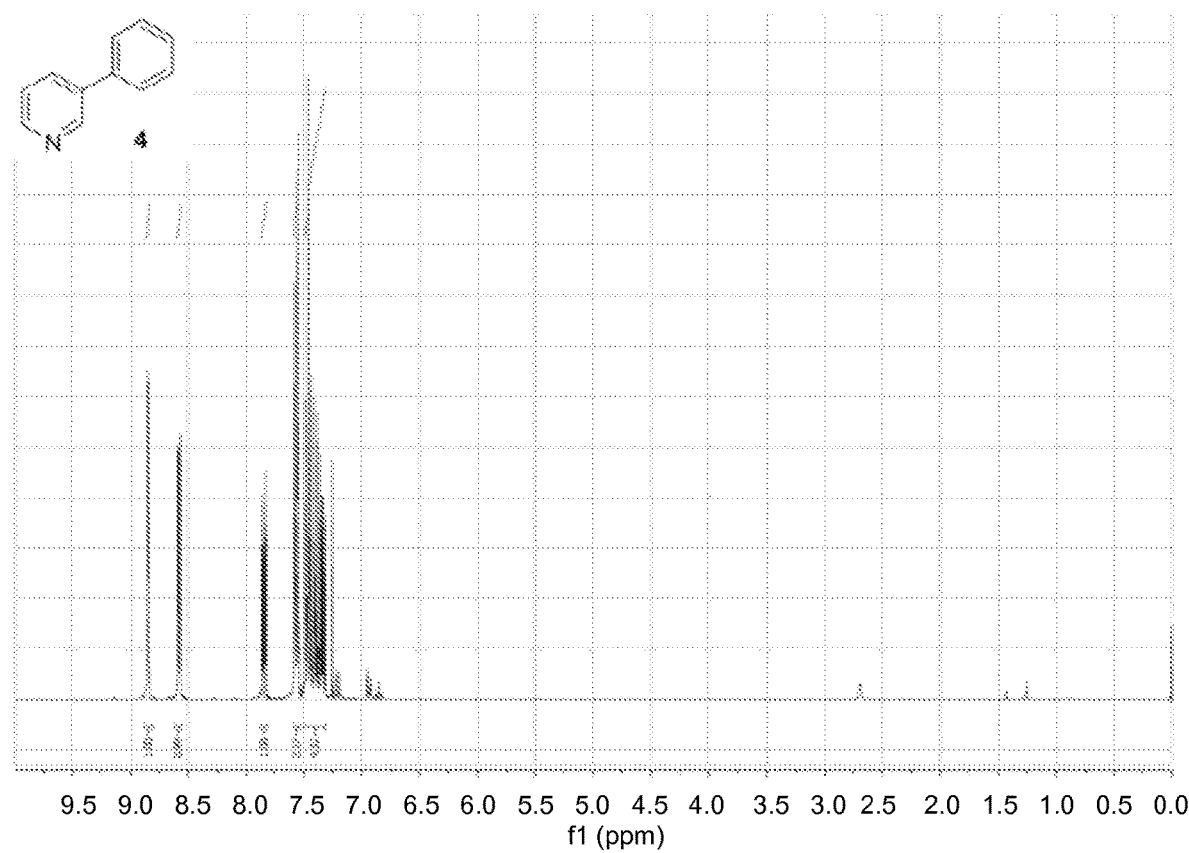
Figure 28:
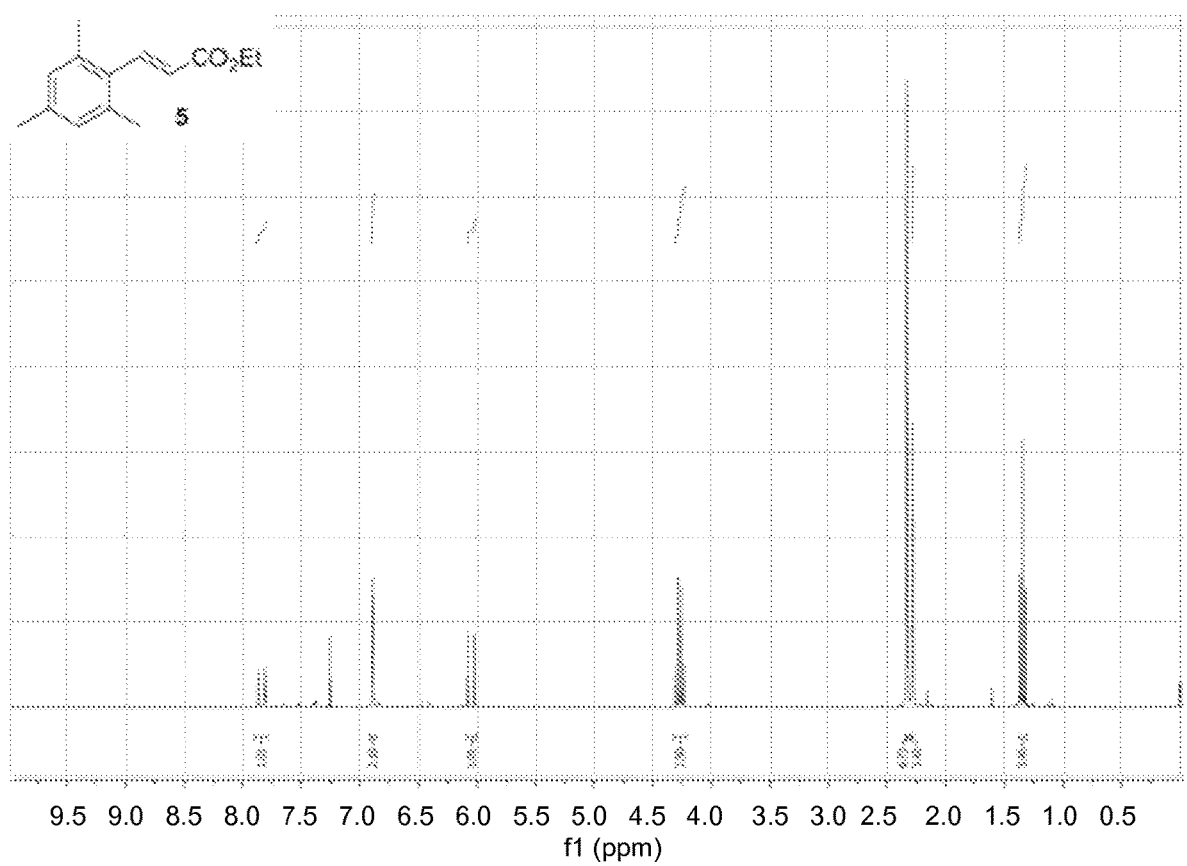
Figure 29:
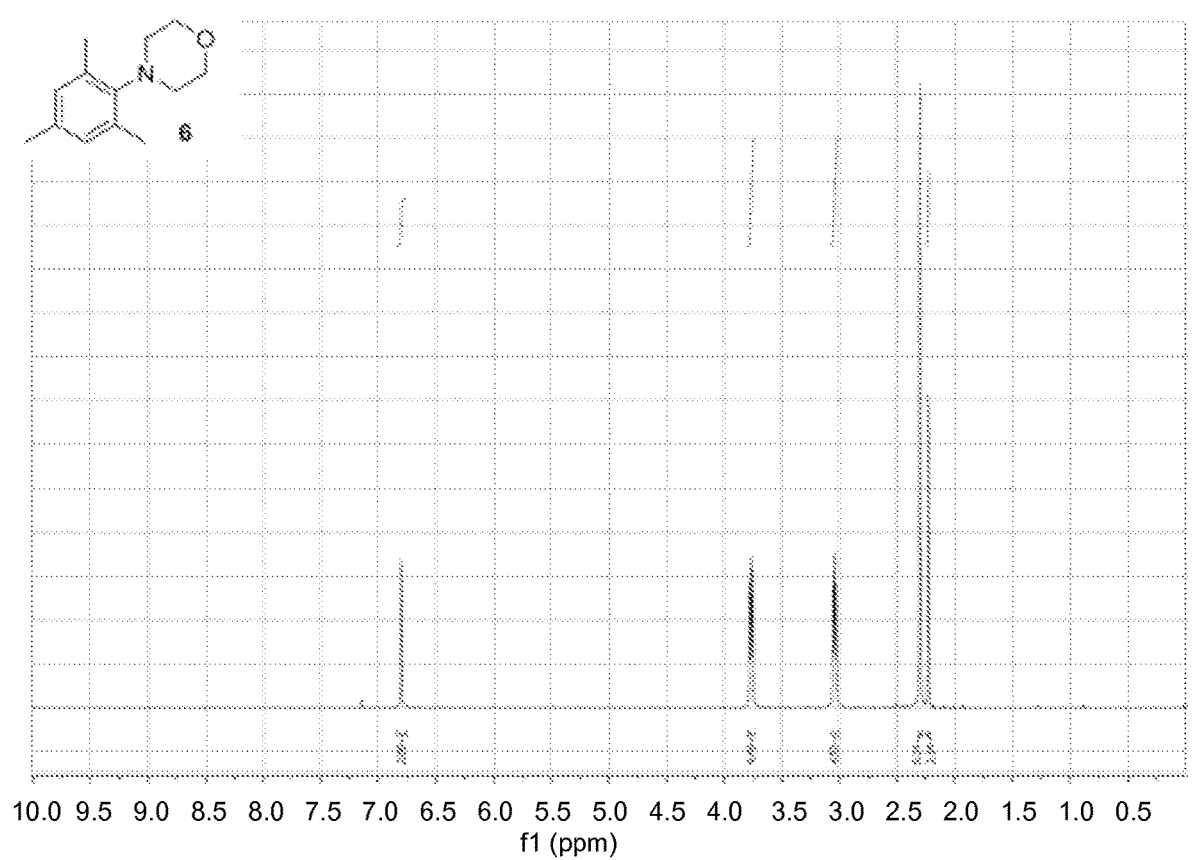
Figure 30:
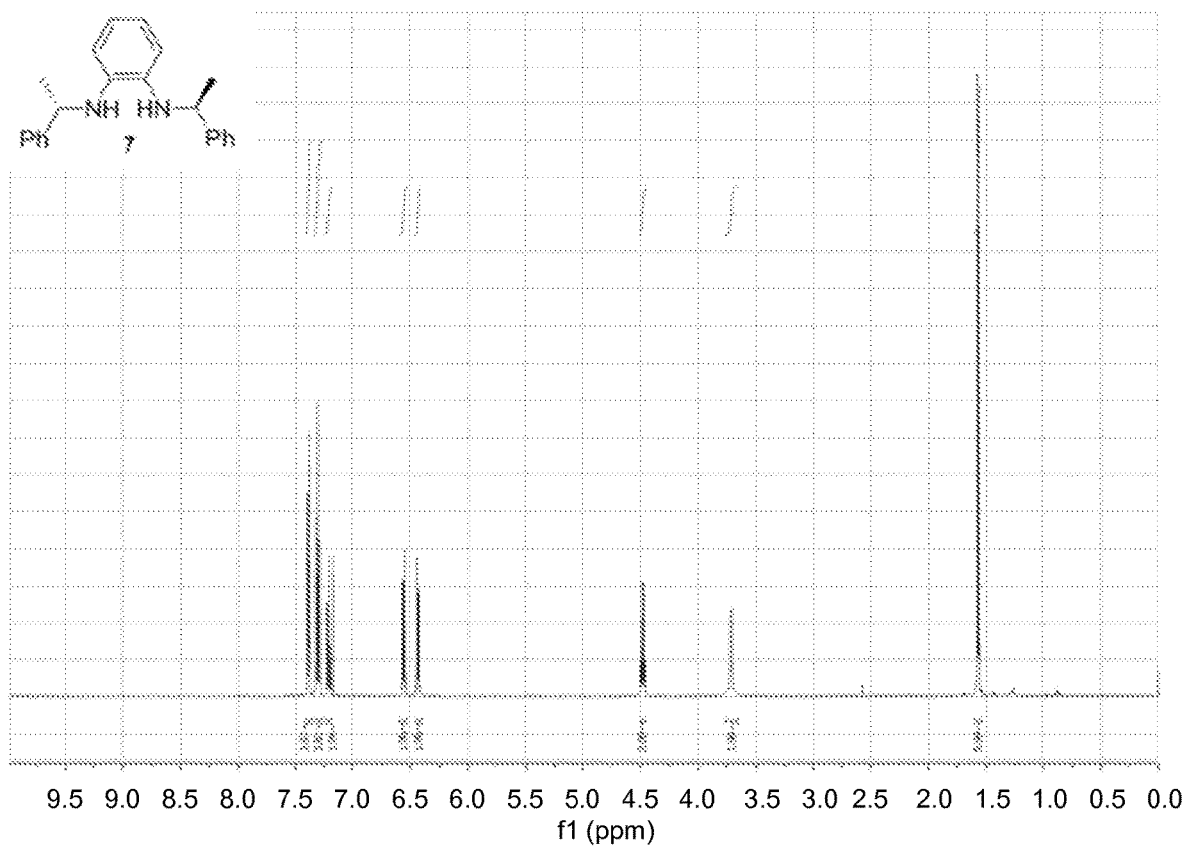

Removal of Cl$_2$Pd(PPh$_3$)$_2$ from a Toluene Solution. To a 20 dram vial equipped with a magnetic stirbar was added 35 mg (0.049 mmol) of PdCl$_2$(PPh$_3$)$_2$ and 10 mL of THF. The solution was stirred for 5 minutes until fully dissolved. Once the complex was fully dissolved, 500 mg (16 equivalent) of isocyanide containing silica gel 1 was added and almost immediately a color change from bright yellow to clear was observed (see FIG. 23 below). The solution was stirred for 30 minutes at room temperature at which point the silica gel was collected by filtration through a medium porosity filter frit. The isolated silica gel was washed with another 10 mL of THF. The filtrate and washings were combined and concentrated in vacuo (rotary evaporator) in a pre-weighed vial. The concentrated eluent was found to contain 19 mg (0.072 mmol, 1.5 equivalent) of triphenylphosphine being displaced from the metal center.

Some Metal Isocyanide Complexes from the Literature. Several Pd-isocyanide complexes have been structurally characterized in the literature. Some relevant complexes are summarized below.

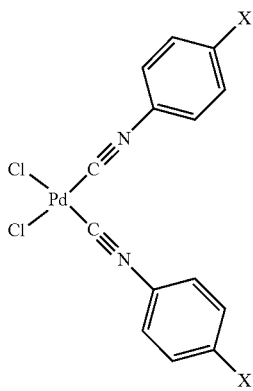

A (X = OMe) 2236, 2207 cm$^{-1}$
B (X = Me) 2237, 2215 cm$^{-1}$

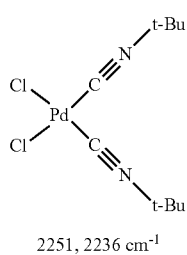

2251, 2236 cm$^{-1}$

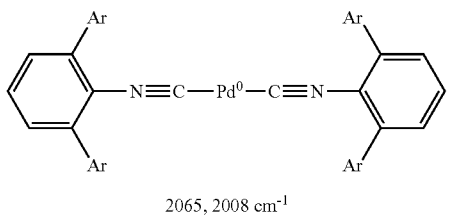

2065, 2008 cm$^{-1}$

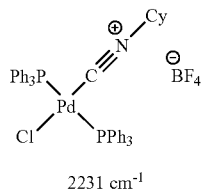

2231 cm$^{-1}$

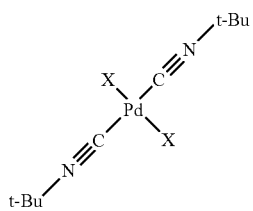

F (X = Br), 2224 cm$^{-1}$
G (X = I), 2216 cm$^{-1}$

"Pd$^0$(t-BuNC)$_2$"

2108, 1700 cm$^{-1}$

Analytical Method for the Determination of Pd by ICP-MS. The calibration curve was made from dilutions of a High Purity Pd Standard which was 1000 μg per mL of Pd in 5% HCl. Calibration curve was made with standards of 0.0, 0.01, 0.1, 1.0, 10, 100, 200, 400, 600, 800, 1000 ppb Pd in 2.76% TraceSelect grade nitric acid solution.

Samples for analysis were concentrated and transferred to pre-weighed 50 mL metal-free centrifuge tube and the weight was recorded. The samples were then digested with 2.0 mL of TraceSelect grade concentrated (69%) nitric acid (12 h, rt). After the digestion period, the samples were diluted to a final volume of 50.0 mL with distilled deionized water. After the digestion, all samples were subsequently filtered through a 0.45 micron syringe filter prior to being analyzed. The total palladium content was determined by monitoring $^{105}$Pd, $^{106}$Pd, and $^{108}$Pd. Samples were run in triplicate with the final value being the average of the three runs.

Control. To determine an appropriate method for the digestion of the organic samples, two known samples were made and analyzed. Sample A contained 10.8 mg (0.048 mmol) and sample B contained 5.6 mg (0.025 mmol) of solid Pd(OAc)$_2$. Both samples were dissolved in 2 mL of TraceSelect grade nitric acid (>69%) for 12 h at room temperature. The samples were then diluted to 50 mL total volume in Nanopure water and filtered through a 0.45 μm syringe filter.

Sample A contained 0.0481 mmol of palladium or 5.12 mg in 50 mL for a concentration of 1024 μg per mL or 1024 ppm. One mL of this sample was further diluted to 100 mL for a final concentration of 1.02 ppm. This sample was then directly analyzed and compared to the standard curve. The observed concentration for this sample was 0.985 ppm, for 3.9% error.

Sample B contained 0.025 mmol of palladium or 2.65 mg in 50 mL for a concentration of 530 μg per mL or 530 ppm. One mL of this sample was further diluted to 100 mL for a final concentration of 530 ppb. This sample was directly analyzed and compared to the standard curve. The observed concentration for this sample was 537 ppb, for 1.3% error.

Representative Digestion Procedure. A known mass of all samples (weighed to the nearest 0.1 mg for solids and the nearest mg for liquids) were digested in 2 mL of TraceSelect grade nitric acid (>69%) for 12 h at room temperature. After the digestion period the samples were diluted to 50 mL, total volume, in Nanopure water. The samples were then filtered through a 0.45 μm syringe filter to remove any particulate material. The diluted samples were then directly analyzed by ICP-MS (FIGS. 26-30).

All the references cited in this application are hereby incorporated by reference.

The preceding description provides specific examples of the present disclosure. Those skilled in the art will recognize that routine modifications to these embodiments can be made which are intended to be within the scope of the disclosure.

What is claimed is:

1. A method for removing transition metals or transition metal complexes from a reaction mixture comprising:
    a) providing a reaction mixture of a metal-catalyzed reaction, the reaction mixture comprising transition metals and a reaction product in solution, wherein the transition metals are selected from the group consisting of a Group 8 element, a Group 9 element, a Group 10 element, and a Group 11 element;

b) contacting a metal sequestering material with the reaction mixture, wherein the metal sequestering material comprises:
   i) a support, wherein the support is silica gel or an organic solid support;
   ii) a linker bound to the support; and
   iii) at least one isocyanide bound to the linker, wherein the isocyanide has a loading of 1.1 to 1.6 mmol/g; and
c) separating the metal sequestering material from the reaction mixture,
wherein a concentration of the transition metals in the reaction mixture after the separation of the metal sequestering material is reduced to less than 100 ppm.

2. The method of claim 1, wherein the transition metals are selected from the group consisting of Pd, Ir, Ru, Rh, and Pt.

3. The method of claim 1, wherein the transition metals are Au or Hg.

4. The method of claim 1, wherein at least some of the transition metals are bound to the isocyanide before the separation of the metal sequestering material.

5. The method of claim 1, wherein the contacting is performed such that the concentration of the transition metals is reduced to less than 10 ppm.

6. The method of claim 1, wherein greater than 97% of the transition metals are bound to the metal sequestering material before the separation of the metal sequestering material.

7. The method of claim 1, wherein greater than 99% of the transition metals are bound to the metal sequestering material before the separation of the metal sequestering material.

8. The method of claim 1, wherein the transition metals have at least one coordinated ligand in the reaction mixture prior to the contacting.

9. The method of claim 1, further comprising:
   d) removing the transition metals from the metal sequestering material after the separation of the metal sequestering material.

10. The method of claim 1, wherein the support has a specific surface area from 500 $m^2/g$ to 600 $m^2/g$.

11. The method of claim 1, wherein the organic solid support are selected from polyolefins, functionalized polystyrenes, functionalized acrylamides, functionalized polyethylenes, poly(vinyl)alcohols, poly(ethylene glycol)-linked polystyrenes and copolymers thereof.

12. The method of claim 1, wherein the contacting occurs for ≤24 hours.

13. The method of claim 1, wherein the contacting occurs for ≤1 hour.

14. The method of claim 1, wherein the contacting occurs at greater than 0° C.

15. The method of claim 1, wherein the contacting occurs at room temperature.

16. The method of claim 1, wherein the contacting occurs at greater than 100° C.

* * * * *